(A) Annealed by slowly cooling from 950°C
(C) Water quenched from 950°C after annealing
($C_1'$) Tempered by heating at 200°C for 1 hour after the water quenching
($C_2'$) Same as ($C_1'$) except heating at 400°C
($C_3'$) Same as ($C_1'$) except heating at 600°C
($C_4'$) Same as ($C_1'$) except heating at 800°C

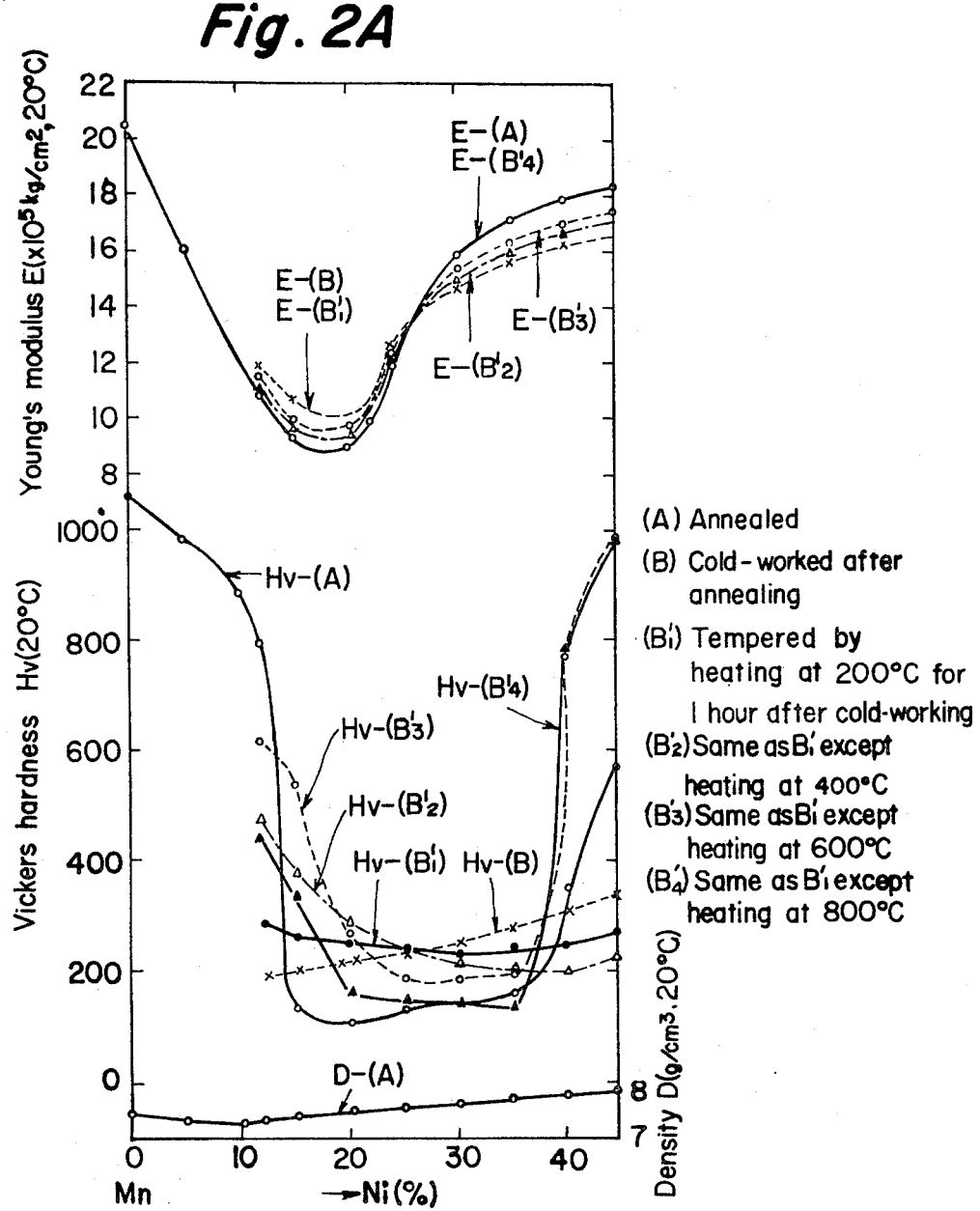

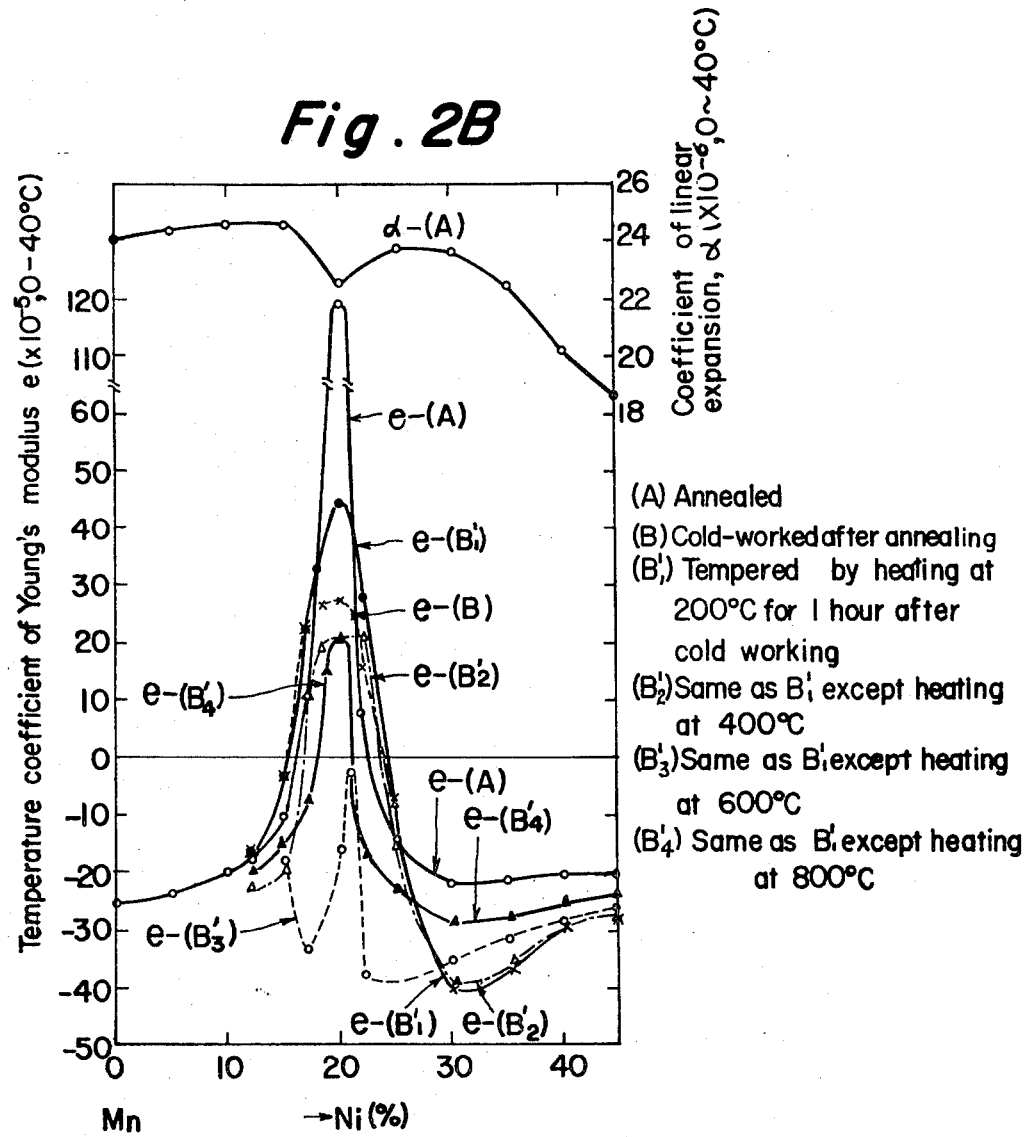

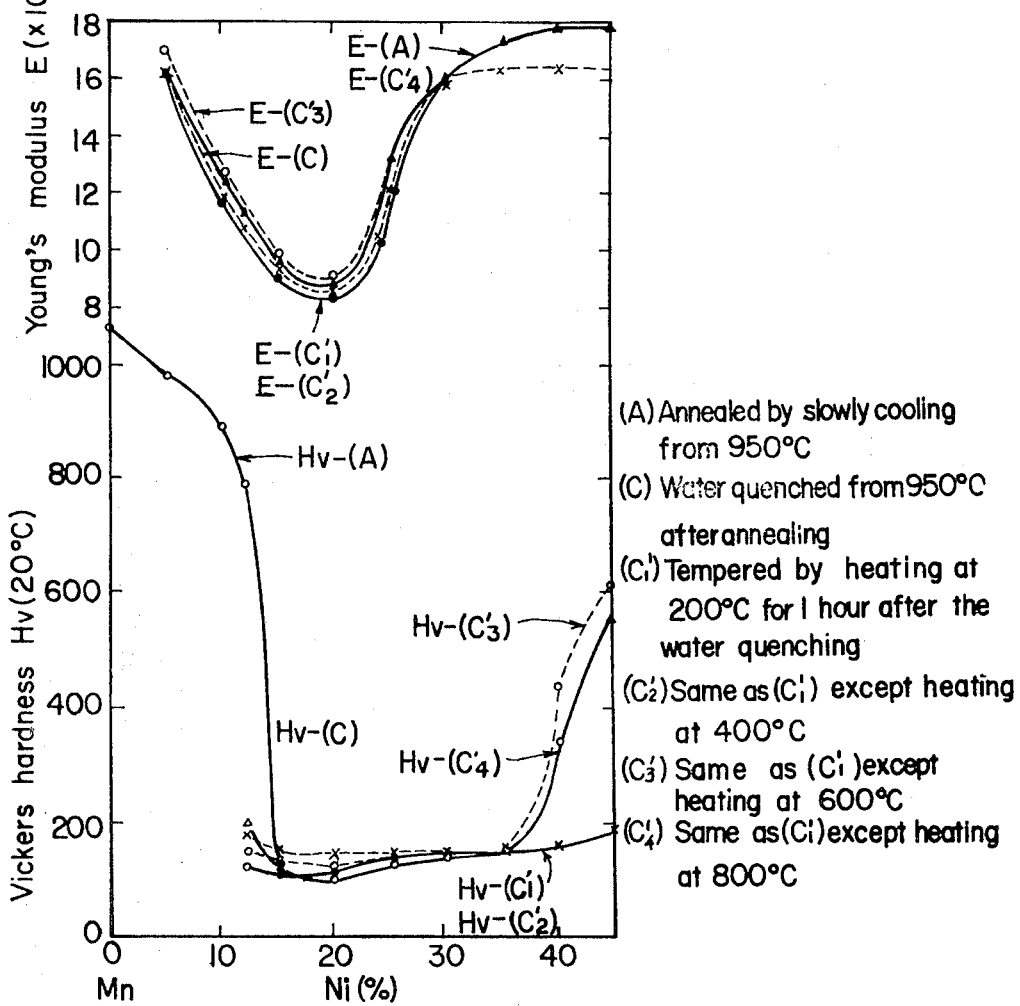

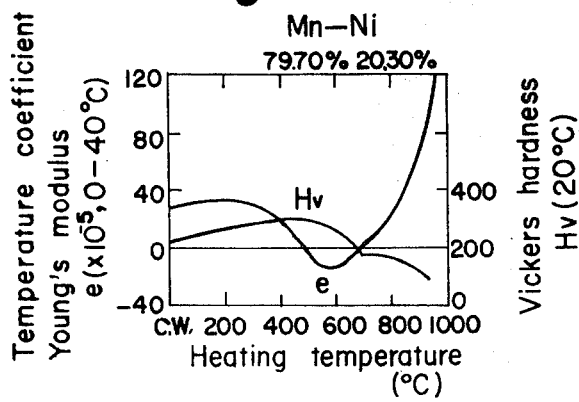
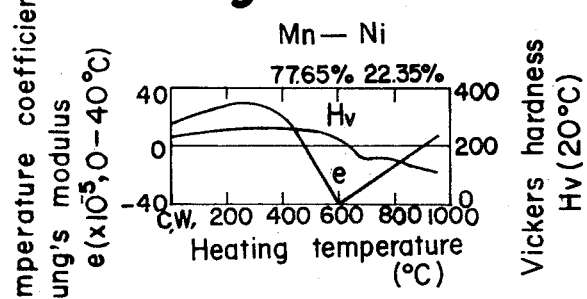
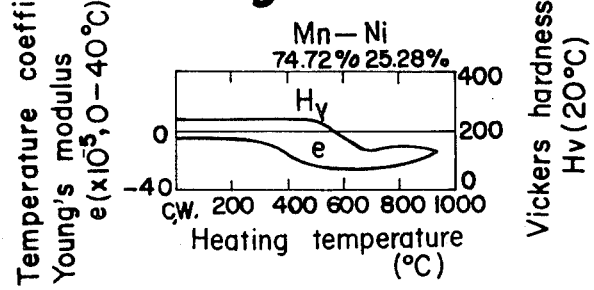

96% cold-worked after annealing

Reheated at 200°C for 1 hour after the 96% cold-work, and then cooled at 100°C/hour Same as Fig. 9B except heating at 400°C Same as Fig. 9B except heating at 600°C Same as Fig. 9B except heating at 800°C

Fig. 10A

Water-quenched after heating at 950°C for 1 hour

Young's modulus $E (\times 10^5 \text{ kg/cm}^2)$ vs. Measuring temperature (°C)

Heated at 400°C for 1 hour after quenching of Fig. 10A and then cooled at 100°C/hour Mn 78.69%, Ni 21.31%

Fig. 10C

Heated at 800°C for 1 hour after quenching of Fig. 10A and then cooled at 100°C/hour Mn 74.72%, Ni 25.28%
Mn 78.69%, Ni 21.31%

Annealed by cooling at 100°C/hour after heating at 950°C for 1 hour
e = Temperature coefficient of Young's modulus 96% cold-worked after annealing of Fig.11 e: Temperature coefficient of Young's modulus

Heated at 400°C for 1 hour after cold-work of Fig.12A and then cooled at 100°C/hour e: Temperature coefficient of Young's modulus Heated at 600°C for 1 hour after cold-work of Fig.12A and then cooled at 100°C/hour e: Temperature coefficient of Young's modulus Heated at 800°C for 1 hour after cold-work of Fig.12A and then cooled at 100°C/hour e: Temperature coefficient of Young's modulus Water-quenched after heating at 950°C for 1 hour
e : Temperature coefficient of Young's modulus Heated at 400°C for 1 hour after quenching of Fig.13A and then cooled at 100°C/hour
e : Temperature coefficient of Young's modulus Heated at 600°C for 1 hour after quenching of Fig.13A and then cooled at 100°C/hour e : Temperature coefficient of Young's modulus Heated at 800°C for 1 hour after quenching of Fig.13A and then cooled at 100°C/hour e : Temperature coefficient of Young's modulus Heated at 600°C for 1 hour after cold-work of Fig. 17A and then cooled at 100°C/hour Heated at 800°C for 1 hour after cold-work of Fig. 17A and then cooled at 100°C/hour Annealed by cooling at 100°C/hour after heating at 950°C for 1 hour e: Temperature coefficient of Young's modulus Annealed by cooling at 100°C/hour after heating at 950°C for 1 hour e: Temperature coefficient of Young's modulus 96% cold-worked after annealing of Fig. 19A
e : Temperature coefficient of Young's modulus Heated at 200°C for 1 hour after cold-work of Fig.20A and then cooled at 100°C/hour
e : Temperature coefficient of Young's modulus Heated at 400°C for 1 hour after cold-work of Fig. 20A and then cooled at 100°C/hour e: Temperature coefficient of Young's modulus Heated at 600°C for 1 hour after cold-work of Fig. 20A and then cooled at 100°C/hour e: Temperature coefficient of Young's modulus Heated at 800°C for 1 hour after quenching of Fig.20A and then cooled at 100°C/hour e: Temperature coefficient of Young's modulus 96% cold-worked after annealing of Fig.19B e: Temperature coefficient of Young's modulus Heated at 200°C for 1 hour after cold-work of Fig.21A and then cooled at 100°C/hour e: Temperature coefficient of Young's modulus Heated at 400°C for 1 hour after cold-work of Fig.21A and then cooled at 100°C/hour e: Temperature coefficient of Young's modulus Heated at 600°C for 1 hour after cold-work of Fig. 21A and then cooled at 100°C/hour e: Temperature coefficient of Young's modulus Water-quenched after heating at 950°C for 1 hour e: Temperature coefficient of Young's modulus Heated at 200°C for 1 hour after quenching of Fig. 22A and then cooled at 100°C/hour e: Temperature coefficient of Young's modulus Heated at 400°C for 1 hour after quenching of Fig. 22A and then cooled at 100°C/hour e: Temperature coefficient of Young's modulus Heated at 600°C for 1 hour after quenching of Fig.22A and then cooled at 100°C/hour e: Temperature coefficient of Young's modulus Heated at 800°C for 1 hour after quenching of Fig.22A and then cooled at 100°C/hour e: Temperature coefficient of Young's modulus Water-quenched after heating at 950°C for 1 hour e: Temperature coefficient of Young's modulus Heated at 200°C for 1 hour after quenching of Fig. 23A and then cooled at 100°C/hour e: Temperature coefficient of Young's modulus Heated at 400°C for 1 hour after quenching of Fig.23A and then cooled at 100°C/hour e: Temperature coefficient of Young's modulus Heated at 600°C for 1 hour after quenching of Fig.23A and then cooled at 100°C/hour e: Temperature coefficient of Young's modulus 96% cold-worked after annealing of Fig. 26A Heated at 200°C for 1 hour after cold-work of Fig. 27A and then cooled at 100°C/hour Heated at 400°C for 1 hour after cold-work of Fig. 27A and then cooled at 100°C/hour Heated at 600°C for 1 hour after cold-work of Fig. 27A and then cooled at 100°C/hour Heated at 800°C for 1 hour after cold-work of Fig. 27A and then cooled at 100°C/hour 96% cold-worked after annealing of Fig. 26B Heated at 200°C for 1 hour after cold-work of Fig. 28A and then cooled at 100°C/hour Heated at 400°C for 1 hour after cold-work of Fig. 28A and then cooled at 100°C/hour Heated at 200°C for 1 hour after quenching of Fig. 29A and then cooled at 100°C/hour Heated at 400°C for 1 hour after quenching of Fig. 29A and then cooled at 100°C/hour Heated at 600°C for 1 hour after quenching of Fig. 29A and then cooled at 100°C/hour Heated at 800°C for 1 hour after quenching of Fig. 29A and then cooled at 100°C/hour Heated at 400°C for 1 hour after quenching of Fig. 30A and then cooled at 100°C/hour Heated at 600°C for 1 hour after quenching of Fig. 30A and then cooled at 100°C/hour Annealed by cooling at 100°C/hour
after heating at 950°C for 1 hour e: Temperature coefficient of Young's modulus Annealed by cooling at 100°C/hour
after heating at 950°C for 1 hour e: Temperature coefficient of Young's modulus 96% cold-worked after annealing of Fig. 31A e: Temperature coefficient of Young's modulus Heated at 200°C for 1 hour after cold-work of Fig. 32A and then cooled at 100°C/hour e: Temperature coefficient of Young's modulus Heated at 400°C for 1 hour after cold-work of Fig. 32A and then cooled at 100°C/hour Heated at 600°C for 1 hour after cold-work of Fig. 32A and then cooled at 100°C/hour Heated at 800°C for 1 hour after cold-work of Fig. 32A and then cooled at 100°C/hour e: Temperature coefficient of Young's modulus 96% cold-worked after annealing of Fig. 31B e: Temperature coefficient of Young's modulus Heated at 200°C for 1 hour after cold-work of Fig. 33A and then cooled at 100°C/hour e: Temperature coefficient of Young's modulus Heated at 400°C for 1 hour after cold-work of Fig. 33A and then cooled at 100°C/hour e: Temperature coefficient of Young's modulus Heated at 600°C for 1 hour after cold-work of Fig. 33A and then cooled at 100°C/hour e: Temperature coefficient of Young's modulus Heated at 800°C for 1 hour after cold-work of Fig. 33A and then cooled at 100°C/hour e: Temperature coefficient of Young's modulus Water-quenched after heating at 950°C for 1 hour e: Temperature coefficient of Young's modulus Heated at 200°C for 1 hour after quenching of Fig. 34A and then cooled at 100°C/hour e: Temperature coefficient of Young's modulus Heated at 400°C for 1 hour after quenching of Fig. 34A and then cooled at 100°C/hour e: Temperature coefficient of Young's modulus Heated at 600°C for 1 hour after quenching of Fig. 34A and then cooled at 100°C/hour e: Temperature coefficient of Young's modulus Heated at 800°C for 1 hour after quenching of Fig. 34A and then cooled at 100°C/hour e: Temperature coefficient of Young's modulus Water-quenched after heating at 950°C for 1 hour e: Temperature coefficient of Young's modulus Heated at 200°C for 1 hour after quenching of Fig. 35A and then cooled at 100°C/hour Heated at 400°C for 1 hour after quenching of Fig. 35A and then cooled at 100°C/hour Heated at 600°C for 1 hour after quenching
of Fig. 35A and then cooled at 100°C/hour e: Temperature coefficient of
Young's modulus Heated at 800°C for 1 hour after quenching
of Fig. 35A and then cooled at 100°C/hour e: Temperature coefficient of
Young's modulus Annealed by cooling at 100°C/hour after heating at 950°C for 1 hour Annealed by cooling at 100°C/hour after heating at 950°C for 1 hour 96% cold-worked after annealing of Fig. 31A Heated at 200°C for 1 hour after cold-work of Fig. 39A and then cooled at 100°C/hour Heated at 400°C for 1 hour after cold-work of Fig. 39A and then cooled at 100°C/hour Heated at 600°C for 1 hour after cold-work of Fig. 39A and then cooled at 100°C/hour Heated at 800°C for 1 hour after cold-work of Fig. 39A and then cooled at 100°C/hour 96% cold-worked after annealing of Fig.31B Heated at 200°C for 1 hour after cold-work of Fig.40A and then cooled at 100°C/hour Heated at 400°C for 1 hour after cold-work of Fig.40A and then cooled at 100°C/hour Heated at 600°C for 1 hour after cold-work of Fig.40A and then cooled at 100°C/hour Heated at 800°C for 1 hour after cold-work of Fig.40A and then cooled at 100°C/hour Water-quenched after heating at 950°C for 1 hour Heated at 200°C for 1 hour after quenching of Fig. 41A and then cooled at 100°C/hour Heated at 400°C for 1 hour after quenching of Fig. 41A and then cooled at 100°C/hour Heated at 600°C for 1 hour after quenching of Fig.41A and then cooled at 100°C/hour Heated at 800°C for 1 hour after quenching of Fig.41A and then cooled at 100°C/hour Water-quenched after heating at 950°C for 1 hour Heated at 200°C for 1 hour after quenching of Fig. 42A and then cooled at 100°C/hour Heated at 400°C for 1 hour after quenching of Fig. 42A and then cooled at 100°C/hour United States Patent Office 3,725,053
Patented Apr. 3, 1973

3,725,053
NON-MAGNETIC RESILIENT MANGANESE-NICKEL ALLOY HAVING A SMALL TEMPERATURE COEFFICIENT OF ELASTIC MODULUS AND METHOD FOR MANUFACTURING THE SAME
Hakaru Masumoto, Shohachi Sawaya, and Michio Kikuchi, Sendai, Japan, assignors to The Foundation: The Research Institute of Electric and Magnetic Alloys, Sendai, Japan
Filed Sept. 10, 1970, Ser. No. 71,190
Claims priority, application Japan, Sept. 13, 1969; 44/72,547; Nov. 18, 1969, 44/91,904; Mar. 11, 1970, 45/20,349; Aug. 7, 1970, 45/68,625
Int. Cl. C22c 33/00, 39/00
U.S. Cl. 75—134 M                25 Claims

ABSTRACT OF THE DISCLOSURE

Non-magnetic resilient manganese-nickel alloys having a temperature coefficient of Young's modulus in a range of $-20 \times 10^{-5}$ to $+20 \times 10^{-5}$, essentially consisting of 40 to 95 wt. percent of manganese, less than 40 wt. percent, preferably 5 to 40 wt. percent of nickel, and 0 to 32 wt. percent in total of optional subingredient or subingredients selected from the group consisting of 0 to 32 wt. percent of chromium, 0 to 30 wt. percent of iron, molybdenum, tungsten, indium, and titanium, 0 to 20 wt. percent of cobalt, vanadium, gold, silver, tantalum, zirconium, palladium, cadmium, germanium, selenium, bismuth, samarium, niobium, antimony, aluminum, silicon, tin, tellurium, and gadolinium, and 0 to 10 wt. percent of zinc, beryllium, and boron.

This invention relates to non-magnetic resilient manganese-nickel alloys having a small temperature coefficient of elastic modulus, which are particularly suitable for inexpensive resilient members with a constant resiliency independent of ambient temperature variation. The invention also relates to methods of manufacturing such alloys.

Resilient members, whose resiliency is substantially constant independently of ambient temperature variation, have heretofore been made by using Elinvar alloys (about 37.5% of nickel, about 12% of chromium, about 50.5% of iron) and Coelinvar alloys (about 58% of cobalt, about 10% of chromium, about 32% of iron). Such known alloys have shortcomings in that they are expensive due to the large content of nickel or cobalt and they are ferromagnetic and susceptible to magnetization.

In order to obviate such difficulties of the known alloys, the inventors have carried out a series of studies, and succeeded in producing non-magnetic resilient manganese-nickel base alloys having a very small temperature coefficient of Young's modulus (or modulus of rigidity). Furthermore, the inventors found the fact that the value of the temperature coefficient of elastic modulus of such manganese-nickel base alloys can be controlled by heat treatment and/or comparatively simple mechanical treatment.

An object of the present invention is to provide a non-magnetic resilient manganese-nickel base alloy having a temperature coefficient of $-20 \times 10^{-5}$ to $20 \times 10^{-5}$ of elastic modulus in a temperature range of $-200°$ C. to $400°$ C., the temperature coefficient being $-5 \times 10^{-5}$ to $5 \times 10^{-5}$ in a temperature range of $-50°$ C. to $80°$ C., which alloy essentially consists of 40 to 95° wt. percent of manganese, less than 40 wt. percent, preferably 5 to 40 wt. percent of nickel, and 0 to 32 wt. percent in total of optional ingredient or ingredients selected from the group consisting of 0 to 32 wt. percent of chromium, 0 to 30 wt. percent of iron, 0 to 30 wt. percent of molybdenum, tungsten, 0 to 30 wt. percent of indium, and titanium, 0 to 20 wt. percent of cobalt, 0 to 20 wt. percent of vanadium, gold, silver, tantalum, zirconium, palladium, cadmium, germanium, selenium, bismuth, samarium, niobium, antimony, aluminum, silicon, tin, tellurium, and gadolinium, and 0 to 10 wt. percent of zinc, beryllium, and boron.

The alloy of the invention is less expensive than known Elinvar and Coelinvar. Furthermore, the non-magnetic properties of the alloy of the invention mitigate the aforesaid difficulty of the conventional Elinvar and Coelinvar alloy.

The composition of the alloys of the invention is limited to the aforesaid range, because compositions outside of the aforesaid range do not provide a sufficiently small temperature coefficient of elastic modulus (or modulus of rigidity) for resilient members of constant elasticity.

Another object of the present invention is to provide a method for manufacturing such an alloy.

The temperature coefficient of elastic modulus (or modulus of rigidity) of the alloy of the present invention can be controlled at a desired level by means of the following heat treatments.

Process (A)

The shaped article made of the alloy may be heated at higher than 600° C. but below its melting point for at least one minute (e.g., 5 minutes to 500 hours) for the sake of homogenizing treatment, and annealed by gradually cooling at a speed slower than 1° C./sec.

Process (B)

After the annealing of the process (A), the shaped article made of the alloy may be cold-worked with a working rate of 1% or more. What is meant by the working rate is the percentage of the deformation caused by the cold-work, in terms of the cross sectional areas of the article before and after the cold-work.

Process (C)

After the annealing of the process (A), the alloy may be heated at higher than 200° C. but lower than its melting point for at least one minute, preferably for 10 minutes to 50 hours, and quenched by quickly cooling it at a rate faster than 1° C./sec., preferably 10° C./sec. to 500° C./sec.

Process (D)

After the quenching of the process (C), the alloy may be cold-worked with a working rate of 1% or more, as defined in the process (B).

Process (B')

After the cold-work of the process (B), the alloy may be heated at higher than 100° C. but lower than its melting point for at least one minute, preferably 5 minutes to 500 hours, and tempered by gradually cooling at a rate slower than 1° C./sec.

Process (C')

After the quenching of the process (C), the alloy may be heated at higher than 100° C. but lower than its melting point for at least one minute, preferably 5 minutes to 500 hours, and tempered by gradually cooling at a rate slower than 1° C./sec.

Process (D')

After the cold-work of the process (D), the alloy may be heated at higher than 100° C. but lower than its melting point for at least one minute, preferably 5 minutes to 500 hours, and tempered by gradually cooling at a rate slower than 1° C./sec.

The articles consisting of alloys according to the present invention can be made in the following manner. In the desired alloy, if the total content of nickel, chromium, and/or iron therein amounts to 10% or more of the entire alloy composition, such nickel, chromium, and/or iron are melted together in a furnace at the beginning. On the other hand, if the total content of nickel, chromium, and/or iron is less than 10% of the entire alloy composition, manganese is melted in a furnace at the beginning, rather than the last mentioned nickel, chromium, and/or iron. The remaining elements of the alloys are then added in the molten metal or metals thus prepared. The molten alloy is thoroughly agitated until it becomes homogeneous. The molten alloy is poured into a mould to produce an ingot, which is then forged, rolled, or swaged at room temperature or higher but below its melting point. Thus, a body of desired shape is formed.

The body thus obtained is then heat-treated by one of the above referred processes, so as to produce a desired resilient member having a substantially constant elastic modulus independent of variation of the ambient temperature. The above cold-work of the process (B) or (D) can, of course, be used for shaping the ingot into the desired shape.

For a better understanding of the invention, reference is made to the accompanying drawings, in which:

FIG. 1 is an equilibrium diagram of manganese-nickel binary alloy system;

FIGS. 2A and 2B are graphs illustating the relation between the nickel concentration of the manganese-nickel alloy and physical properties of the alloy, i.e., the Vickers hardness, the Young's modulus, the density at 20° C., the mean coefficient of linear expansion $\alpha$ between 0° C. and 40° C., and the mean temperature coefficient of Young's modulus $e$ between 0° C. and 40° C., for the states as annealed, as cold-worked, and as tempered at different temperatures;

FIGS. 3A and 3B are graphs similar to FIGS. 2A and 2B, respectively, for the states as annealed as water quenched, and as tempered at different temperatures;

FIGS. 7A to 7G are graphs showing the temperature coefficient of Young's modulus $e$ and the Vickers hardness of manganese-nickel binary alloys of the invention, which alloys are annealed, cold-worked, and then tempered at different heating temperatures;

FIGS. 10A to 10C are graphs showing the Young's modulus of manganese-nickel binary alloys of the invention at different temperatures, which alloys are annealed, water quenched after annealing, and tempered;

Figure 1:
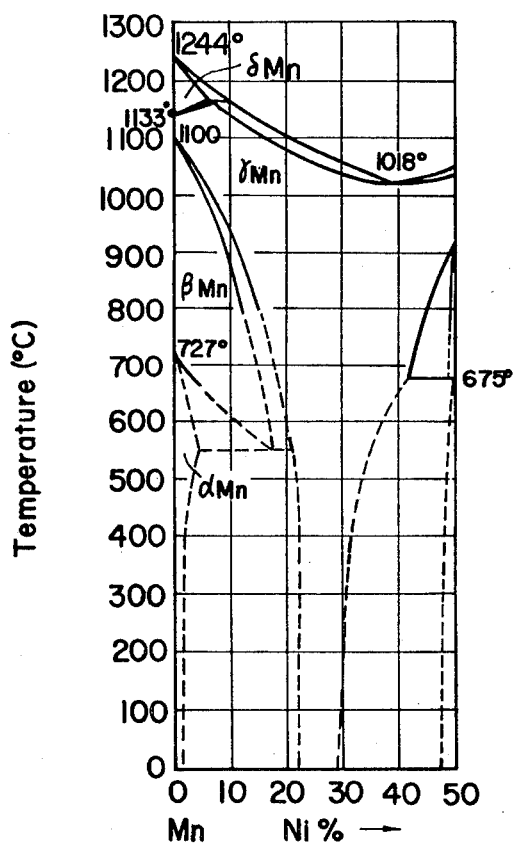

FIGS. 39A to 39E and FIGS. 40A to 40E illustrate the Young's modulus of manganese-nickel-molybdenum ternary alloys and manganese-nickel-tungsten ternary alloys, respectively, for the state as cold-worked with a working rate of 96% after the annealing and for the state as tempered under different conditions after the cold-work; and FIGS. 41A to 41E and FIGS. 42A to 42E illustrate the Young's modulus of manganese-nickel-molybdenum ternary alloys and manganese-nickel-tungtsen ternary alloys, respectively, for the state as water quenched after the annealing and for the state as tempered under different conditions after the water quenching.

The invention will now be described in detail, by referring to examples.

EXAMPLE 1

Ingredients of different samples (each sample weighing about 500 grams) of manganese-nickel binary alloys consisting of 55 to 100 wt. percent of manganese and 0 to 100 wt. percent of nickel were melted in alumina crucibles, which were disposed in a high-frequency induction furnace or an electric resistance furnace, while passing argon gas therethrough. The molten ingredients were thoroughly agitated, and poured into iron moulds, for producing cylindrical ingots of about 10 mm. dia.

The ingots thus produced were heated at 950° C. for 1 hour and cooled at a speed of 100° C./hour, and swaged at room temperature into round rods of about 2 mm. dia. with a working rate of 96%, i.e., the cross sectional area of the ingots was reduced by 96%. The round rods were cut into about 11 cm. long specimens, which were used for the measurement of the effects of the aforesaid cold-work of the process (B).

Some of the about 11 cm. long specimens of about 2 mm. dia. were heated at 950° C. for 1 hour. It is known to those skilled in the art that, as far as the resiliency is concerned, such heating at a solution treatment temperature (e.g., 950° C.) for 1 hour brings the alloy structure to a condition prior to the cold-work of the process (B). Accordingly, the ensuing slow cooling of the metal thus heated may result in the aforesaid annealing of the process (A), and the ensuing quick water cooling of the metal thus heated may result in the aforesaid water quenching of the process (C).

Thus, the about 11 cm. long specimens of about 2 mm. dia. were divided into two groups after the heating at 950° C. The first group specimens were annealed by cooling at speed of 100° C./hour, which were used for the measurement of the effects of the aforesaid annealing of the process (A). The second group specimens were water quenched for the measurement of the effects of the aforesaid water quenching of the process (C).

Some of the specimens of the first and second groups were again heated at various temperatures below 950° C. for 1 hour, and cooled at a speed of 100° C./hour, so as to provide specimens for the measurement of the effects of the aforesaid tempering treatment of the processes (B') and (C'), respectively.

The Young's modulus of the specimens was determined by measuring the resonant frequency thereof by a device having a sensitive electrostatic capacitor, and calculating the value of the Young's modulus from the resonant frequency thus measured.

The coefficient of linear expansion $\alpha$ of the specimens in the proximity of room temperature was measured by using a precision linear dilatometer of vertical type. FIG. 1 is an equilibrium diagram of Mn-Ni alloy, based on Hansen's equilibrium diagram of binary alloys.

FIGS. 2A and 2B illustrate physical properties of Mn-Ni alloys of different compositions, under the conditions as annealed (A), as cold-worked (B), and as tempered ($B_1'$) to ($B_4'$); the properties include the density, Young's modulus, and Vickers hardness at 20° C., and the coefficient of linear expansion and the mean temperature coefficient of Young's modulus between 0° C. and 40° C.

TABLE 1

Properties of manganese-nickel alloy

(A) After heating at 950° C. for 1 hour, annealed by cooling at 100° C./hour

| Alloy composition Mn (%) | Ni (%) | Young's modulus (kg/cm²) (20° C.) | Modulus of rigidity (kg/cm²) (20° C.) | Temp. coeff. of Young's modulus $e$ (0° to 40° C.) | Temp. coeff. of modulus of rigidity (0° to 40° C.) | Vickers hardness (20° C.) |
|---|---|---|---|---|---|---|
| 87.79 | 12.21 | $10.80 \times 10^3$ | $4.27 \times 10^3$ | $-17.50 \times 10^{-5}$ | $-17.55 \times 10^{-5}$ | 790 |
| 84.78 | 15.22 | $9.25 \times 10^3$ | $3.90 \times 10^3$ | $-10.50 \times 10^{-5}$ | $-10.68 \times 10^{-5}$ | 130 |
| 85.42 | 15.42 | --- | --- | --- | --- | --- |
| 83.55 | 16.45 | --- | --- | --- | --- | --- |
| 82.35 | 17.65 | $8.95 \times 10^3$ | $3.50 \times 10^3$ | ca. $0.00 \times 10^{-5}$ | ca. $0.00 \times 10^{-5}$ | 116 |
| 77.49 | 22.35 | $9.80 \times 10^3$ | $3.63 \times 10^3$ | $+7.53 \times 10^{-5}$ | $+7.50 \times 10^{-5}$ | 110 |
| 77.40 | 22.51 | $10.00 \times 10^3$ | $3.68 \times 10^3$ | ca. $0.00 \times 10^{-5}$ | ca. $0.00 \times 10^{-5}$ | 112 |
| 75.39 | 24.61 | --- | --- | --- | --- | --- |
| 74.72 | 25.28 | $12.65 \times 10^3$ | $3.81 \times 10^3$ | $-14.50 \times 10^{-5}$ | $-14.40 \times 10^{-5}$ | 130 |
| 80.59 | 19.41 | --- | --- | --- | --- | --- |
| 78.39 | 21.61 | --- | --- | --- | --- | --- |
| 78.04 | 21.96 | --- | --- | --- | --- | --- |

(B) After the annealing, cold-worked with a working rate of 98%

| Mn (%) | Ni (%) | Young's modulus | Modulus of rigidity | Temp. coeff. $e$ | Temp. coeff. rigidity | Vickers hardness |
|---|---|---|---|---|---|---|
| 87.79 | 12.21 | $11.90 \times 10^3$ | $4.63 \times 10^3$ | $-17.00 \times 10^{-5}$ | $-17.20 \times 10^{-5}$ | 190 |
| 84.78 | 15.22 | $10.70 \times 10^3$ | $4.16 \times 10^3$ | $-3.87 \times 10^{-5}$ | $-3.90 \times 10^{-5}$ | 200 |
| 85.42 | 15.42 | $10.60 \times 10^3$ | $3.98 \times 10^3$ | ca. $0.00 \times 10^{-5}$ | ca. $0.00 \times 10^{-5}$ | 200 |
| 83.55 | 16.45 | --- | --- | --- | --- | --- |
| 82.35 | 17.65 | $10.65 \times 10^3$ | $3.71 \times 10^3$ | $+15.80 \times 10^{-5}$ | $+15.40 \times 10^{-5}$ | 220 |
| 77.49 | 22.35 | --- | --- | --- | --- | --- |
| 77.40 | 22.51 | --- | --- | --- | --- | --- |
| 75.39 | 24.61 | $12.90 \times 10^3$ | $3.75 \times 10^3$ | ca. $0.00 \times 10^{-5}$ | ca. $0.00 \times 10^{-5}$ | 230 |
| 74.72 | 25.28 | $13.25 \times 10^3$ | $3.79 \times 10^3$ | $-7.50 \times 10^{-5}$ | $-7.56 \times 10^{-5}$ | 230 |

(C) After the annealing, reheated at 950° C. for 1 hour and water quenched

| Mn (%) | Ni (%) | Young's modulus | Modulus of rigidity | Temp. coeff. $e$ | Temp. coeff. rigidity | Vickers hardness |
|---|---|---|---|---|---|---|
| 80.59 | 19.41 | $8.61 \times 10^3$ | $3.08 \times 10^3$ | ca. $0.00 \times 10^{-5}$ | ca. $0.00 \times 10^{-5}$ | 150 |
| 78.39 | 21.61 | $8.80 \times 10^3$ | $3.11 \times 10^3$ | $+16.04 \times 10^{-5}$ | $+16.00 \times 10^{-5}$ | 150 |
| 78.04 | 21.96 | $8.95 \times 10^3$ | $3.18 \times 10^3$ | ca. $0.00 \times 10^{-5}$ | ca. $0.00 \times 10^{-5}$ | 153 |

($B_1'$) After cold-worked, heated at 200° C. for 1 hour and cooled at 100° C./hour

| Mn (%) | Ni (%) | Young's modulus | Modulus of rigidity | Temp. coeff. $e$ | Temp. coeff. rigidity | Vickers hardness |
|---|---|---|---|---|---|---|
| 87.79 | 12.21 | $10.80 \times 10^3$ | $4.61 \times 10^3$ | $-17.00 \times 10^{-5}$ | $-17.25 \times 10^{-5}$ | 285 |
| 84.78 | 15.22 | $9.24 \times 10^3$ | $4.15 \times 10^3$ | $-3.68 \times 10^{-5}$ | $-4.00 \times 10^{-5}$ | 263 |
| 74.72 | 25.28 | $12.64 \times 10^3$ | $3.78 \times 10^3$ | $-7.50 \times 10^{-5}$ | $-7.81 \times 10^{-5}$ | 240 |

($C_1'$) After the water quenching, heated at 400° C. for 1 hour and cooled at 100° C./hour

| Mn (%) | Ni (%) | Young's modulus | Modulus of rigidity | Temp. coeff. $e$ | Temp. coeff. rigidity | Vickers hardness |
|---|---|---|---|---|---|---|
| 84.78 | 15.22 | $8.55 \times 10^3$ | $3.12 \times 10^3$ | $-6.00 \times 10^{-5}$ | $-6.30 \times 10^{-5}$ | 125 |

($B_2'$) After cold-worked, heated at 400° C. for 1 hour and cooled at 100° C./hour

| Mn (%) | Ni (%) | Young's modulus | Modulus of rigidity | Temp. coeff. $e$ | Temp. coeff. rigidity | Vickers hardness |
|---|---|---|---|---|---|---|
| 84.75 | 15.22 | $9.60 \times 10^3$ | $4.04 \times 10^3$ | $-19.00 \times 10^{-5}$ | $-19.30 \times 10^{-5}$ | 380 |
| 83.05 | 16.95 | $9.31 \times 10^3$ | $3.95 \times 10^3$ | ca. $0.00 \times 10^{-5}$ | ca. $0.00 \times 10^{-5}$ | 340 |
| 82.69 | 17.31 | $9.30 \times 10^3$ | $3.84 \times 10^3$ | $+10.50 \times 10^{-5}$ | $+10.35 \times 10^{-5}$ | 333 |
| 81.70 | 18.30 | $9.30 \times 10^3$ | $3.76 \times 10^3$ | $+19.50 \times 10^{-5}$ | $+19.35 \times 10^{-5}$ | 315 |
| 75.99 | 24.01 | $12.01 \times 10^3$ | $3.79 \times 10^3$ | ca. $0.00 \times 10^{-5}$ | ca. $0.00 \times 10^{-5}$ | 243 |
| 74.72 | 25.28 | $12.80 \times 10^3$ | $3.81 \times 10^3$ | $-15.62 \times 10^{-5}$ | $-15.25 \times 10^{-5}$ | 235 |

($B_3'$) After cold-worked, heated at 600° C. for 1 hour and cooled at 100° C./hour

| Mn (%) | Ni (%) | Young's modulus | Modulus of rigidity | Temp. coeff. $e$ | Temp. coeff. rigidity | Vickers hardness |
|---|---|---|---|---|---|---|
| 84.78 | 15.22 | $9.90 \times 10^3$ | $4.11 \times 10^3$ | $-19.00 \times 10^{-5}$ | $-19.30 \times 10^{-5}$ | 535 |
| 79.70 | 20.30 | $9.70 \times 10^3$ | $3.71 \times 10^3$ | $-16.00 \times 10^{-5}$ | $-16.32 \times 10^{-5}$ | 263 |
| 78.69 | 21.31 | $10.00 \times 10^3$ | $3.67 \times 10^3$ | $-2.50 \times 10^{-5}$ | $2.70 \times 10^{-5}$ | 235 |

($C_2'$) After the water quenching, heated at 800° C. for 1 hour and cooled at 100° C./hour

| Mn (%) | Ni (%) | Young's modulus | Modulus of rigidity | Temp. coeff. $e$ | Temp. coeff. rigidity | Vickers hardness |
|---|---|---|---|---|---|---|
| 78.10 | 21.90 | $8.40 \times 10^3$ | $3.05 \times 10^3$ | $0.00 \times 10^{-5}$ | $0.00 \times 10^{-5}$ | 106 |
| 78.38 | 21.62 | $8.60 \times 10^3$ | $3.07 \times 10^3$ | $+11.00 \times 10^{-5}$ | $+10.85 \times 10^{-5}$ | 125 |
| 77.59 | 22.41 | $8.90 \times 10^3$ | $3.14 \times 10^3$ | ca. $0.00 \times 10^{-5}$ | ca. $0.00 \times 10^{-5}$ | 113 |
| 74.72 | 25.28 | $12.10 \times 10^3$ | $3.26 \times 10^3$ | $-19.50 \times 10^{-5}$ | $-19.66 \times 10^{-5}$ | 145 |

($B_4'$) After cold-worked, heated at 800° C. for 1 hour and cooled at 100° C./hour

| Mn (%) | Ni (%) | Young's modulus | Modulus of rigidity | Temp. coeff. $e$ | Temp. coeff. rigidity | Vickers hardness |
|---|---|---|---|---|---|---|
| 87.79 | 12.21 | $10.80 \times 10^3$ | $4.28 \times 10^3$ | $-19.50 \times 10^{-5}$ | $-19.53 \times 10^{-5}$ | 440 |
| 84.78 | 15.22 | $9.24 \times 10^3$ | $3.92 \times 10^3$ | $-15.22 \times 10^{-5}$ | $-15.22 \times 10^{-5}$ | 335 |
| 82.69 | 17.31 | $9.30 \times 10^3$ | $3.74 \times 10^3$ | $-7.50 \times 10^{-5}$ | $-7.55 \times 10^{-5}$ | 250 |
| 81.70 | 18.30 | $8.82 \times 10^3$ | $3.70 \times 10^3$ | ca. $0.00 \times 10^{-5}$ | ca. $0.00 \times 10^{-5}$ | 230 |
| 81.70 | 18.30 | $8.80 \times 10^3$ | $3.67 \times 10^3$ | $+15.00 \times 10^{-5}$ | $+14.85 \times 10^{-5}$ | 215 |
| 77.65 | 22.35 | $9.30 \times 10^3$ | $3.65 \times 10^3$ | ca. $0.00 \times 10^{-5}$ | ca. $0.00 \times 10^{-5}$ | 150 |
| 74.72 | 25.28 | $9.80 \times 10^3$ | $3.64 \times 10^3$ | $-16.50 \times 10^{-5}$ | $-16.30 \times 10^{-5}$ | 160 |

Figure 3B:
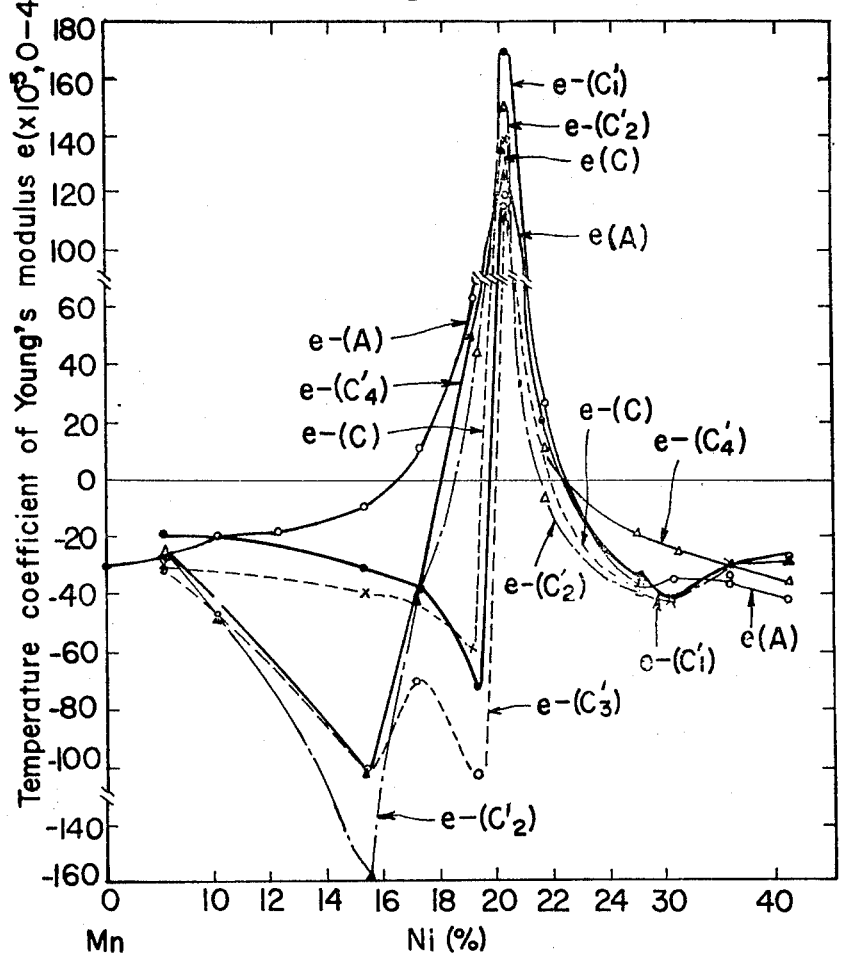

Similarly, FIGS. 3A and 3B illustrate properties of Mn-Ni alloys of different compositions, under the conditions as annealed (A), as water quenched (C), and as tempered ($C_1'$) to ($C_4'$). FIGS. 3A and 3B show the similar physical properties as FIGS. 2A and 2B, except that the former do not show the density and the coefficient of linear expansion.

Table 1 shows typical values of the physical properties, inclusive of Vickers hardness, of the binary alloys with a composition falling in the range of the present invention.

Figure 4:
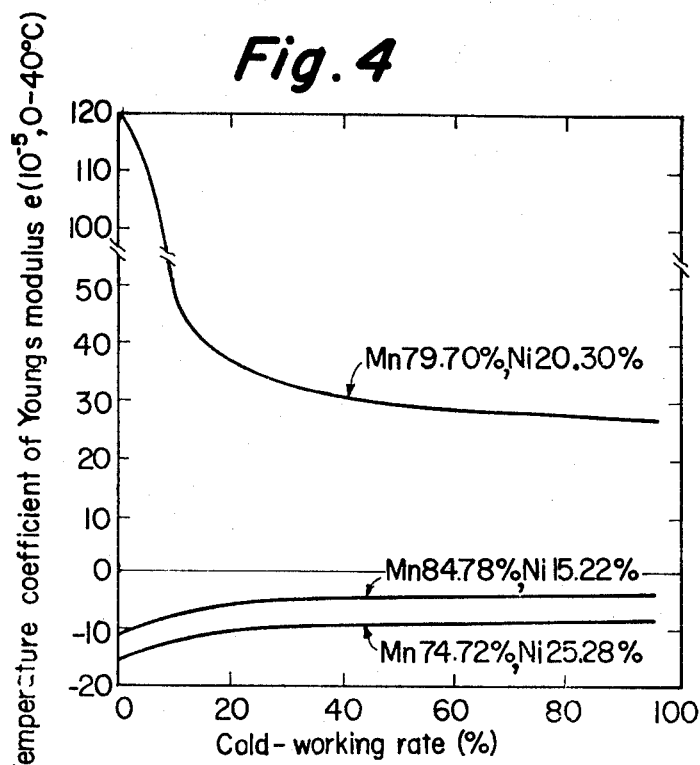
FIG. 4 is a graph, illustrating the relation between the working rate of the cold-work on the alloy of the invention and its temperature coefficient of Young's modulus $e$.

FIG. 4 shows the relation between the Young's modulus and the working rate, for three different binary alloys of the invention. Table 2 shows the temperature coefficient of Young's modulus of the alloys of FIG. 4, for different cooling speeds.

In FIGS. 7A to 7G and 8A to 8G, the mean temperature coefficients of Young's modulus $e$ refer to the values between 0° C. to 40° C., and the Vickers hardness indicates the values at room temperature.

Figure 9A:
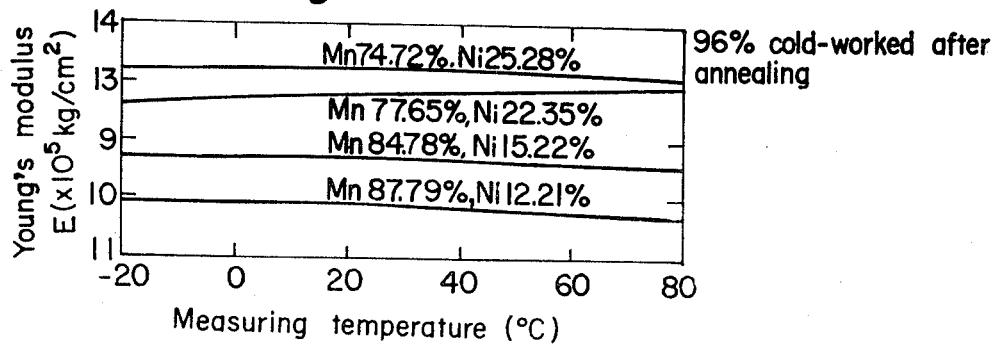
FIGS. 9A to 9E are graphs showing the Young's modulus of manganese-nickel binary alloys of the invention at different temperatures, which alloys are cold-worked after annealing and tempered.
Figure 9B:
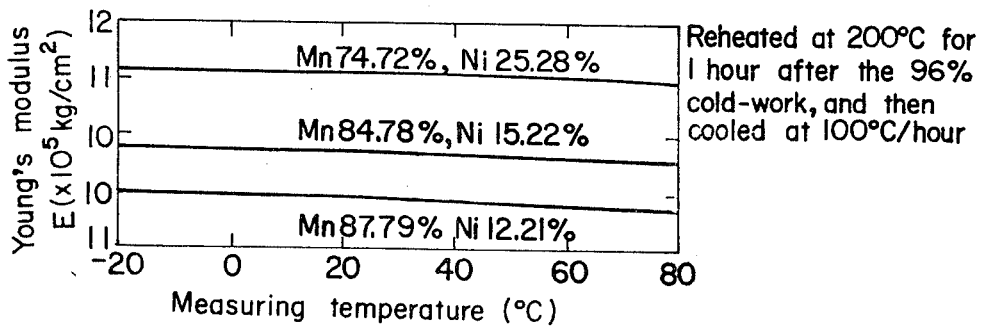
Figure 9C:
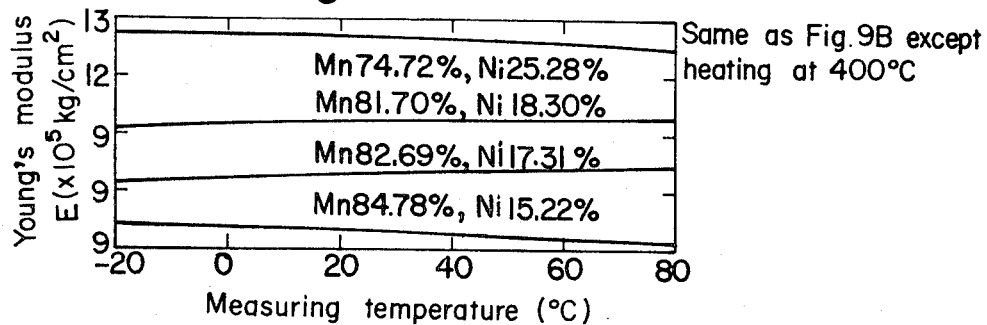
Figure 9D:
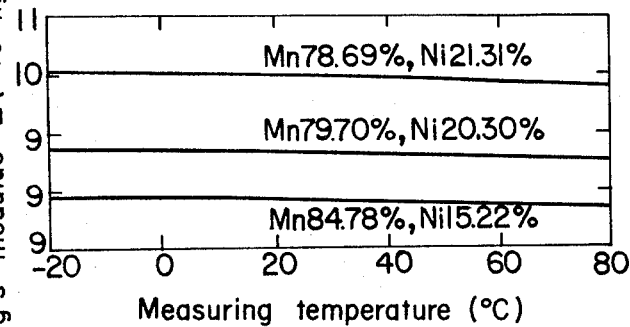
Figure 9E:
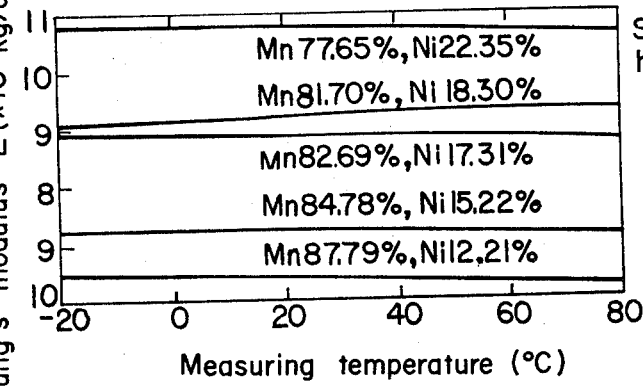

FIG. 9A shows the values of Young's modulus of three different binary alloys of the invention, for the state as cold-worked (B) with a working rate of 96% after the aforesaid annealing (A), which annealing was carried out by heating the alloy at 950° C. for 1 hour and cooling at a speed of 100° C./hour. FIGS. 9B to 9D show the values of Young's modulus of the same alloys for the state as tempered (B') following the last referred cold-work (B); namely, the alloys were reheated at the specified temperatures for 1 hour and then cooled at a speed of 100° C./hour.

TABLE 2
Relation between mean temperature coefficient of Young's modulus $e$, 0° C. to 40° C. and cooling speed.

| Alloys composition | | Cooling speed after heating at 950° C. for 1 hour | | | | |
|---|---|---|---|---|---|---|
| Mn (percent) | Ni (percent) | 170° C./sec. (water quenched) | 9° C./sec. (air quenched) | 500° C./hour (annealed) | 100° C./hour (annealed) | 10° C./hour (annealed) |
| 84.78 | 15.22 | $-40.05 \times 10^{-5}$ | $-29.00 \times 10^{-5}$ | $-14.70 \times 10^{-5}$ | $-10.50 \times 10^{-5}$ | $-9.50 \times 10^{-5}$ |
| 79.70 | 20.30 | $+139.40 \times 10^{-5}$ | $+132.00 \times 10^{-5}$ | $+122.00 \times 10^{-5}$ | $+119.50 \times 10^{-5}$ | $+116.20 \times 10^{-5}$ |
| 74.72 | 25.28 | $-38.00 \times 10^{-5}$ | $-22.15 \times 10^{-5}$ | $-16.50 \times 10^{-5}$ | $-14.50 \times 10^{-5}$ | $-14.00 \times 10^{-5}$ |

Figure 5:
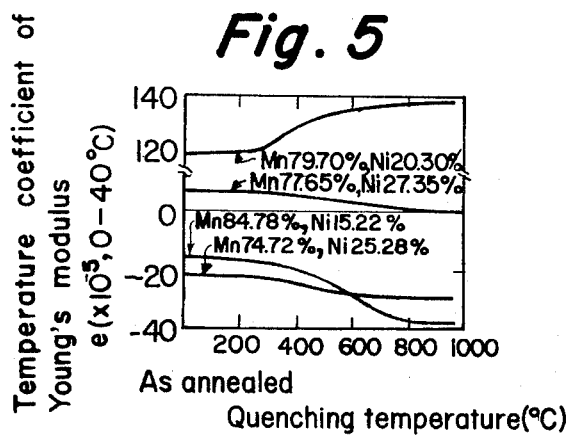
FIG. 5 is a graph showing the effects of variation of quenching temperature on the mean temperature coefficient of Young's modulus $e$ of the alloy between 0° C and 40° C.

FIG. 5 illustrates the relation between the temperature coefficient of Young's modulus of four different binary alloys of the invention and the quenching temperature thereof.

Figure 6:
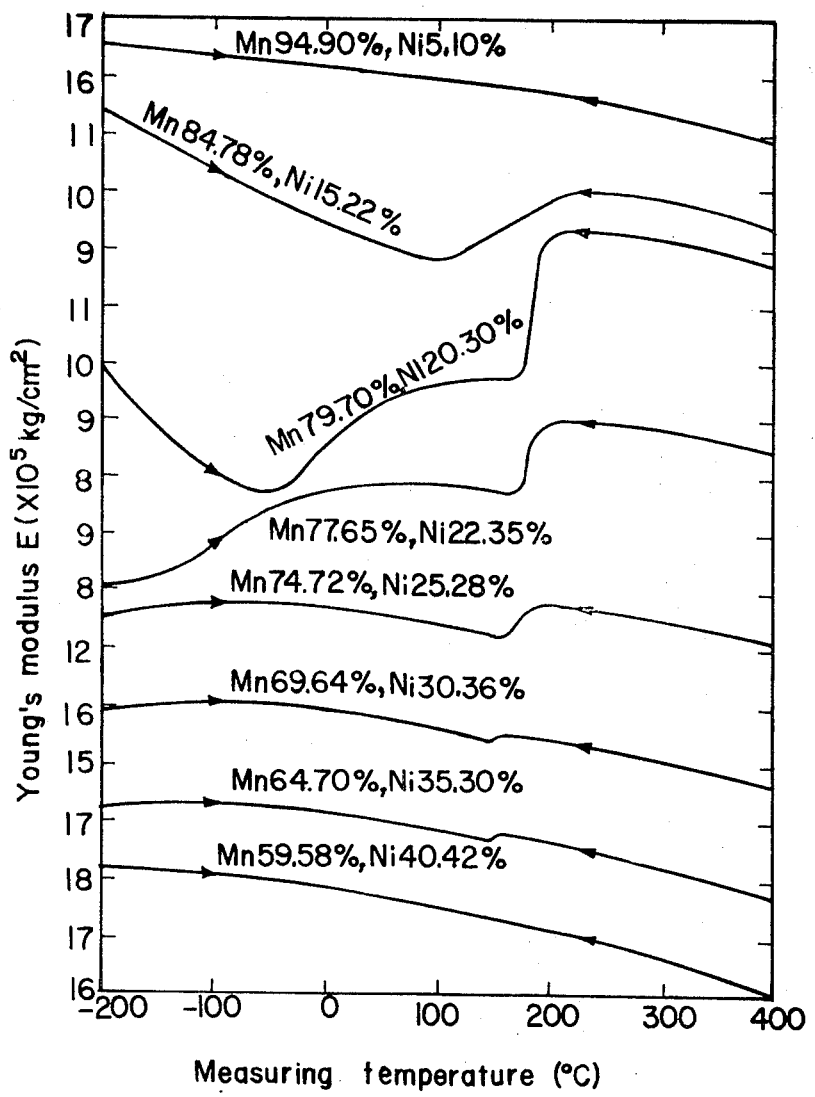
FIG. 6 is a graph showing the variation with temperature in Young's modulus of the alloys of the invention, with eight different compositions, which alloys are heated at 950° C. for 1 hour and annealed by cooling at a rate of 100° C./hour.
Figure 7A:
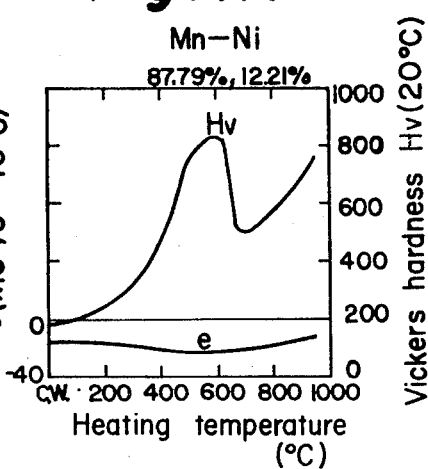
Figure 7B:
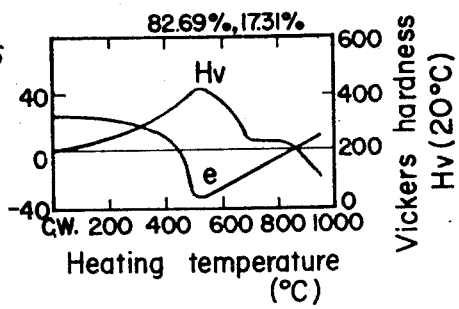
Figure 7F:
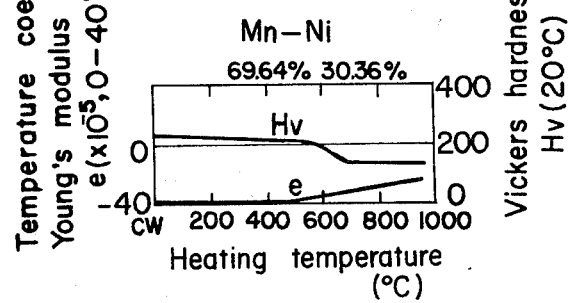
Figure 7G:
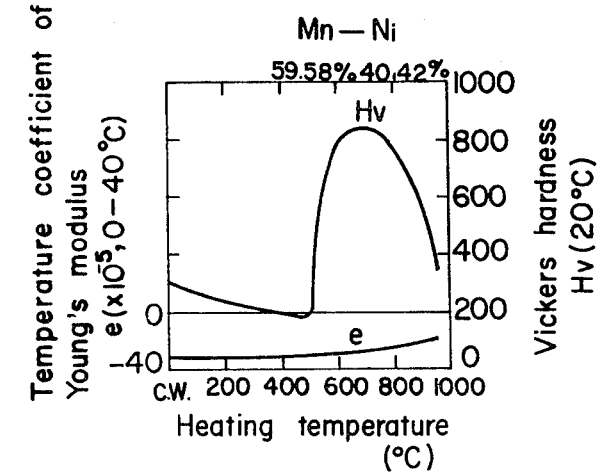
Figure 8A:
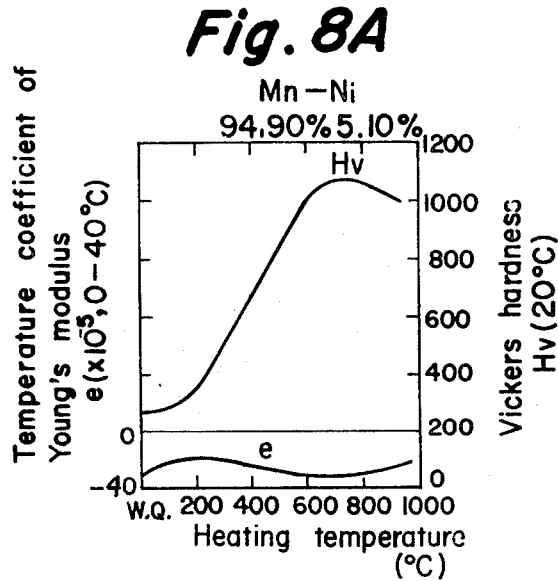
FIGS. 8A to 8G are graphs similar to FIGS. 7A to 7G, except that the alloys are quenched instead of the cold-work prior to the tempering.
Figure 8B:
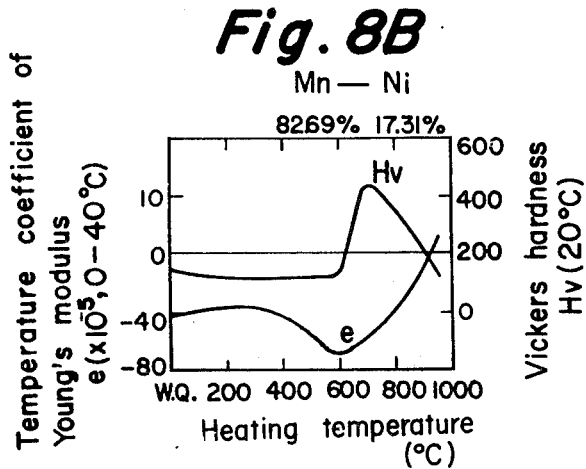
Figure 8C:
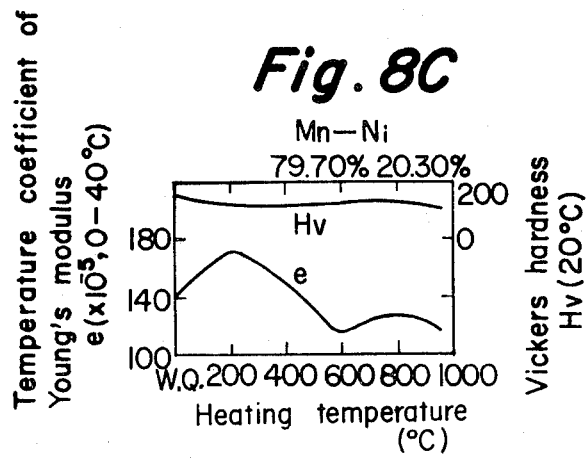
Figure 8D:
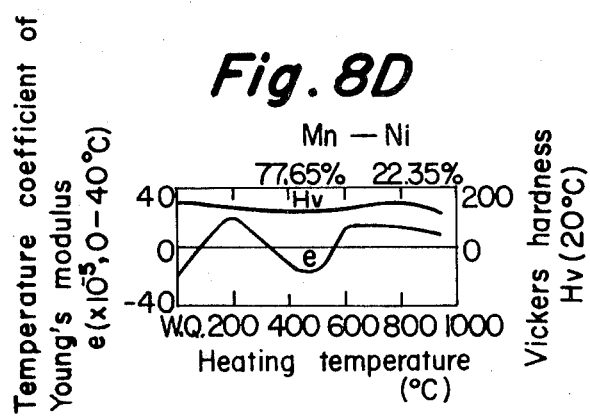
Figure 8E:
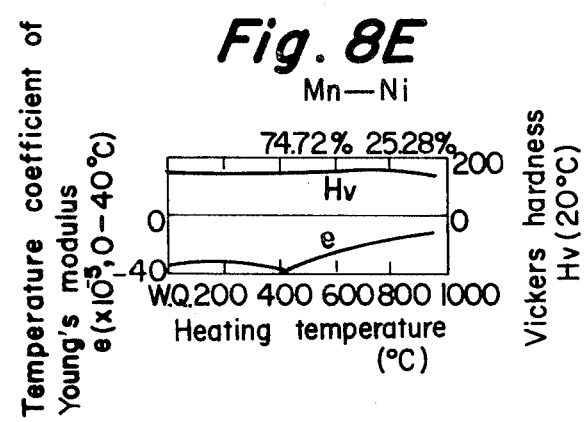
Figure 8F:
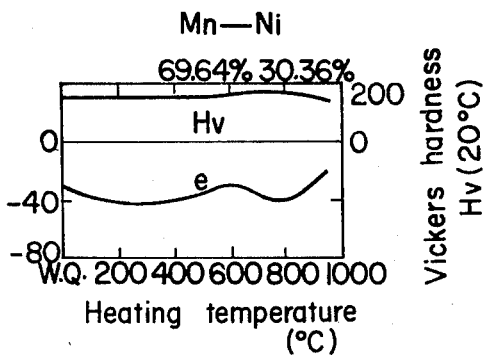
Figure 8G:
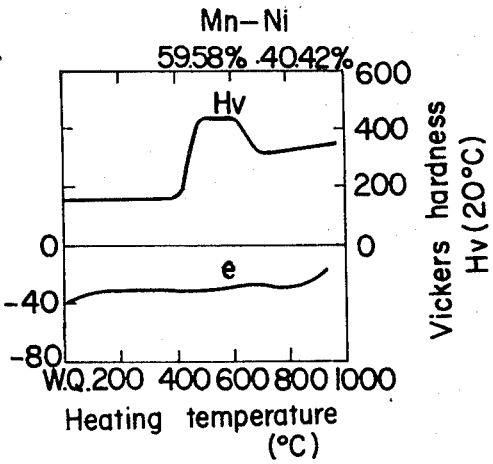

FIG. 6 shows the values of Young's modulus at different temperatures of binary alloys of the invention, in the aforesaid annealed state (A) prepared by cooling at 100° C./hour after heating at 950° C. for 1 hour.

Table 3 shows the temperature coefficient of Young's modulus of the alloys of FIG. 6, as determined from the values of Young's modulus in the figure. Table 3 shows only those temperature coefficients, which fall in a range between $-20 \times 10^{-5}$ to $+20 \times 10^{-5}$, together with temperature ranges wherein the temperature coefficients are valid.

FIGS. 10A to 10C illustrate the values of Young's modulus of two different binary alloys of the invention at different temperatures. FIGS. 10A to 10C refer to three different states of the alloys; namely, as water quenched (C) after being annealed (A) by cooling at a speed of 100° C./hour upon completion of heating at 950° C. for 1 hour, as tempered (C') by reheating the alloys of the state (C) at 400° C. for 1 hour and cooling at a speed of 100° C./hour, and as tempered (C') by reheating the alloys of the state (C) at 80° C. for 1 hour and cooling at a speed of 100° C./hour.

As can be seen from FIGS. 2A and 2B, manganese-nickel binary alloys consisting of 55 to 100 wt. percent of manganese and 0 to 45 wt. percent of nickel have temperature coefficients of Young's modulus $e$ ranging TABLE 3
Mean temperature coefficient of Young's modulus $e$ at different temperature ranges

| Alloy composition | | Temperature coefficient of Young's moduls $e (\times 10^{-5})$ (temperature range) | | |
|---|---|---|---|---|
| Mn (percent) | Ni (percent) | | | |
| 84.78 | 15.22 | 0.0 (75–110° C.) | +7.5 (210–270° C.) | |
| 79.70 | 20.30 | 0.0 (−60––50° C.) | 0.0 (125–160° C.) | −2.0 (210–250° C.) |
| 77.65 | 22.25 | 0.0 (50–150° C.) | −5.0 (160–170° C.) | −5.0 (220–250° C.) |
| 74.72 | 25.28 | −2.5 (−100–0° C.) | 0.0 (190–200° C.) | |
| 69.64 | 30.36 | 0.0 (−125––50° C.) | −3.5 (160–170° C.) | |
| 64.70 | 35.30 | 0.0 (−150––25° C.) | −15.0 (25–75° C.) | |

FIGS. 7A to 7G show the effects of the heating temperature for tempering treatment (B') after the cold-work (B) on the mean temperature coefficient of Young's modulus $e$ and the Vickers hardness Hv, for different binary alloys of the present invention. The alloys of the figures were subjected to cold-work with a working rate of 96%, and then heated at the specified temperature for 1 hour before being cooled at a speed of 100° C./hour.

FIGS. 8A to 8G show the effects of the heating temperature for tempering treatment (C') after the water quenching (C) on the mean temperature coefficient of Young's modulus $e$ and the Vickers hardness Hv for different binary alloys of the invention. The alloys of the figures were heated at 950° C. for 1 hour and water quenched, and then reheated at the specified temperatures prior to cooling at a speed of 100° C./hour.

from a comparatively large negative value to a comparatively large positive value, depending on the composition of the alloys, in any of the states as annealed (A), as cold-worked (B) with a working rate of 96% after the annealing, and as tempered (B') after the cold-work. Accordingly, those Mn-Ni alloys, whose temperature coefficient of Young's modulus $e$ falls in a narrow range crossing the zero line between a negative value domain and a positive value domain, have the so-called Elinvar characteristics or temperature-independent elasticity.

FIGS. 2A and 2B also show that both the Young's modulus E and the modulus of rigidity of such binary alloys vary considerably extensively depending on the heat treatment applied thereto.

FIGS. 3A and 3B show that the water quenching (C)

and the tempering (C') after the water quenching also cause a considerably extensive variation of the physical properties of the manganese-nickel binary alloys consisting of 55 to 100 wt. percent of manganese and 0 to 45 wt. percent of nickel, which physical properties include the temperature coefficient of Young's modulus $e$, the Young's modulus E per se, and the Vickers hardness Hv. Such variation also includes the so-called Elinvar characteristics over a wide range of the composition of the binary alloys.

In the case of FIGS. 2A and 2B, the working rate for the cold-work process was 96%. FIG. 4 illustrates the effects of different working rates, or different degrees of cold-work, on the temperature coefficient of Young's modulus $e$, for three different binary alloys of the invention. As can be seen from the figure, the temperature coefficient of Young's modulus of the alloys according to the invention can be improved by cold-work, even by slight cold-work with a working rate as small as 1%.

In the case of the heat treatments of FIGS. 3A and 3B, the annealing was carried out by cooling at a speed of 10° C./hour after heating at 950° C. for 1 hour, while the quenching was effected by using water cooling from 950° C. Table 2 and FIG. 5 show how the temperature coefficient of Young's modulus $e$ is affected by variation of the cooling speed and the quenching temperature. It is apparent from Table 2 and FIG. 5 that the temperature coefficient $e$ is greatly affected by the cooling speed and the quenching temperature.

Since the physical properties of the alloys of the invention are greatly affected by the working rate of cold-work, the quenching temperature, and the cooling speed, the shape of the curves of FIGS. 2A and 2B and FIGS. 3A and 3B may well be greatly changed if the working rate, quenching temperature, and/or the cooling speed are changed from those on which the curves of the figures are based.

EXAMPLE 2

Ingredients of different samples (each weighing about 500 grams) of manganese-chromium-nickel ternary alloys of the invention, consisting of 40 wt. percent or less of nickel, 32 wt. percent or less of chromium, and 40 to 91 wt. percent of manganese, were melted in alumina crucible, which were disposed in a high-frequency induction furnace or an electric resistance furnace, while passing argon gas therethrough. The molten ingredients were thoroughly agitated, and poured into iron moulds, for producing cylindrical ingots of about 10 mm. dia.

The ingots thus produced were heated at 950° C. for 1 hour and cooled at a speed of 100° C./hour, and swaged at room temperature into round rods of about 2 mm. dia. with a working rate of 96%, i.e., the cross sectional area of the ingots was reduced by 96%. The round rods were cut into about 11 cm. long specimens, which were used for the measurement of the effects of the aforesaid cold-work of the process (B).

Some of the about 11 cm. long specimens of about 2 mm. dia. were heated at 950° C. for 1 hour. It is known to those skilled in the art that, as far as the resiliency of alloys is concerned, such heating at a solution treatment temperature (e.g., 950° C.) for 1 hour brings the alloy structure to a condition prior to the cold-work of the process (B). Accordingly, the ensuing slow cooling of the metal thus heated may result in the aforesaid annealing of the process (A), and the ensuing quick water cooling of the metal thus heated may result in the aforesaid water quenching of the process (C).

Thus, the about 11 cm. long specimens of about 2 mm. dia. were divided into two groups after the heating at 950° C. The first group specimens were annealed by cooling at a speed of 100° C./hour, which were used for the measurement of the effects of the aforesaid annealing of the process (A). The second group specimens were water quenched for th measurement of the effects of the aforesaid water quenching of the process (C).

Some of the aforesaid specimens subjected to the cold-work of the process (B) and the quenching of the process (C) were again heated at various temperatures below 950° C. for 1 hour, and cooled at a speed of 100° C./hour, so as to provide specimens for the measurement of the effects of the tempering treatment of the processes (B') and (C'), respectively.

The Young's modulus of the specimens was determined by measuring the resonant frequency thereof by a device having a sensitive electrostatic capacitor, and calculating the Young's modulus from the resonant frequency thus measured.

The coefficient of linear expansion $\alpha$ of the specimens in the proximity of room temperature was measured by using a precision linear dilatometer of vertical type.

Figure 11:
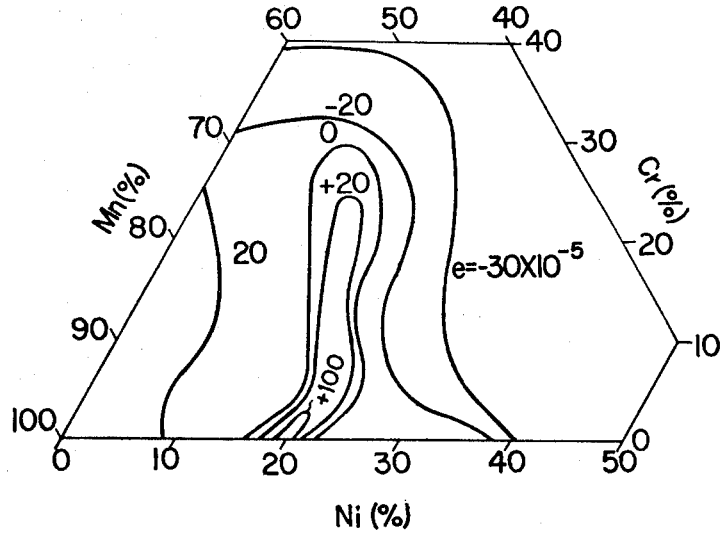
FIG. 11 is a diagram showing the relation between the compositions of manganese-nickel-chromium ternary alloys of the invention and mean temperature coefficients of Young's modulus $e$ thereof between 0° C. to 40° C., for the state as annealed.

FIG. 11 shows the relation between the composition of the manganese-nickel-chromium ternary alloy and the mean temperature coefficient of Young's modulus $e$ thereof between 0° C. to 40° C. in the state as annealed by the process (A).

Figure 12A:
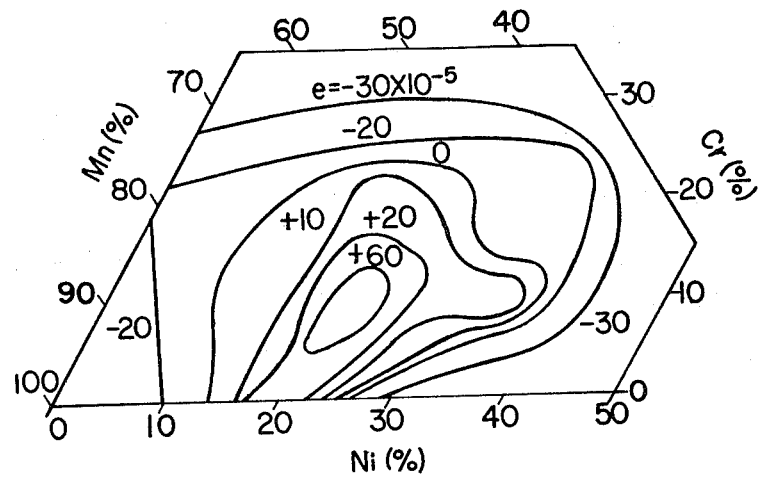
FIGS. 12A to 12D are diagrams similar to FIG. 11, showing the relation between the compositions of manganese-nickel-chromium ternary alloys of the invention and mean temperature coefficient of Young's modulus $e$ thereof between 0° C. to 40° C. for the state as cold-worked and for the state as tempered under different conditions after the cold-work.
Figure 12B:
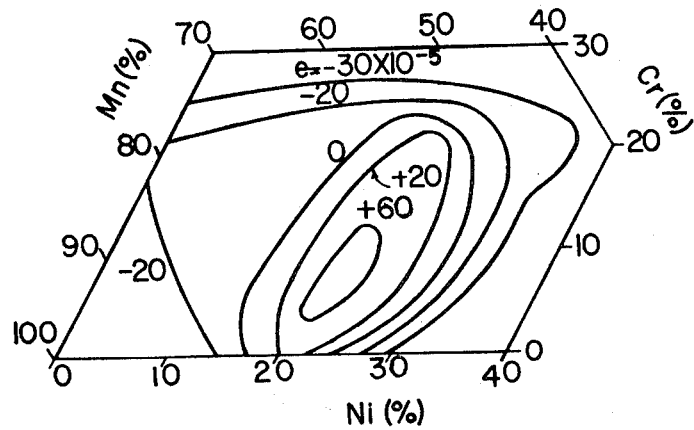
Figure 12C:
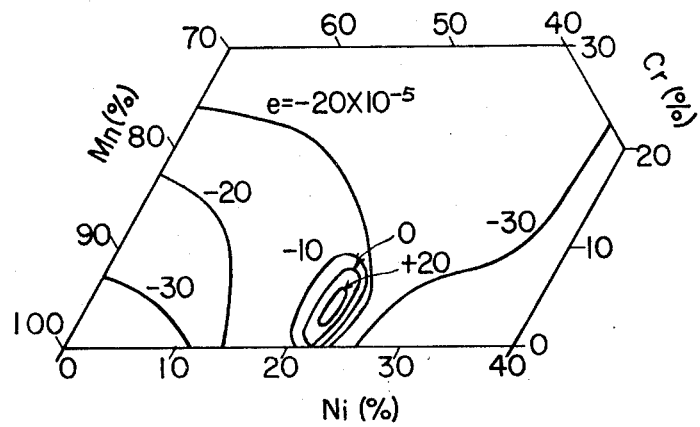
Figure 12D:
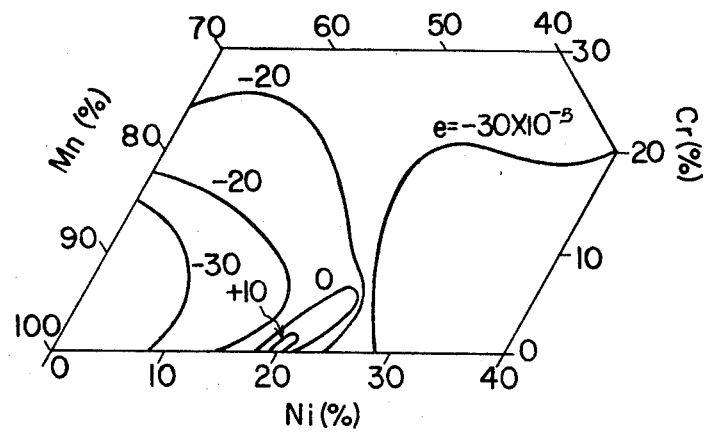

FIG. 12A shows the relation between the composition of the manganese-nickel-chromium ternary alloy and the mean temperature coefficient of Young's modulus $e$ thereof, 0° C. to 40° C., for the state as cold-worked (B) after the annealing. FIGS. 12B to 12D show similar relations for the same alloy for the states as tempered (B') by cooling at a speed of 100° C./hour after heating at different temperatures for one hour, respectively.

Figure 13A:
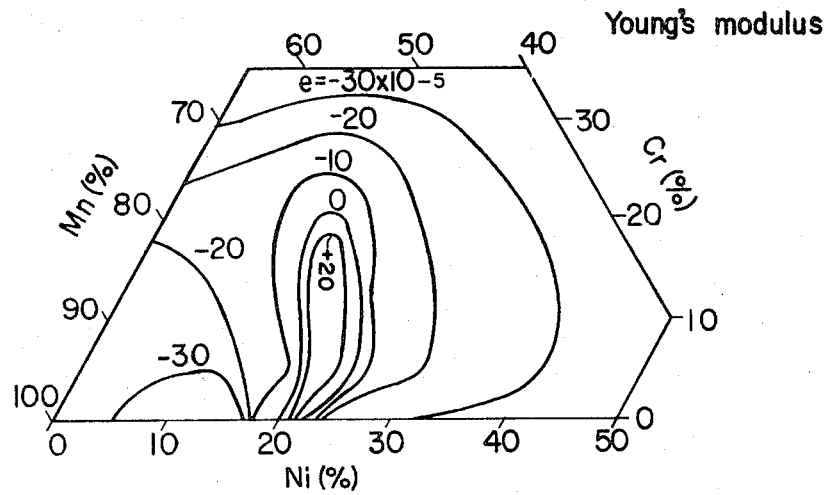
FIGS. 13A to 13D are diagrams similar to FIG. 11, showing the relation between the compositions of manganese-nickel-chromium ternary alloys of the invention and the mean temperature coefficients of Young's modulus thereof, for the state as water quenched and for the state as tempered under different conditions after the water-quenching.
Figure 13B:
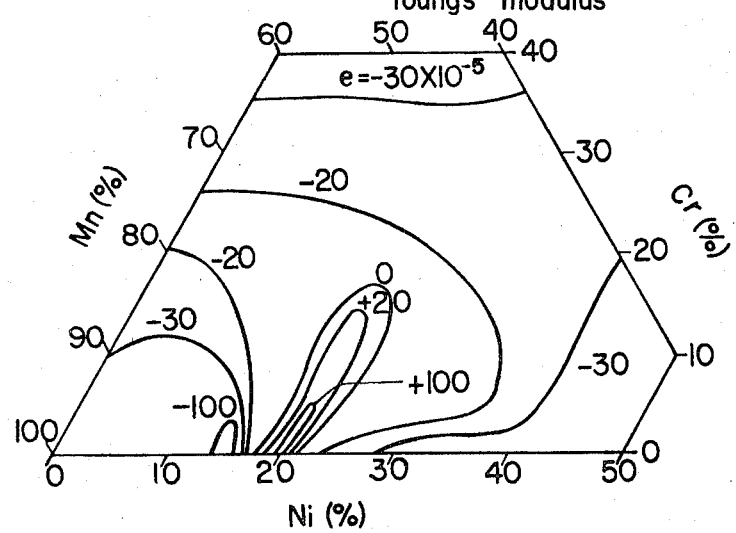
Figure 13C:
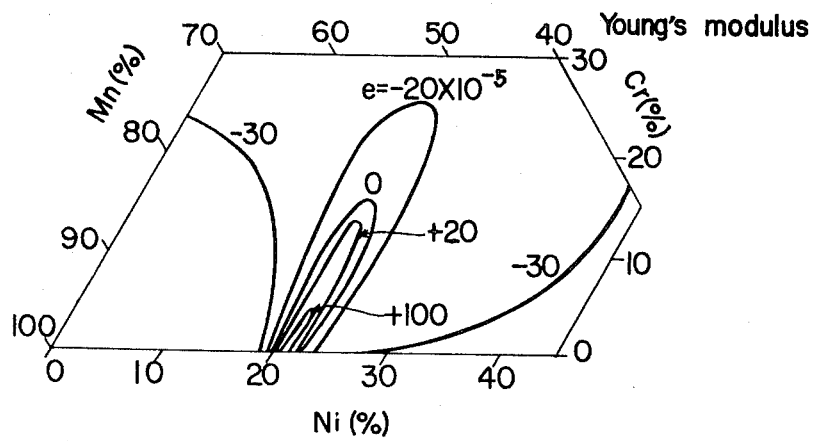
Figure 13D:
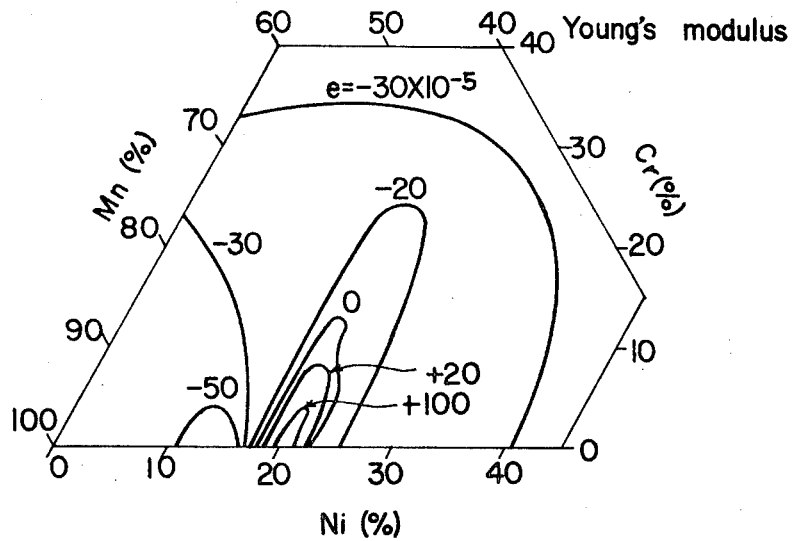

FIG. 13A shows the similar relation for the same manganese-nickel-chromium ternary alloy for the state as water quenched (C) after the annealing. FIGS. 13B to 13D show similar relations for the same alloy for the state as tempered (C') by cooling at a speed of 100° C./hour after heating for one hour at different temperatures, respectively.

Tables 4, 5, and 6 summarize typical measured values of physical properties, inclusive of Vickers hardness, of the manganese-nickel-chorium alloys having compositions of the present invention.

TABLE 4

Properties of Mn-Ni-Cr alloys as annealed by cooling at a speed of 100° C./hour after heating at 950° C. for 1 hour

| Alloy composition | | | Young's modulus (kg./cm.$^2$, 20° C.) | Temperature coefficient of Young's modulus $e$, (0 to 40° C.) | Modulus of rigidity (kg./cm.$^2$, 20° C.) | Temperature coefficient of modulus of rigidity (0 to 40° C.) | Vickers hardness (20° C.) |
|---|---|---|---|---|---|---|---|
| Mn (percent) | Ni (percent) | Cr (percent) | | | | | |
| 69.89 | 10.01 | 20.10 | 15.55×10$^5$ | −16.15×10$^{-5}$ | 5.21×10$^5$ | −16.45×10$^{-5}$ | 431 |
| 59.90 | 10.02 | 30.08 | 17.53×10$^5$ | −5.10×10$^{-5}$ | 5.36×10$^5$ | −5.30×10$^{-5}$ | 405 |
| 74.90 | 15.02 | 10.08 | 13.45×10$^5$ | −10.23×10$^{-5}$ | 4.63×10$^5$ | −10.55×10$^{-5}$ | 205 |
| 58.72 | 16.08 | 25.20 | 16.52×10$^5$ | +0.85×10$^{-5}$ | 5.31×10$^5$ | +0.83×10$^{-5}$ | 250 |
| 79.87 | 18.03 | 2.10 | 9.20×10$^5$ | −1.55×10$^{-5}$ | 4.77×10$^5$ | −1.60×10$^{-5}$ | 100 |
| 64.82 | 20.10 | 15.08 | 14.44×10$^5$ | −14.30×10$^{-5}$ | 5.15×10$^5$ | −14.27×10$^{-5}$ | 233 |
| 68.90 | 21.08 | 10.02 | 13.50×10$^5$ | 0.00×10$^{-5}$ | 4.64×10$^5$ | −0.97×10$^{-5}$ | 185 |
| 73.88 | 24.09 | 2.03 | 14.40×10$^5$ | −0.55×10$^{-5}$ | 5.12×10$^5$ | −0.52×10$^{-5}$ | 130 |

TABLE 5
Properties of Mn-Ni-Cr alloys, as water quenched and as tempered after water quenching

| Alloy composition | | | Young's modulus (kg./cm.$^2$, 20° C.) | Temperature coefficient of Young's modulus $e$, (0 to 40° C.) | Modulus of rigidity (kg./cm.$^2$, 20° C.) | Temperature coefficient of modulus of rigidity (0 to 40° C.) | Vickers hardness (20° C.) |
|---|---|---|---|---|---|---|---|
| Mn (percent) | Ni (percent) | Cr (percent) | | | | | |
| As water quenched after heating at 950° C. for 1 hour after annealing of Table 4 | | | | | | | |
| 69.97 | 10.01 | 20.02 | 16.35×10$^5$ | −11.20×10$^{-5}$ | 5.02×10$^5$ | −11.42×10$^{-5}$ | 429 |
| 60.93 | 15.03 | 24.04 | 17.62×10$^5$ | −12.55×10$^{-5}$ | 5.11×10$^5$ | −12.68×10$^{-5}$ | 300 |
| 79.96 | 16.02 | 4.02 | 9.20×10$^5$ | −18.55×10$^{-5}$ | 4.75×10$^5$ | −18.63×10$^{-5}$ | 175 |
| 72.94 | 17.01 | 10.05 | 11.20×10$^5$ | −3.50×10$^{-5}$ | 4.80×10$^5$ | −4.11×10$^{-5}$ | 185 |
| 64.93 | 20.03 | 15.04 | 12.45×10$^5$ | −4.43×10$^{-5}$ | 4.85×10$^5$ | −5.06×10$^{-5}$ | 203 |
| 66.94 | 21.05 | 12.01 | 9.60×10$^5$ | +10.56×10$^{-5}$ | 4.76×10$^5$ | +10.03×10$^{-5}$ | 185 |
| 70.93 | 24.05 | 5.02 | 11.55×10$^5$ | +8.32×10$^{-5}$ | 4.83×10$^5$ | +4.86×10$^{-5}$ | 160 |
| 64.91 | 30.07 | 5.02 | 15.14×10$^5$ | −15.46×10$^{-5}$ | 4.96×10$^5$ | 15.94×10$^{-5}$ | 154 |
| As tempered by cooling at 100° C./hour after heating at 400° C. for 1 hour, following the above referred water quenching | | | | | | | |
| 78.97 | 17.01 | 4.02 | 8.80×10$^5$ | −12.35×10$^{-5}$ | 4.68×10$^5$ | −13.45×10$^{-5}$ | 128 |
| 71.93 | 18.04 | 10.03 | 10.20×10$^5$ | −2.55×10$^{-5}$ | 4.75×10$^5$ | −3.27×10$^{-5}$ | 155 |
| 63.85 | 20.05 | 16.10 | 12.50×10$^5$ | −2.50×10$^{-5}$ | 4.87×10$^5$ | −3.23×10$^{-5}$ | 205 |
| 67.90 | 22.05 | 10.05 | 12.10×10$^5$ | +3.70×10$^{-5}$ | 4.80×10$^5$ | +3.18×10$^{-5}$ | 178 |
| 72.93 | 25.04 | 2.03 | 11.30×10$^5$ | +16.54×10$^{-5}$ | 4.77×10$^5$ | −17.09×10$^{-5}$ | 160 |
| 64.93 | 25.04 | 10.03 | 14.26×10$^5$ | −8.55×10$^{-5}$ | 4.89×10$^5$ | −8.96×10$^{-5}$ | 190 |
| 56.90 | 25.04 | 18.06 | 16.30×10$^5$ | −16.34×10$^{-5}$ | 5.31×10$^5$ | −17.22×10$^{-5}$ | 210 |
| 59.94 | 35.02 | 5.04 | 16.22×10$^5$ | −17.24×10$^{-5}$ | 5.24×10$^5$ | −18.16×10$^{-5}$ | 158 |
| As tempered by cooling at 100° C./hour after heating at 600° C. for 1 hour following the above referred water quenching | | | | | | | |
| 70.95 | 19.02 | 10.03 | 9.80×10$^5$ | +3.35×10$^{-5}$ | 4.78×10$^5$ | +3.00×10$^{-5}$ | 195 |
| 76.95 | 20.03 | 3.02 | 9.22×10$^5$ | +0.40×10$^{-5}$ | 4.72×10$^5$ | +0.65×10$^{-5}$ | 130 |
| 59.92 | 20.04 | 20.04 | 15.98×10$^5$ | −16.45×10$^{-5}$ | 5.37×10$^5$ | −17.14×10$^{-5}$ | 250 |
| 63.97 | 21.01 | 15.02 | 12.99×10$^5$ | −0.56×10$^{1-5}$ | 5.10×10$^5$ | −0.89×10$^{-5}$ | 240 |
| 67.90 | 22.05 | 10.05 | 10.53×10$^5$ | +2.55×10$^{-5}$ | 4.86×10$^5$ | +3.25×10$^{-5}$ | 200 |
| 70.95 | 24.03 | 5.02 | 11.36×10$^5$ | −8.53×10$^{-5}$ | 4.85×10$^5$ | −9.65×10$^{-5}$ | 144 |
| As tempered by cooling at 100° C./hour after heating at 800° C. for 1 hour, following the above referred water quenching | | | | | | | |
| 79.97 | 18.01 | 2.02 | 9.30×10$^5$ | −0.55×10$^{-5}$ | 4.74×10$^5$ | −0.76×10$^{-5}$ | 150 |
| 79.95 | 18.02 | 2.03 | 9.10×10$^5$ | −5.50×10$^{-5}$ | 4.73×10$^5$ | −6.65×10$^{-5}$ | 260 |
| 71.93 | 18.03 | 10.04 | 13.50×10$^5$ | +3.74×10$^{-5}$ | 5.15×10$^5$ | +3.15×10$^5$ | 400 |
| 75.94 | 19.03 | 5.04 | 11.95×10$^5$ | −16.90×10$^{-5}$ | 5.00×10$^5$ | −16.33×10$^{-5}$ | 200 |
| 59.92 | 20.04 | 20.04 | 16.88×10$^5$ | −16.65×10$^{-5}$ | 5.47×10$^5$ | −17.21×10$^{-5}$ | 258 |
| 68.90 | 21.08 | 10.02 | 13.55×10$^5$ | −11.58×10$^{-5}$ | 5.16×10$^5$ | −12.75×10$^{-5}$ | 250 |

TABLE 6
Properties of Mn-Ni-Cr alloys, as cold-worked and as tempered after cold-work

| Alloy composition | | | Young's modulus (kg./cm.$^2$, 20° C.) | Temperature coefficient of Young's modulus $e$, (0 to 40° C.) | Modulus of rigidity (kg./cm.$^2$, 20° C.) | Temperature coefficient of modulus of rigidity (0 to 40° C.) | Vickers hardness (20° C.) |
|---|---|---|---|---|---|---|---|
| Mn (percent) | Ni (percent) | Cr (percent) | | | | | |
| As cold-worked with a working rate of 96% after annealing of Table 4 | | | | | | | |
| 79.91 | 15.03 | 5.06 | 11.44×10$^5$ | +1.85×10$^{-5}$ | 4.88×10$^5$ | +1.65×10$^{-5}$ | 200 |
| 69.95 | 15.03 | 15.02 | 13.35×10$^5$ | −2.53×10$^{-5}$ | 5.00×10$^5$ | −3.36×10$^{-5}$ | 245 |
| 60.93 | 15.03 | 24.04 | 14.40×10$^5$ | −10.65×10$^{-5}$ | 5.09×10$^5$ | −11.15×10$^{-5}$ | 320 |
| 54.93 | 25.05 | 20.02 | 14.18×10$^5$ | −7.10×10$^{-5}$ | 5.08×10$^5$ | −8.22×10$^{-5}$ | 320 |
| 59.95 | 30.04 | 10.01 | 11.23×10$^5$ | −17.25×10$^{-5}$ | 4.87×10$^5$ | −17.65×10$^{-5}$ | 261 |
| 64.91 | 30.07 | 5.02 | 13.50×10$^5$ | −7.30×10$^{-5}$ | 5.02×10$^5$ | −8.22×10$^{-5}$ | 248 |
| 54.91 | 35.06 | 10.03 | 12.50×10$^5$ | +2.73×10$^{-5}$ | 4.95×10$^5$ | +3.36×10$^{-5}$ | 289 |
| 44.84 | 35.08 | 20.08 | 16.50×10$^5$ | −10.44×10$^{-5}$ | 5.23×10$^5$ | −12.22×10$^{-5}$ | 339 |
| As tempered by cooling at 100° C./hour after heating at 400° C. for 1 hour, following the above cold-work | | | | | | | |
| 79.91 | 15.03 | 5.06 | 10.50×10$^5$ | +1.73×10$^{-5}$ | 4.80×10$^5$ | +2.25×10$^{-5}$ | 260 |
| 69.95 | 15.03 | 15.02 | 12.40×10$^5$ | −2.40×10$^{-5}$ | 4.85×10$^5$ | −3.36×10$^{-5}$ | 253 |
| 60.93 | 15.03 | 24.04 | 14.55×10$^5$ | −16.55×10$^{-5}$ | 5.10×10$^5$ | −17.45×10$^{-5}$ | 355 |
| 59.92 | 20.04 | 20.04 | 13.27×10$^5$ | +13.50×10$^{-5}$ | 5.01×10$^5$ | +12.71×10$^{-5}$ | 520 |
| 59.95 | 30.04 | 10.01 | 11.80×10$^5$ | +10.40×10$^{-5}$ | 4.80×10$^5$ | +11.58×10$^{-5}$ | 285 |
| 49.94 | 30.04 | 20.02 | 15.84×10$^5$ | −17.44×10$^{-5}$ | 5.19×10$^5$ | −18.29×10$^{-5}$ | 460 |
| 67.93 | 30.05 | 2.02 | 15.60×10$^5$ | −18.90×10$^{-5}$ | 5.18×10$^5$ | −19.11×10$^{-5}$ | 240 |
| 64.91 | 30.07 | 5.02 | 14.50×10$^5$ | −11.25×10$^{-5}$ | 5.08×10$^5$ | −12.63×10$^{-5}$ | 280 |
| As tempered by cooling at 100° C./hour after heating at 600° C. for 1 hour, following the above cold-work | | | | | | | |
| 79.91 | 15.03 | 5.06 | 10.70×10$^5$ | −14.50×10$^{-5}$ | 4.85×10$^5$ | −15.36×10$^{-5}$ | 320 |
| 69.95 | 15.03 | 15.02 | 12.60×10$^5$ | −15.30×10$^{-5}$ | 5.03×10$^5$ | −16.25×10$^{-5}$ | 400 |
| 69.95 | 20.02 | 10.03 | 13.05×10$^5$ | −14.33×10$^{-5}$ | 5.09×10$^5$ | −15.66×10$^{-5}$ | 350 |
| 74.91 | 20.06 | 5.03 | 11.55×10$^5$ | +7.30×10$^{-5}$ | 4.91×10$^5$ | +6.92×10$^{-5}$ | 220 |
| 70.93 | 24.05 | 5.02 | 13.65×10$^5$ | −13.00×10$^{-5}$ | 5.17×10$^5$ | −14.55×10$^{-5}$ | 290 |
| 73.88 | 24.09 | 2.03 | 13.55×10$^5$ | −11.55×10$^{-5}$ | 5.15×10$^5$ | −12.48×10$^{-5}$ | 255 |
| As tempered by cooling at 100° C./hour after heating at 800° C. for 1 hour, following the above cold-work | | | | | | | |
| 74.90 | 15.02 | 10.08 | 13.54×10$^5$ | −7.25×10$^{-5}$ | 5.15×10$^5$ | −8.25×10$^{-5}$ | 500 |
| 78.89 | 19.10 | 2.01 | 9.30×10$^5$ | −2.56×10$^{-5}$ | 4.22×10$^5$ | −3.36×10$^{-5}$ | 200 |
| 69.95 | 20.02 | 10.03 | 13.27×10$^5$ | −11.00×10$^{-5}$ | 5.10×10$^{13}$ | −12.45×10$^{-5}$ | 500 |
| 71.92 | 23.05 | 5.03 | 12.85×10$^5$ | +6.53×10$^{-5}$ | 5.05×10$^5$ | +5.93×10$^{-5}$ | 200 |
| 73.88 | 24.09 | 2.03 | 12.60×10$^5$ | +2.55×10$^{-5}$ | 5.02×10$^5$ | +3.29×10$^{-5}$ | 155 |

Figure 14:
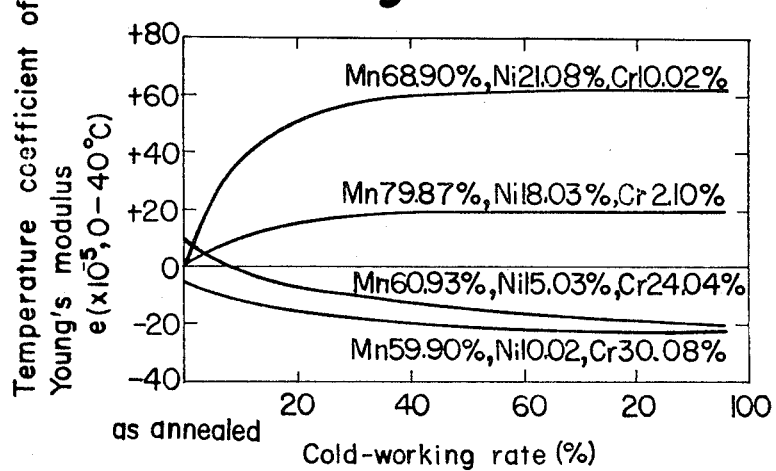
FIG. 14 is a graph illustrating the relation between the mean temperature coefficient of Young's modulus, from 0° C. to 40° C., of four different ternary alloys of the invention and the working rate of cold-work applied thereto.

FIG. 14 illustrates the relation between the working rate of the cold-work and the temperature coefficient of Young's modulus $e$, for four different Mn-Ni-Cr ternary alloys according to the present invention. Table 7 shows the relation between the cooling speed and the temperature coefficient of Young's modulus $e$, 0° C. to 40° C., for the same four different ternary alloys as FIG. 14.

Figure 15:
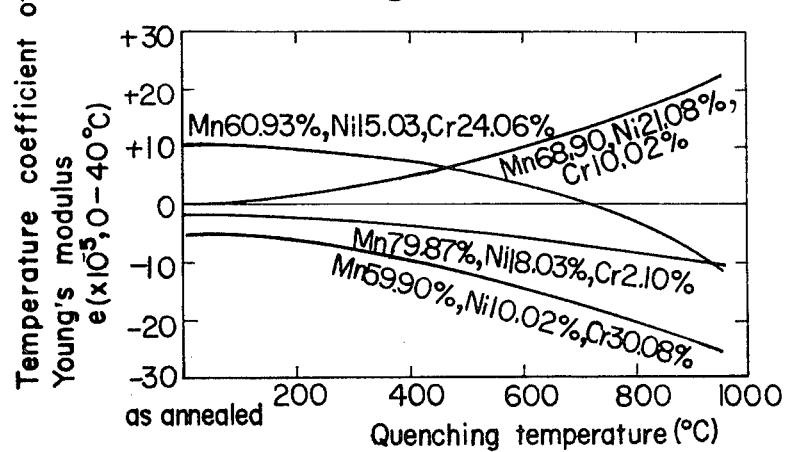
FIG. 15 is a graph illustrating the relation between the mean temperature coefficient of Young's modulus, from 0° C. to 40° C., of four different ternary alloys of the invention and the quenching temperature thereof.

Similarly, FIG. 15 shows the relation between the quenching temperature and the temperature coefficient of Young's modulus $e$, for the same four different alloys of the invention as FIG. 14.

Figure 16:
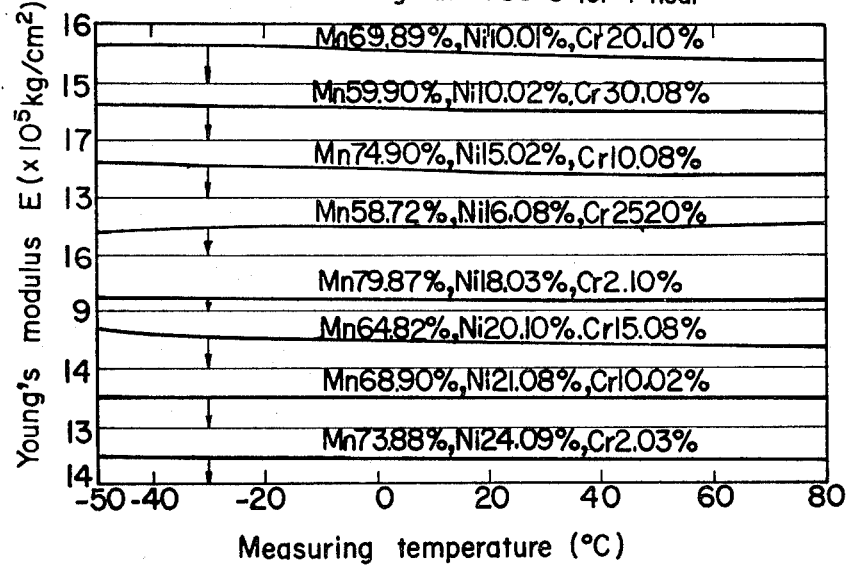
FIG. 16 is a graph showing the Young's modulus of the manganese-nickel-chromium ternary alloy of the invention at different temperatures, with the composition of the ternary alloy as a parameter, for the state as annealed.
Figure 17A:
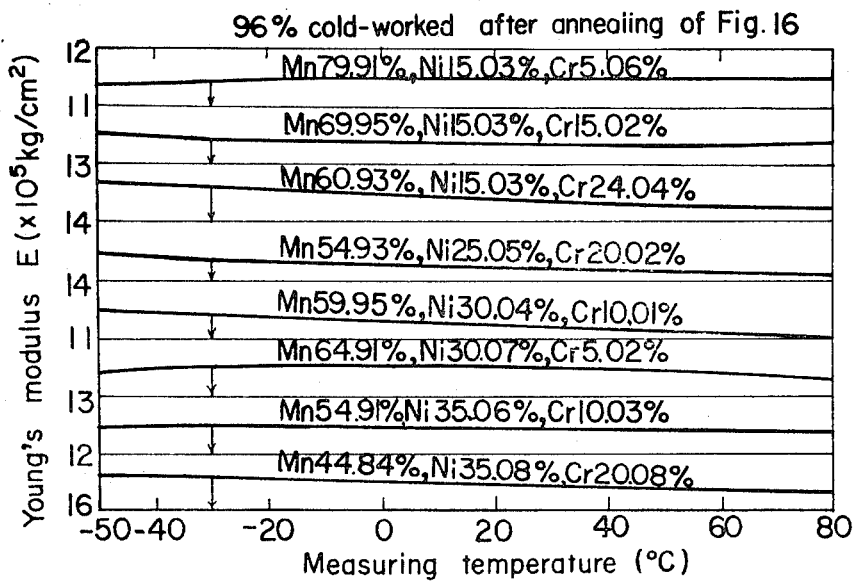
FIGS. 17A to 17D are graphs similar to FIG. 16, illustrating the Young's modulus of the ternary alloys at different temperatures, for the state as cold-worked with a working rate of 96% and for the state as tempered under different conditions after the cold-work.
Figure 17B:
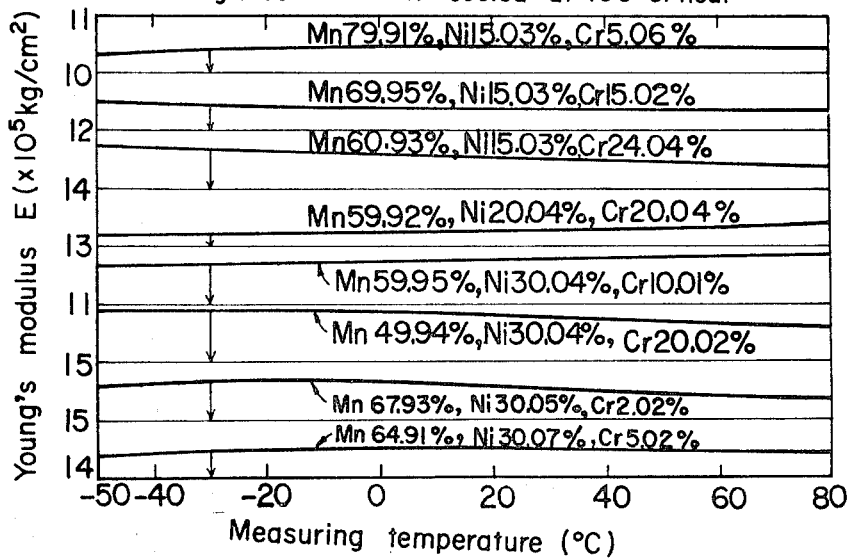
Figure 17C:
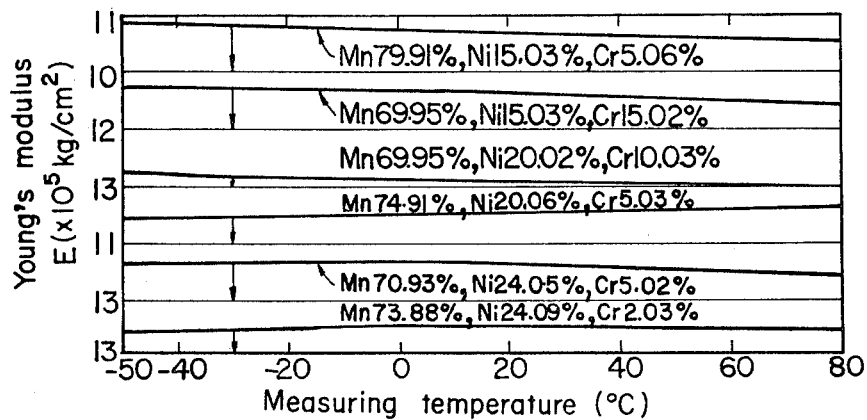
Figure 17D:
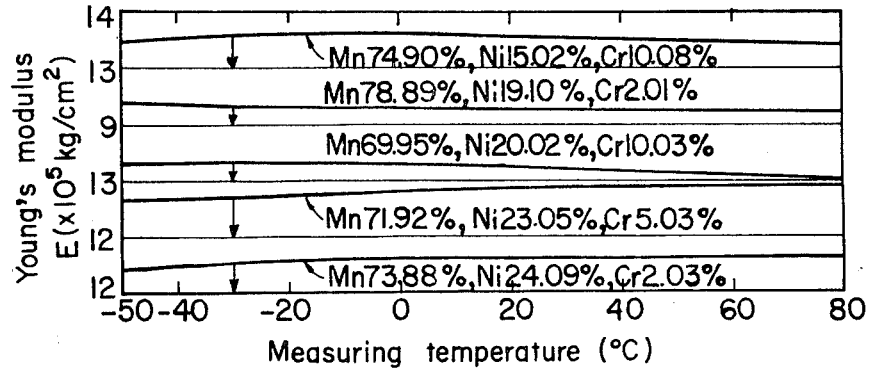
Figure 18A:
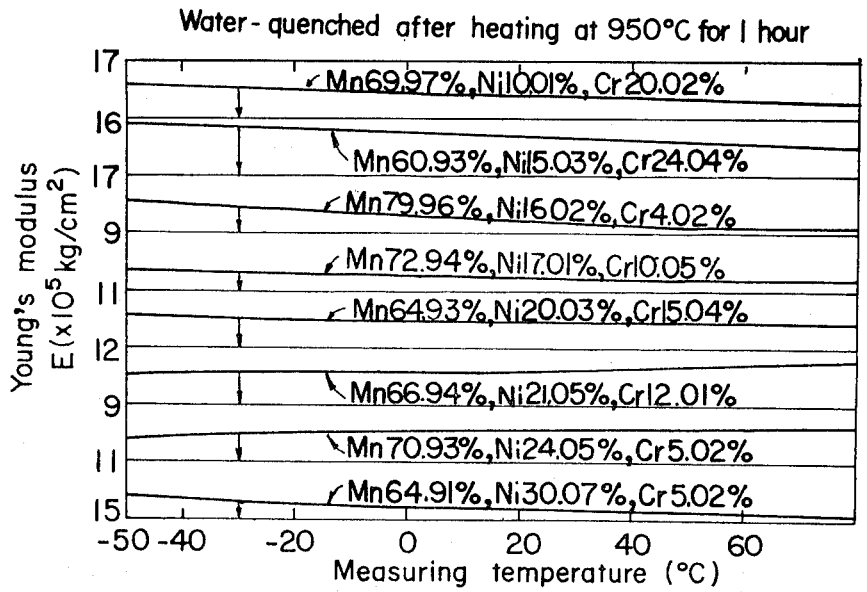
FIGS. 18A to 18D are graphs similar to FIGS. 17A to 17B, respectively, illustrating the Young's modulus of the ternary alloys at different temperatures, for the state as water quenched and for the state as tempered under different conditions after the water quenching.
Figure 18B:
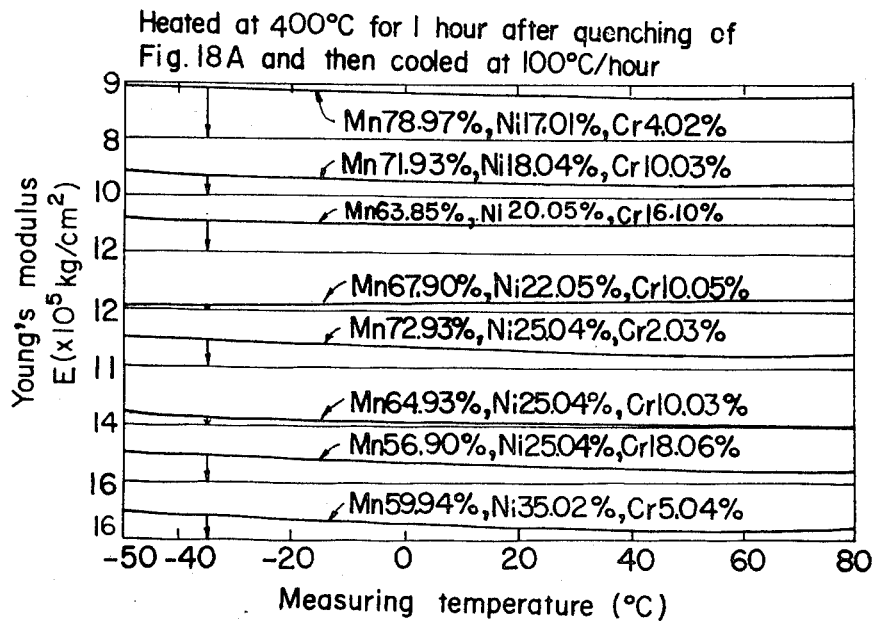
Figure 18C:
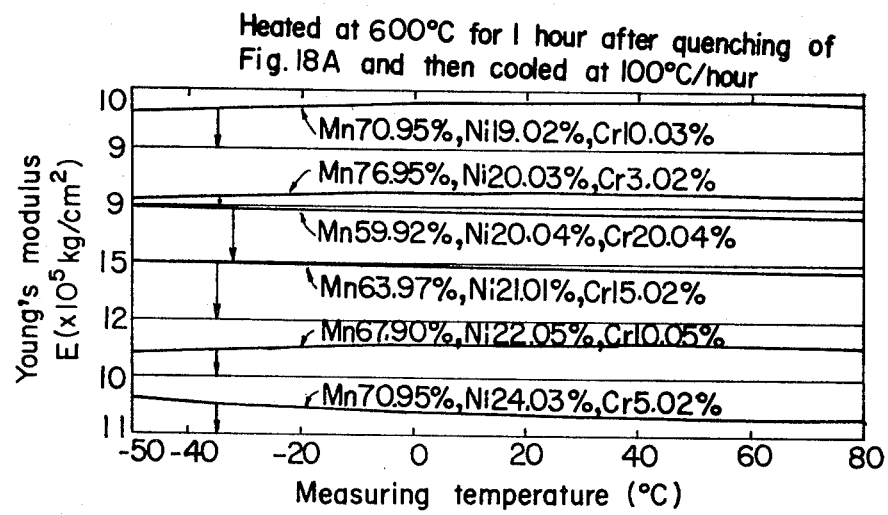
Figure 18D:
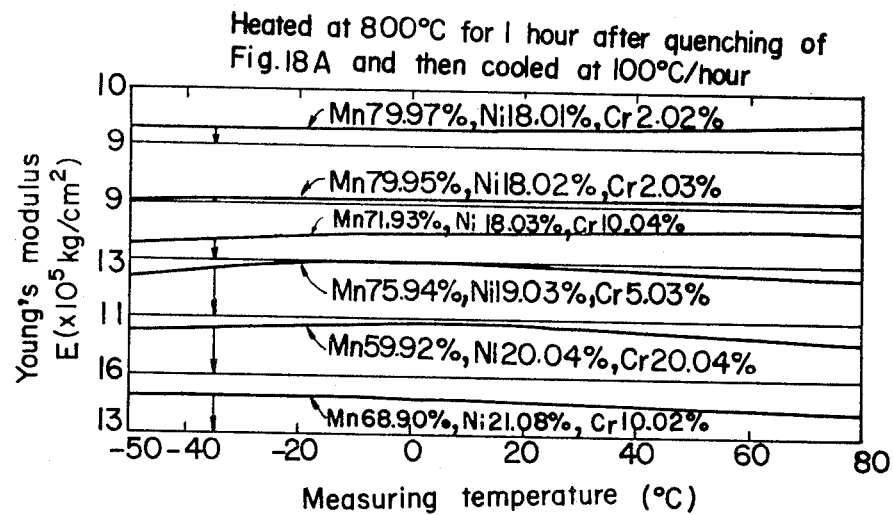

FIG. 16 illustrates the values of Young's modulus at various temperatures from —50° C. to 80° C., for different Mn-Ni-Cr ternary alloys of the invention in the state as annealed by cooling at a speed of 100° C./hour after heating at 950° C. for 1 hour.

FIGS. 17A to 17D show the values of Young's modulus at various temperatures from —50° C. to 80° C., for different Mn-Ni-Cr ternary alloys of the invention in the state as cold-worked with a working rate of 96% after the annealing of FIG. 16 and in the states as tempered by cooling at a speed of 100° C./hour after heating at different temperatures for 1 hour following the above referred cold-work, respectively.

FIGS. 18A to 18D show the values of Young's modulus at various temperatures from —50° C. to 80° C., for different Mn-Ni-Cr ternary alloys of the invention in the state as water quenched after the annealing of FIG. 16 and in the states as tempered by cooling at a speed of 100° C./hour after heating at different temperatures for 1 hour following the above referred water quenching, respectively.

four different ternary alloys of the invention. As can be seen from the figure, the temperature coefficient $e$ of the alloys of the invention can be improved by cold-work, even by slight cold-work with a working rate as small as 1%.

In the case of the heat treatments of FIG. 11 and 13A, the annealing is carried out by cooling at a speed of 100° C./hour after heating at 950° C. for 1 hour, while the quenching is effected by water cooling from 950° C. to room temperature. Table 7 and FIG. 15 show how the temperature coefficient of Young's modulus $e$ is affected by variation of the cooling speed and the quenching temperature. It is apparent from Table 7 and FIG. 15 that the temperature coefficient $e$ is greatly affected by the cooling speed and the quenching temperature.

Since the physical properties of the alloys of the invention are greatly affected by the working rate of cold-work, the quenching temperature, and the cooling speed, the shape of the curves of FIGS. 12A to 12D and FIGS. 13A to 13D may well be greatly changed if the working rate, quenching temperature, and/or the cooling speed are changed from those on which the curves of the figures are based.

EXAMPLE 3

Ingredients of different samples (each weighing about 500 grams) of manganese-nickel-iron and manganese-nickel-cobalt ternary alloys of the invention, consisting of 60 to 95 wt. percent of manganese, 40 wt. percent or less of nickel, and either 30 wt. percent or less of iron or 20 wt. percent or less of cobalt (for instance, as shown in Table 8), were melted in alumina crucibles, which were

TABLE 7

Relation between cooling speed and temperature coefficient of Young's modulus $e$, 0° C. to 40° C., for Mn-Ni-Cr alloys

| Alloy composition | | | Cooling speed after heating at 950° C. for 1 hour | | | | |
|---|---|---|---|---|---|---|---|
| Mn (percent) | Ni (percent) | Cr (percent) | 170° C./sec. (water quenched) | 9° C./sec. (air quenched) | 500° C./hour (annealed) | 100° C./hour (annealed) | 10° C./hour (annealed) |
| 59.90 | 10.02 | 30.08 | —25.20×10⁻⁵ | —23.70×10⁻⁵ | —7.20×10⁻⁵ | —5.10×10⁻⁵ | —3.50×10⁻⁵ |
| 60.93 | 15.03 | 24.04 | —11.50×10⁻⁵ | —10.00×10⁻⁵ | —7.10×10⁻⁵ | +13.50×10⁻⁵ | +14.03×10⁻⁵ |
| 79.87 | 18.03 | 2.10 | —10.10×10⁻⁵ | —9.60×10⁻⁵ | —5.30×10⁻⁵ | —1.55×10⁻⁵ | —1.22×10⁻⁵ |
| 68.90 | 21.08 | 10.02 | +22.00×10⁻⁵ | +20.10×10⁻⁵ | +2.50×10⁻⁵ | 0.00×10⁻⁵ | —0.30×10⁻⁵ |

As can be seen from FIG. 11 and FIGS. 12A to 12D, manganese-nickel-chromium ternary alloys consisting of up to 40 wt. percent of nickel, up to 32 wt. percent of chromium, and 40 to 91 wt. percent, of manganese have temperature coefficients of Young's modulus $e$ ranging from a comparatively large negative value to a comparatively large positive value, depending on the composition of the alloys, in any of the states as annealed (A), as cold-worked (B) with a working rate of 96% after the annealing, and as tempered (B') after the cold-work. Accordingly, those Mn-Ni-Cr alloys, whose temperature coefficient of Young's modulus $e$ falls in a narrow range crossing the zero line between a negative value domain and a positive value domain, have the so-called Elinvar characteristics or temperature-independent elasticity.

As can be seen from FIGS. 13A to 13D, the manganese-nickel-chromium alloys, consisting of up to 40 wt. percent of nickel, up to 32 wt. percent of chromium, and 40 to 91 wt. percent of manganese, have temperature coefficients of Young's modulus $e$, which vary greatly depending on the composition of the alloys in any of the states as water quenched (C) after the annealing, and as tempered (C') after the water quenching. Accordingly, the manganese-nickel-chromium ternary alloys as water quenched (C) and as tempered (C') can also have the so-called Elinvar characteristics.

In the case of FIG. 12A, the working rate for the cold-work process was 96%. FIG. 14 illustrates the effects of different working rates, or different degrees of cold-work, on the temperature coefficient of Young's modulus $e$, for disposed in a high-frequency induction furnace or an electric resistance furnace, while passing argon gas therethrough. The molten ingredients were thoroughly agitated, and poured into iron moulds, for producing cylindrical ingots of about 100 mm. dia.

The ingots thus produced were heated at 950° C. for 1 hour and cooled at a speed of 100° C./hour, and swaged at room temperature into round rods of about 2 mm. dia. with a working rate of 96%, i.e., the cross sectional area of the ingots was reduced by 96%. The round rods were cut into about 11 cm. long specimens, which were used for the measurement of the effects of the aforesaid cold-work of the process (B).

Some of the about 11 cm. long specimens of about 2 mm. dia. were heated at 950° C. for 1 hour. It is known to those skilled in the art that, as far as the resiliency of alloys is concerned, such heating at a solution treatment temperature (e.g., 950° C.) for 1 hour brings the alloy structure to a condition prior to the cold-work of the process (B). Accordingly, the ensuing slow cooling of the metal thus heated may result in the aforesaid annealing of the process (A), and the ensuing quick water cooling of the metal thus heated may result in the aforesaid water quenching of the process (C).

Thus, the about 11 cm. long specimens of about 2 mm. dia. were divided into two groups after the heating at 950° C. The first group specimens were annealed by cooling at a speed of 100° C./hour, which were used for the measurement of the effects of the aforesaid an- TABLE 9A—Continued

| Alloy composition | | | Young's modulus (kg./cm.², 20° C.) | Temperature coefficient of Young's modulus e, (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Fe (percent) | | | | | |
| Tempered by cooling at 100° C./hour after heating at 200° C. for 1 hour, following the above referred cold-work | | | | | | | |
| 82.89 | 2.01 | 15.10 | 16.63×10⁵ | −10.96×10⁻⁵ | 6.73×10⁵ | −12.42×10⁻⁵ | 320 |
| 88.85 | 5.02 | 6.13 | 14.33×10⁵ | −18.25×10⁻⁵ | 5.76×10⁵ | −19.36×10⁻⁵ | 480 |
| 69.65 | 5.10 | 25.25 | 13.76×10⁵ | +4.11×10⁻⁵ | 5.52×10⁵ | +3.55×10⁻⁵ | 238 |
| 86.93 | 10.06 | 3.01 | 12.62×10⁵ | −6.25×10⁻⁵ | 5.38×10⁵ | −7.37×10⁻⁵ | 305 |
| 69.78 | 10.07 | 20.15 | 11.67×10⁵ | +6.88×10⁻⁵ | 5.00×10⁵ | +4.25×10⁻⁵ | 238 |
| 74.77 | 15.13 | 10.10 | 13.87×10⁵ | +16.82×10⁻⁵ | 5.61×10⁵ | +14.18×10⁻⁵ | 236 |
| 74.84 | 20.15 | 5.01 | 12.50×10⁵ | +5.73×10⁻⁵ | 5.33×10⁵ | +3.29×10⁻⁵ | 248 |
| Tempered by cooling at 100° C./hour after heating at 400° C. for 1 hour, following the above referred cold-work | | | | | | | |
| 82.89 | 20.1 | 15.10 | 16.65×10⁵ | −16.10×10⁻⁵ | 6.75×10⁵ | −17.60×10⁻⁵ | 325 |
| 84.85 | 5.03 | 10.12 | 14.50×10⁵ | −3.51×10⁻⁵ | 5.78×10⁵ | −5.01×10⁻⁵ | 315 |
| 69.65 | 5.10 | 25.25 | 13.78×10⁵ | −8.11×10⁻⁵ | 5.54×10⁵ | −9.35×10⁻⁵ | 240 |
| 86.93 | 10.06 | 3.01 | 12.65×10⁵ | −5.10×10⁻⁵ | 5.39×10⁵ | −6.76×10⁻⁵ | 239 |
| 69.78 | 10.07 | 20.15 | 11.69×10⁵ | +7.57×10⁻⁵ | 5.01×10⁵ | +5.38×10⁻⁵ | 240 |
| 74.77 | 15.13 | 10.10 | 14.00×10⁵ | +16.54×10⁻⁵ | 5.62×10⁵ | +14.22×10⁻⁵ | 240 |
| 74.84 | 20.15 | 5.01 | 12.53×10⁵ | +12.80×10⁻⁵ | 5.35×10⁵ | +10.19×10⁻⁵ | 231 |
| Tempered by cooling at 100° C./hour after heating at 600° C. for 1 hour, following the above referred cold-work | | | | | | | |
| 81.87 | 3.02 | 15.11 | 16.67×10⁵ | −17.12×10⁻⁵ | 6.76×10⁵ | −18.37×10⁻⁵ | 280 |
| 87.81 | 7.13 | 5.06 | 14.80×10⁵ | −14.55×10⁻⁵ | 5.79×10⁵ | −15.25×10⁻⁵ | 350 |
| 74.69 | 5.09 | 20.22 | 14.00×10⁵ | −10.30×10⁻⁵ | 5.57×10⁵ | −12.22×10⁻⁵ | 265 |
| 84.85 | 10.06 | 5.09 | 12.80×10⁵ | +13.00×10⁻⁵ | 5.41×10⁵ | +11.96×10⁻⁵ | 272 |
| 69.78 | 10.07 | 20.15 | 12.20×10⁵ | +2.58×10⁻⁵ | 5.21×10⁵ | +1.35×10⁻⁵ | 222 |
| 74.77 | 15.13 | 10.10 | 14.05×10⁵ | +15.22×10⁻⁵ | 5.63×10⁵ | +14.00×10⁻⁵ | 210 |
| 74.84 | 20.15 | 5.01 | 12.60×10⁵ | +9.61×10⁻⁵ | 5.37×10⁵ | +7.73×10⁻⁵ | 186 |
| Tempered by cooling at 100° C./hour after heating at 800° C. for 1 hour, following the above referred cold-work | | | | | | | |
| 71.86 | 5.04 | 23.10 | 17.35×10⁵ | −17.23×10⁻⁵ | 7.25×10⁵ | −18.95×10⁻⁵ | 265 |
| 74.79 | 10.05 | 15.16 | 15.50×10⁵ | −11.00×10⁻⁵ | 6.35×10⁵ | −13.36×10⁻⁵ | 250 |
| 69.71 | 10.09 | 20.20 | 15.60×10⁵ | −15.50×10⁻⁵ | 6.38×10⁵ | −16.85×10⁻⁵ | 274 |
| 79.81 | 15.13 | 5.06 | 16.70×10⁵ | −0.08×10⁻⁵ | 6.75×10⁵ | −2.50×10⁻⁵ | 235 |
| 71.64 | 15.11 | 13.25 | 17.25×10⁵ | −9.51×10⁻⁵ | 7.13×10⁵ | −11.36×10⁻⁵ | 232 |
| 74.65 | 20.23 | 5.12 | 15.65×10⁵ | −1.32×10⁻⁵ | 6.41×10⁵ | −3.53×10⁻⁵ | 141 |

TABLE 9B
Physical properties of Mn-Ni-Co alloys

| Alloy composition | | | Young's modulus (kg./cm.², 20° C.) | Temperature coefficient of Young's modulus e, (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Co (percent) | | | | | |
| As cold-worked with a working rate of 96%, after annealing of Table 8 | | | | | | | |
| 84.90 | 5.01 | 10.09 | 12.10×10⁵ | −5.10×10⁻⁵ | 4.76×10⁵ | −6.56×10⁻⁵ | 280 |
| 79.88 | 5.01 | 15.11 | 13.50×10⁵ | −10.16×10⁻⁵ | 5.20×10⁵ | −10.85×10⁻⁵ | 295 |
| 86.90 | 8.06 | 5.04 | 10.50×10⁵ | −10.09×10⁻⁵ | 5.03×10⁵ | −12.33×10⁻⁵ | 240 |
| 79.90 | 10.02 | 10.08 | 9.86×10⁵ | +5.46×10⁻⁵ | 4.55×10⁵ | +4.57×10⁻⁵ | 263 |
| 79.87 | 15.10 | 5.03 | 12.25×10⁵ | +10.12×10⁻⁵ | 5.11×10⁵ | +10.01×10⁻⁵ | 237 |
| 74.85 | 20.12 | 5.03 | 12.73×10⁵ | −8.11×10⁻⁵ | 5.14×10⁵ | −9.25×10⁻⁵ | 238 |
| Tempered by cooling at 100° C./hour after heating at 200° C. for 1 hour, following the above referred cold-work | | | | | | | |
| 84.90 | 5.01 | 10.09 | 11.97×10⁵ | −5.75×10⁻⁵ | 4.75×10⁵ | −7.13×10⁻⁵ | 260 |
| 79.88 | 5.01 | 15.11 | 13.40×10⁵ | −18.76×10⁻⁵ | 5.18×10⁵ | −19.10×10⁻⁵ | 270 |
| 86.90 | 8.06 | 5.04 | 10.44×10⁵ | −10.22×10⁻⁵ | 5.02×10⁵ | −12.15×10⁻⁵ | 235 |
| 79.90 | 10.02 | 10.08 | 9.80×10⁵ | +7.28×10⁻⁵ | 4.54×10⁵ | +6.63×10⁻⁵ | 261 |
| 76.81 | 15.16 | 8.03 | 12.20×10⁵ | +4.50×10⁻⁵ | 5.08×10⁵ | +3.81×10⁻⁵ | 245 |
| 74.85 | 20.12 | 5.03 | 12.53×10⁵ | −6.23×10⁻⁵ | 5.10×10⁵ | −7.20×10⁻⁵ | 240 |
| Tempered by cooling at 100° C./hour after heating at 400° C. for 1 hour, following the above referred cold-work | | | | | | | |
| 84.90 | 5.01 | 10.09 | 11.95×10⁵ | −10.16×10⁻⁵ | 4.72×10⁵ | −12.65×10⁻⁵ | 250 |
| 79.88 | 5.01 | 15.11 | 13.38×10⁵ | −17.22×10⁻⁵ | 5.16×10⁵ | −18.63×10⁻⁵ | 250 |
| 84.94 | 10.01 | 5.05 | 9.60×10⁵ | +1.00×10⁻⁵ | 4.53×10⁵ | +0.56×10⁻⁵ | 222 |
| 79.90 | 10.02 | 10.08 | 9.80×10⁵ | +1.80×10⁻⁵ | 4.54×10⁵ | +1.12×10⁻⁵ | 262 |
| 76.81 | 15.16 | 8.03 | 12.20×10⁵ | −1.22×10⁻⁵ | 5.09×10⁵ | −3.74×10⁻⁵ | 240 |
| 74.85 | 20.12 | 5.03 | 12.54×10⁵ | −6.71×10⁻⁵ | 5.11×10⁵ | −7.39×10⁻⁵ | 242 |
| Tempered by cooling at 100° C./hour after heating at 600° C. for 1 hour, following the above referred cold-work | | | | | | | |
| 84.90 | 5.01 | 10.09 | 16.50×10⁵ | −18.55×10⁻⁵ | 5.65×10⁵ | −19.02×10⁻⁵ | 820 |
| 84.94 | 10.01 | 5.05 | 17.60×10⁵ | −13.33×10⁻⁵ | 6.22×10⁵ | −14.25×10⁻⁵ | 777 |
| 79.90 | 10.02 | 10.08 | 14.52×10⁵ | −17.50×10⁻⁵ | 5.37×10⁵ | −18.02×10⁻⁵ | 795 |
| 79.87 | 15.10 | 5.03 | 16.33×10⁵ | −10.13×10⁻⁵ | 5.51×10⁵ | −11.55×10⁻⁵ | 513 |
| 77.86 | 20.13 | 2.01 | 12.50×10⁵ | −6.51×10⁻⁵ | 5.10×10⁵ | −6.92×10⁻⁵ | 195 |
| 75.88 | 23.12 | 1.00 | 12.20×10⁵ | −11.30×10⁻⁵ | 5.08×10⁵ | −12.65×10⁻⁵ | 188 | nealing of the process (A). The second group specimens were water quenched for the measurement of the effects of the aforesaid water quenching of the process (C).

Some of the aforesaid specimens subjected to the cold-work of the process (B) and the quenching of the process (C) were again heated at various temperatures below 950° C. for 1 hour, and cooled at a speed of 100° C./hour, so as to provide specimens for the measurement of the effects of the tempering treatment of the processes (B') and (C'), respectively.

The Young's modulus of the specimens was determined by measuring the resonant frequency thereof by a device having a sensitive electrostatic capacitor, and calculating the Young's modulus from the resonant frequency thus measured.

The coefficient $\alpha$ of linear expansion of the specimens in the proximity of room temperature was measured by using a precision linear dilatometer of vertical type.

The results of the measurements are shown in FIGS. 19A to 30D.

Figure 19A:
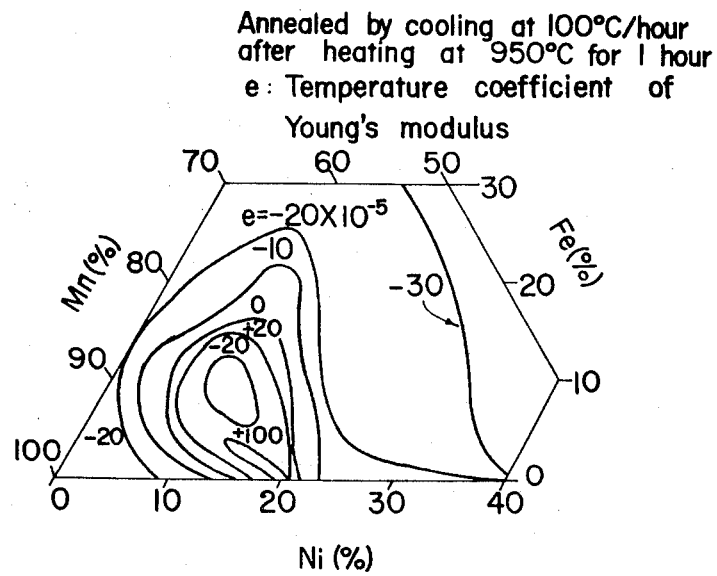
FIG. 19A is a diagram illustrating the relations between the composition of manganese-nickel-iron ternary alloy of the invention and the mean temperature coefficient of Young's modulus thereof, 0° C. to 40° C., for the state as annealed.
Figure 19B:
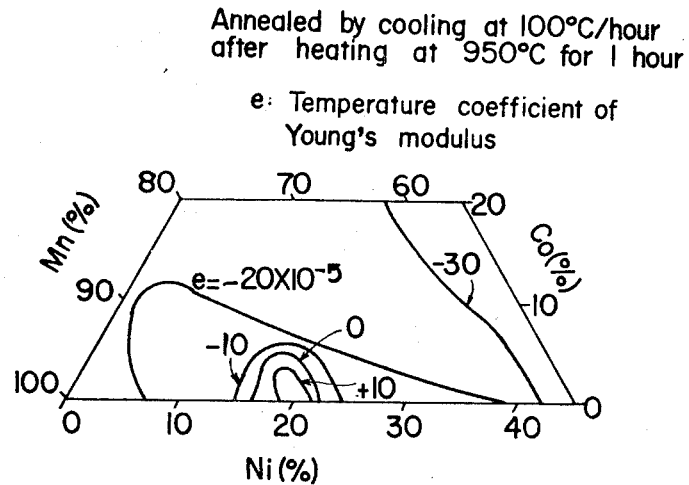
FIG. 19B is a diagram similar to FIG. 19A, illustrating the relations between the composition of manganese-nickel-cobalt ternary alloy of the invention and the mean temperature coefficient of Young's modulus thereof, 0° C. to 40° C., for the state as annealed.

FIGS. 19A and 19B show the relation between the composition of the manganese-nickel-iron and manganese-nickel-cobalt ternary alloys and the mean temperature coefficient of Young's modulus $e$ thereof between 0° C. and 40° C. in the state as annealed by the process (A), respectively.

Figure 20A:
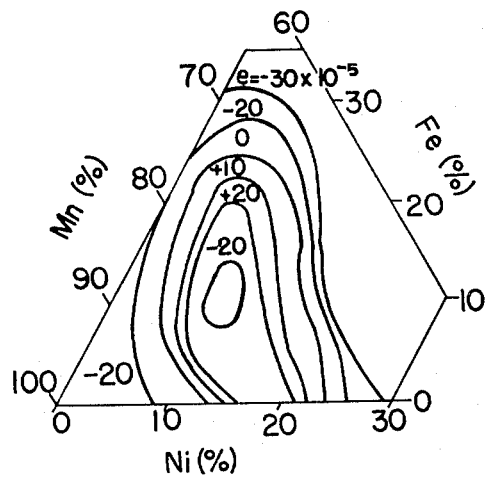
FIGS. 20A to 20E are diagrams similar to FIG. 19A, illustrating similar relations for the manganese-nickel-iron ternary alloys of the invention, for the state as cold-worked and for the state as tempered under different conditions after the cold-work.
Figure 20B:
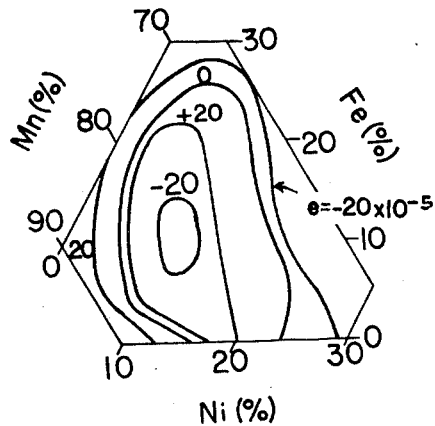
Figure 20C:
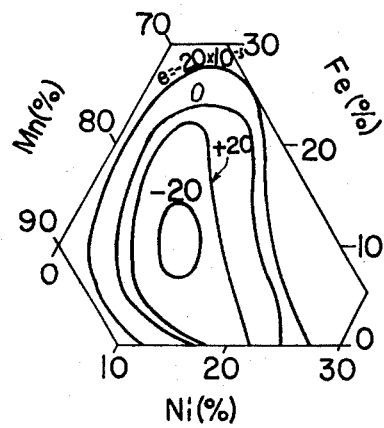
Figure 20D:
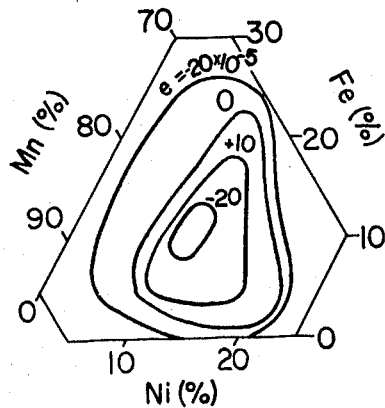
Figure 20E:
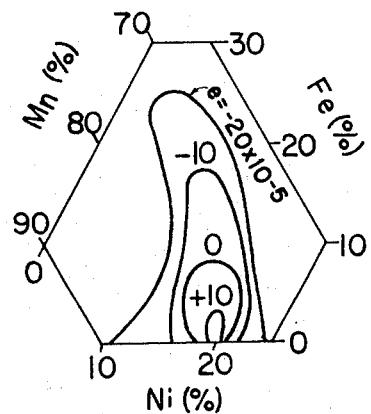
Figure 21A:
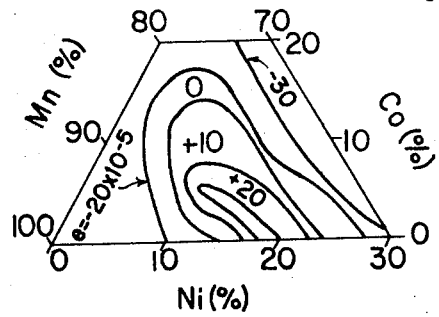
FIGS. 21A to 21D are diagrams similar to FIG. 19B, illustrating similar relations for the manganese-nickel-cobalt ternary alloys of the invention, for the state as cold-worked and for the state as tempered under different conditions after the cold-work.
Figure 21B:
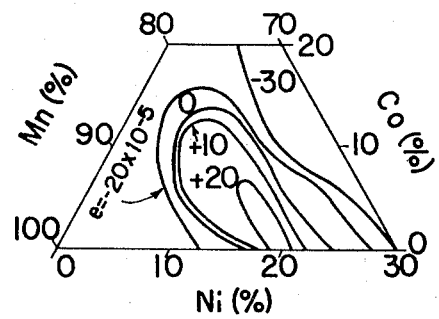
Figure 21C:
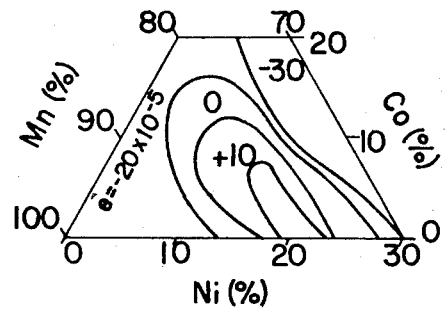
Figure 21D:
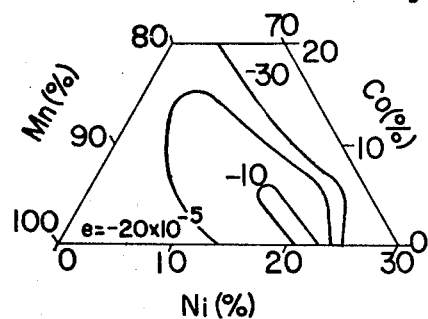

FIGS. 20A and 21A show the relations between the composition of the manganese-nickel-iron and manganese-nickel-cobalt ternary alloys and the mean temperature coefficient of Young's modulus $e$ thereof, 0° C. to 40° C., for the state as cold-worked (B) after the annealing, respectively. FIGS. 20B to 20E and FIGS. 21B to 21D show similar relations for the same alloys, respectively, for the state as tempered (B') by cooling at a speed of 100° C./hour after heating at different temperatures for one hour.

Figure 22A:
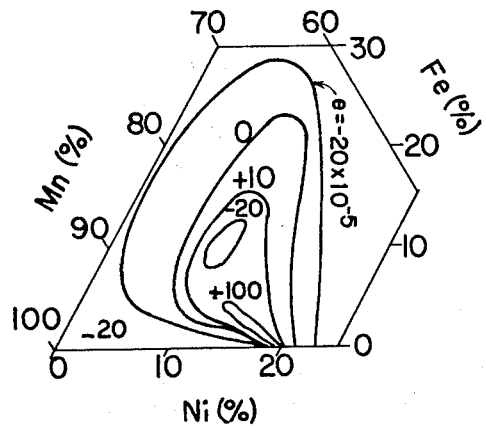
FIGS. 22A to 22E are diagrams similar to FIGS. 20A to 20E, respectively, illustrating similar relations for the manganese-nickel-iron ternary alloys of the invention, for the state as water quenched and for the state as tempered under different conditions after the water quenching.
Figure 22B:
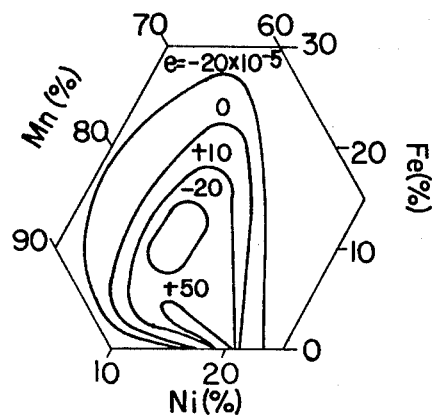
Figure 22C:
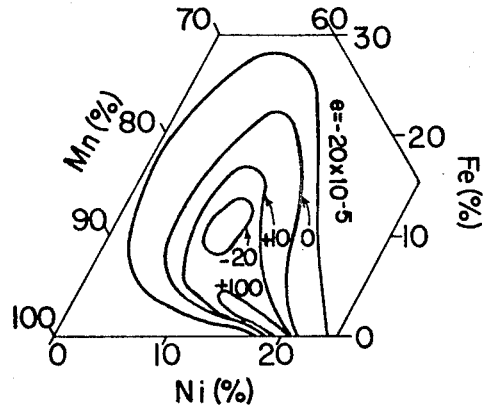
Figure 22D:
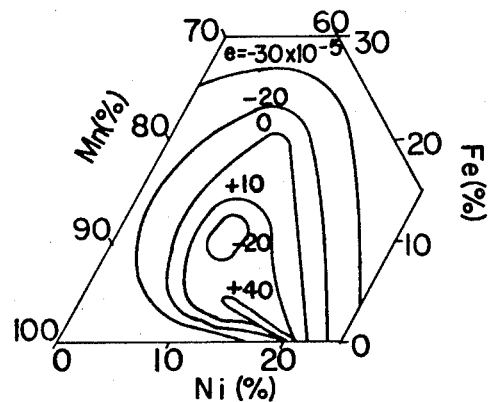
Figure 22E:
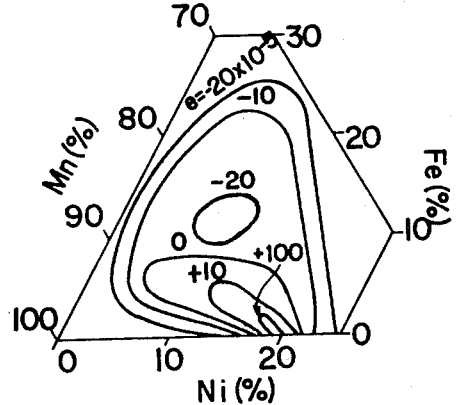
Figure 23A:
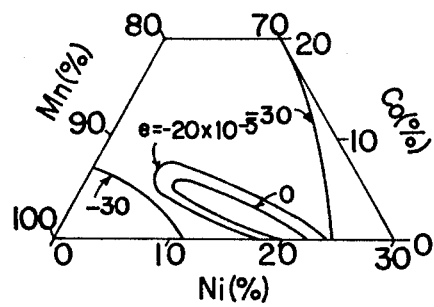
FIGS. 23A to 23D are diagrams similar to FIGS. 21A to 21D, respectively, illustrating similar relations for the manganese-nickel-cobalt ternary alloys of the invention, for the state as water quenched and for the state as tempered under different temperatures after the water quenching.
Figure 23B:
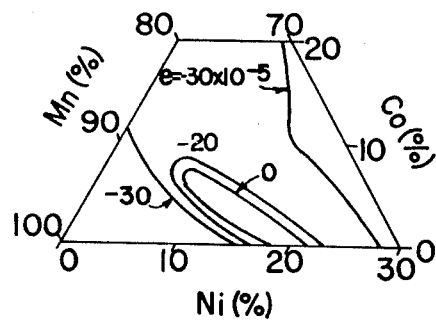
Figure 23C:
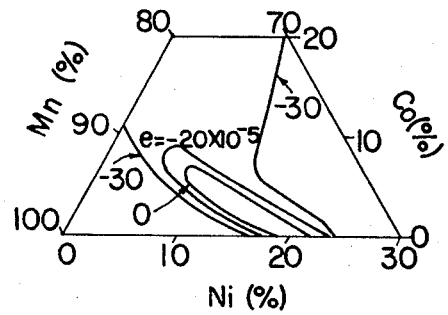
Figure 23D:
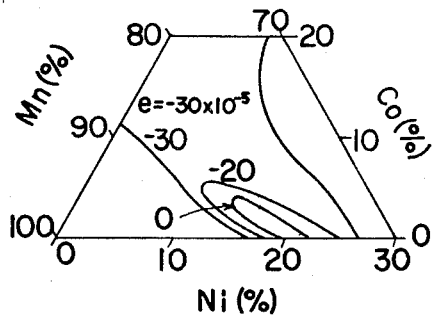

FIGS. 22A and 23A show the similar relations for the same manganese-nickel-iron and manganese-nickel-cobalt ternary alloys, respectively, for the state as water quenched (C) after the annealing. FIGS. 22B to 22D and FIGS. 23B to 23D show similar relations for the same alloys, respectively, for the state as tempered (C') by cooling at a speed of 100° C./hour after heating for one hour at different temperatures.

Tables 8, 9A, 9B, 10A, and 10B summarize typical measured values of physical properties, inclusive of Vickers hardness, of manganese-nickel-iron and manganese-nickel-cobalt ternary alloys having compositions of the present invention.

Table 11 shows the relation between the cooling speed and the temperature coefficient of Young's modulus $e$, 0° C. to 40° C., for manganese-nickel-iron alloys and manganese-nickel-cobalt alloys, four specimens each.

Figure 24A:
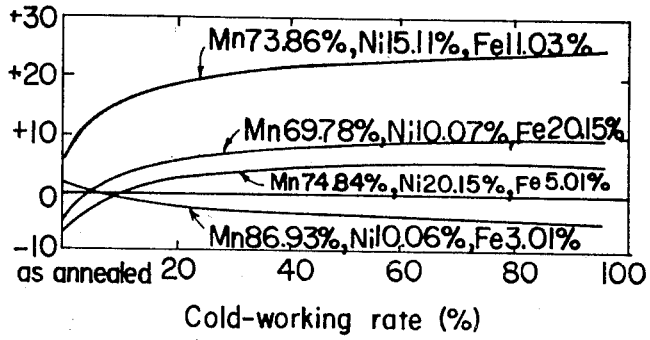
FIG. 24A is a graph, showing the relations between the mean temperature coefficient of Young's modulus, 0° C. to 40° C., of four different manganese-nickel-iron ternary alloys of the invention and the working rate of cold-work applied thereto.
Figure 24B:
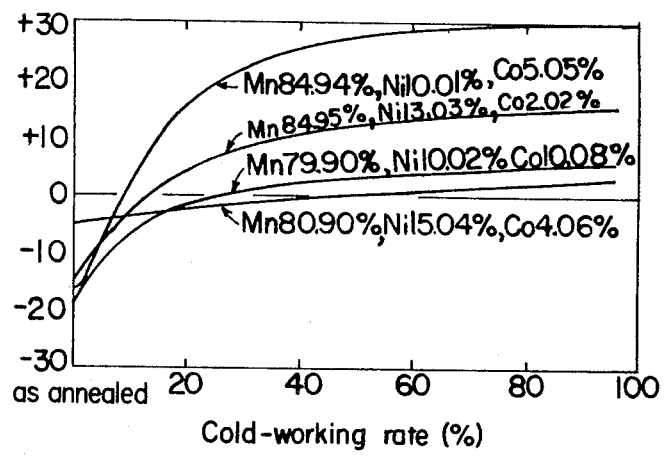
FIG. 24B is a graph similar to FIG. 24A, showing similar relations for four different manganese-nickel-cobalt ternary alloys of the invention.

FIGS. 24A and 24B illustrate the relation between the working rate for the cold-work and the temperature coefficient of Young's modulus $e$, 0° C. to 40° C., for the same alloys as for Table 11.

Figure 25A:
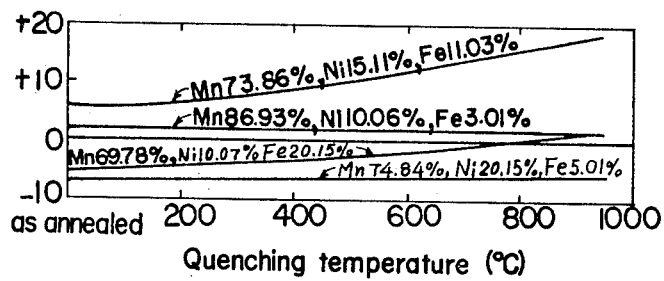
FIG. 25A is a graph, showing the relation between the mean temperature coefficient of Young's modulus, 0° C. to 40° C., of the four manganese-nickel-iron ternary alloys of the invention and the quenching temperature of the water quenching applied thereto.
Figure 25B:
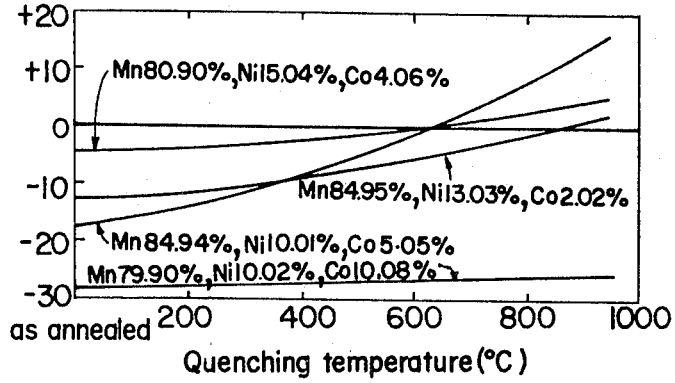
FIG. 25B is a graph similar to FIG. 25A, illustrating similar relations for four manganese-nickel-cobalt ternary alloys of the invention.

Similarly, FIGS. 25A and 25B show the relation between the quenching temperature and the temperature coefficient of Young's modulus $e$, 0° C. to 40° C., for the same ternary alloys according to the invention as FIGS. 24A and 24B, respectively.

Figure 26A:
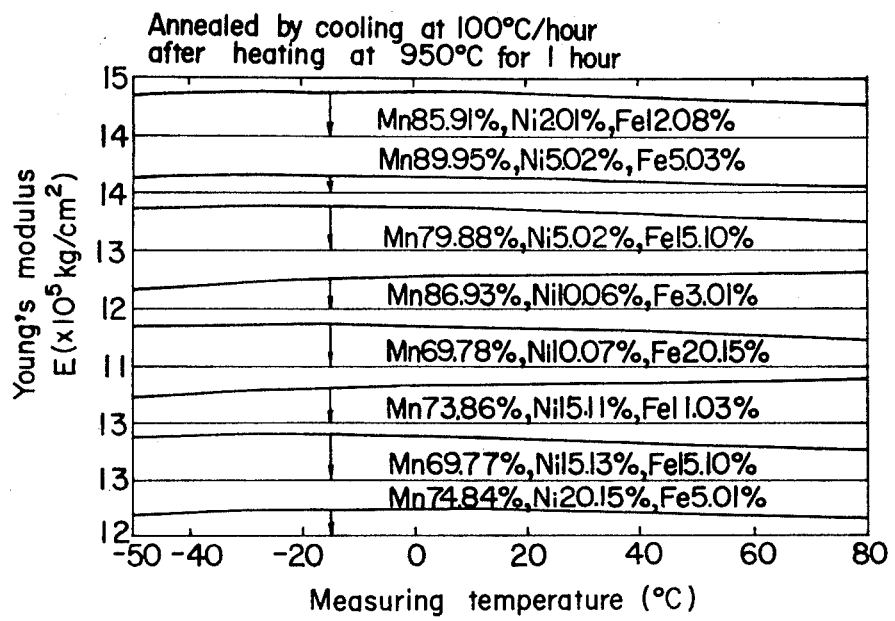
FIG. 26A is a graph showing the Young's modulus of manganese-nickel-iron ternary alloys of the invention at different temperatures, for the state as annealed by cooling at a speed of 100° C./hour after heating at 950° C. for one hour.
Figure 26B:
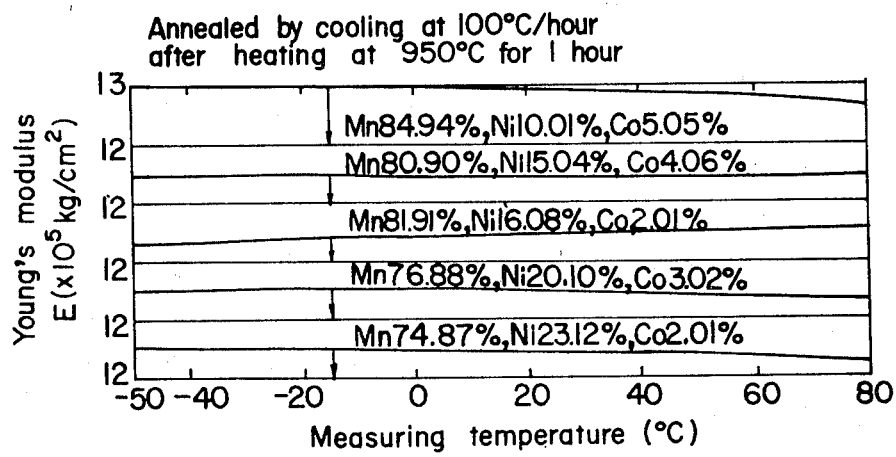
FIG. 26B is a graph similar to FIG. 26A, illustrating the Young's modulus of manganese-nickel-cobalt ternary alloys of the invention, for the state as annealed by cooling at a speed of 100° C./hour after heating at 950° C. for one hour.
Figure 27A:
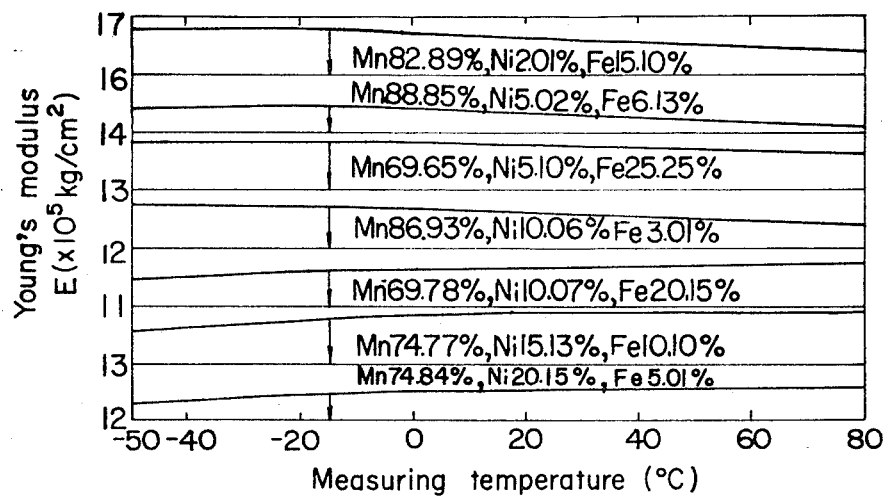
FIGS. 27A to 27E and FIGS. 28A to 28D illustrate the Young's modulus of manganese-nickel-iron ternary alloys and manganese-nickel-cobalt ternary alloys, respectively, for the state as cold-worked with a working rate of 96% after the annealing and for the state as tempered under different conditions after the cold-work.
Figure 27B:
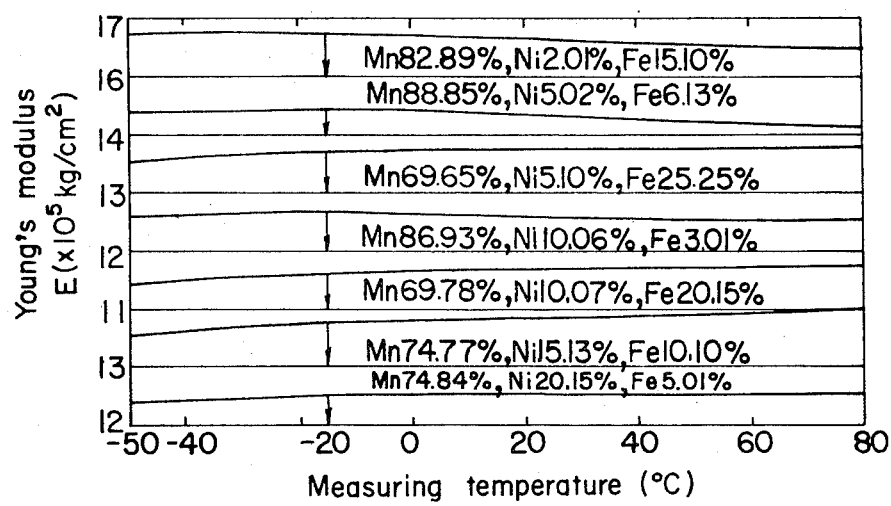
Figure 27C:
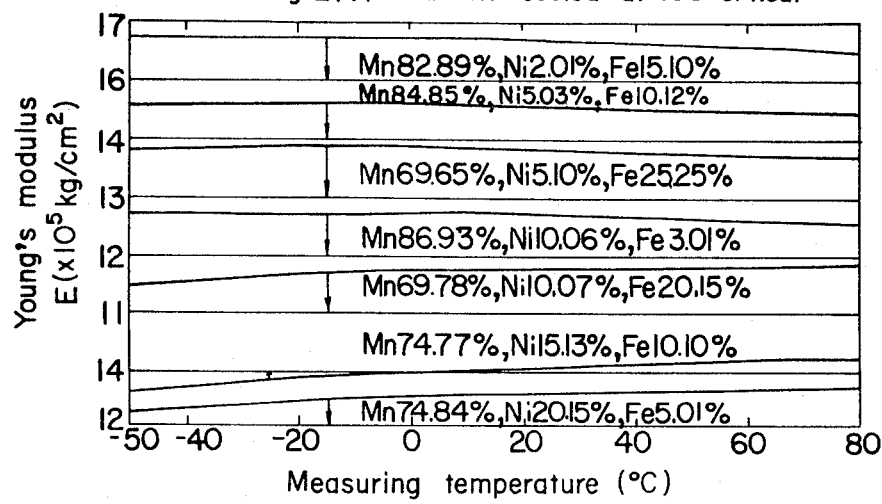
Figure 27D:
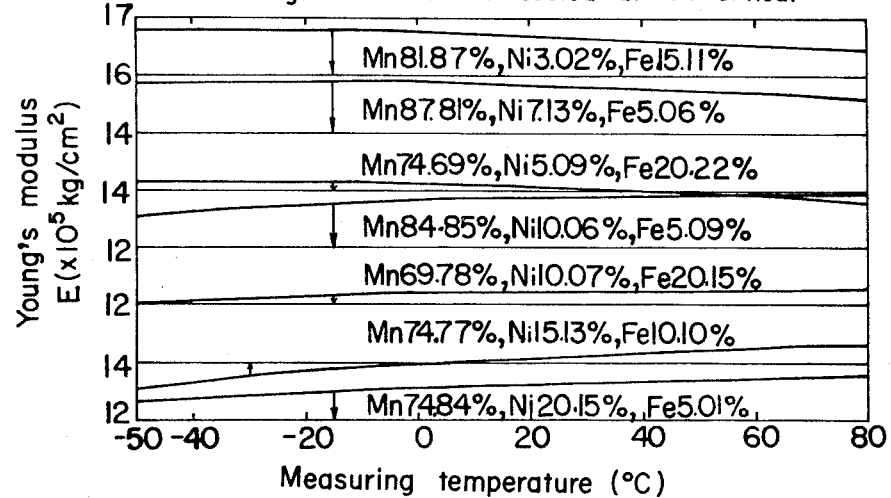
Figure 27E:
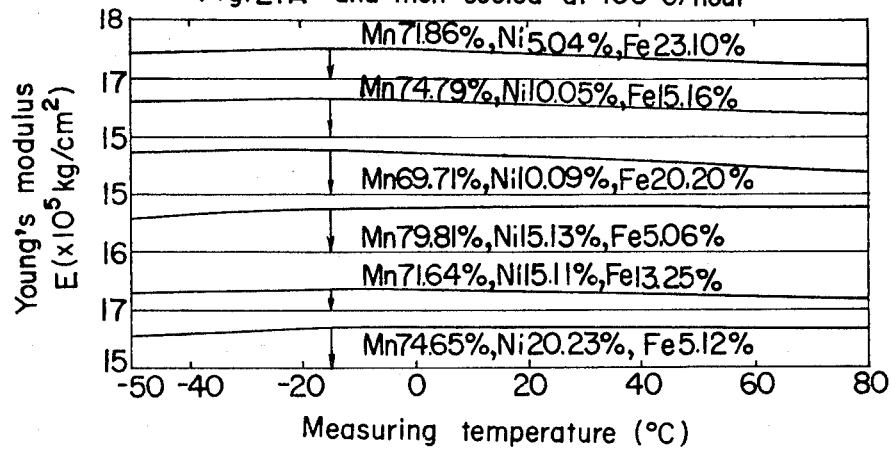
Figure 28A:
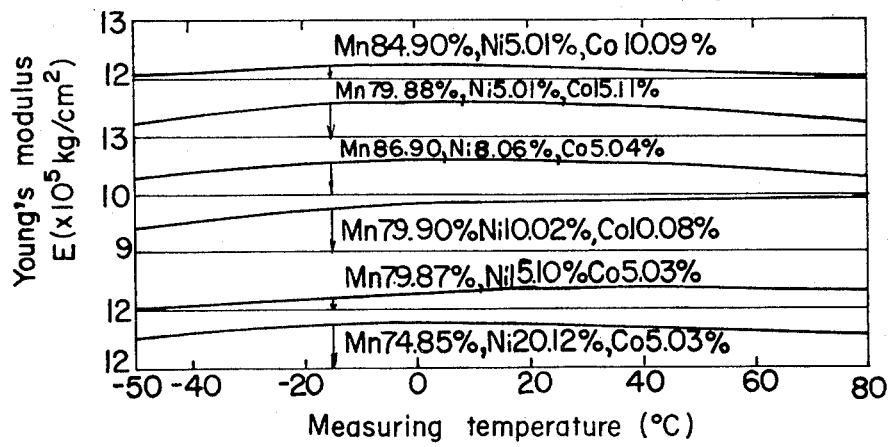
Figure 28B:
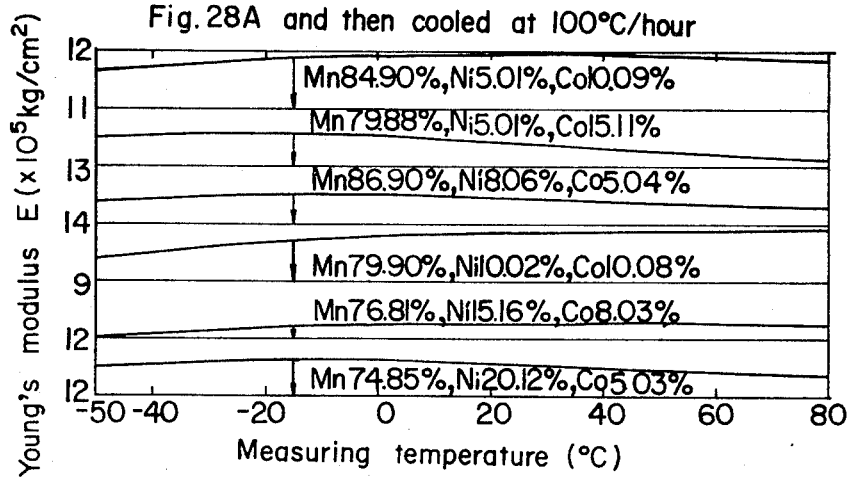
Figure 28C:
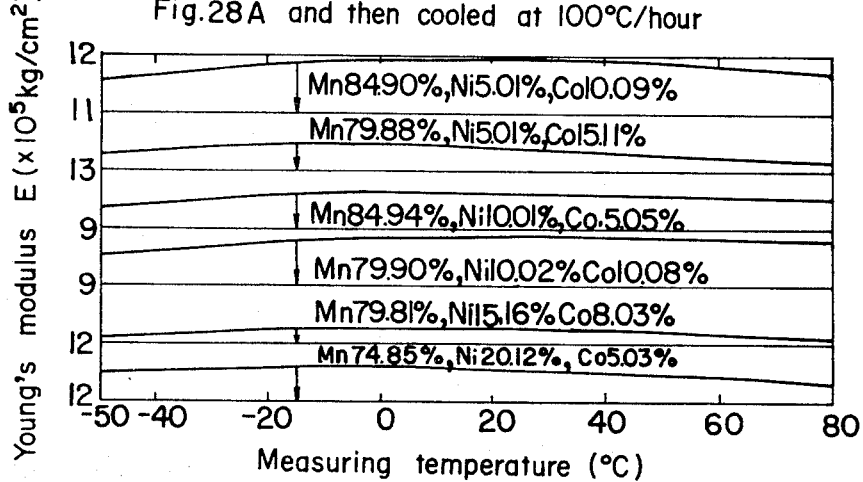
Figure 28D:
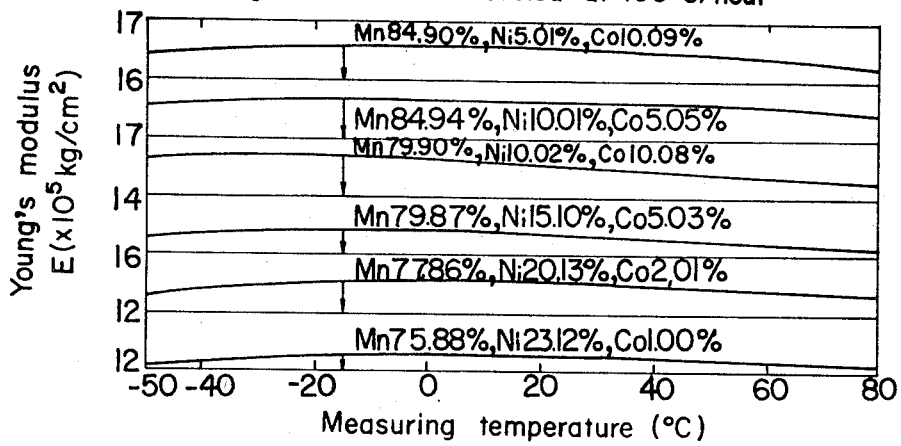
Figure 29A:
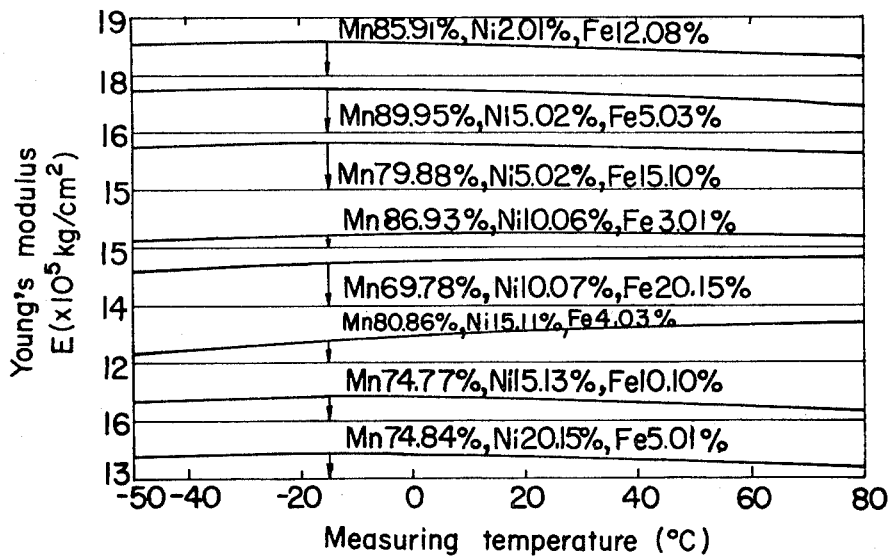
FIGS. 29A to 29E and FIGS. 30A to 30D illustrate the Young's modulus of manganese-nickel-iron ternary alloys and manganese-nickel-cobalt ternary alloys, respectively, for the state as water quenched after the annealing and for the state as tempered under different conditions after the water quenching.
Figure 29B:
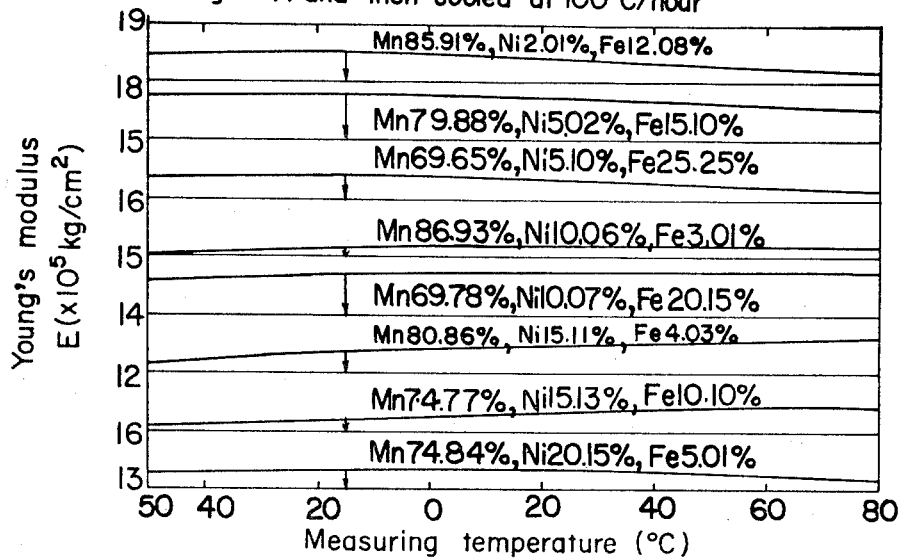
Figure 29C:
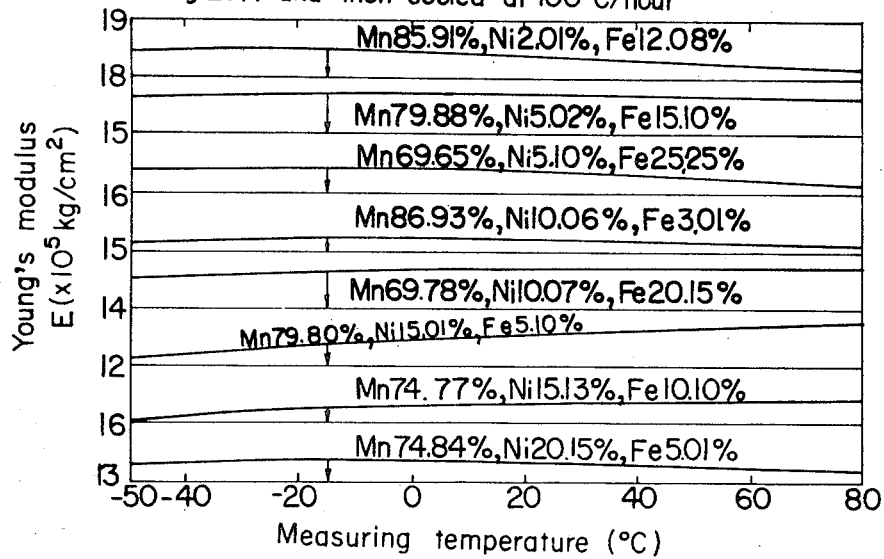
Figure 29D:
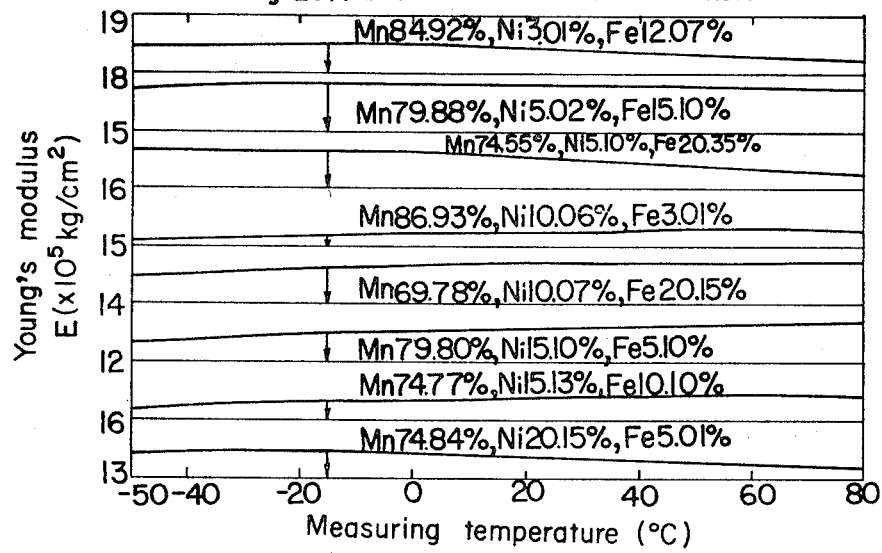
Figure 29E:
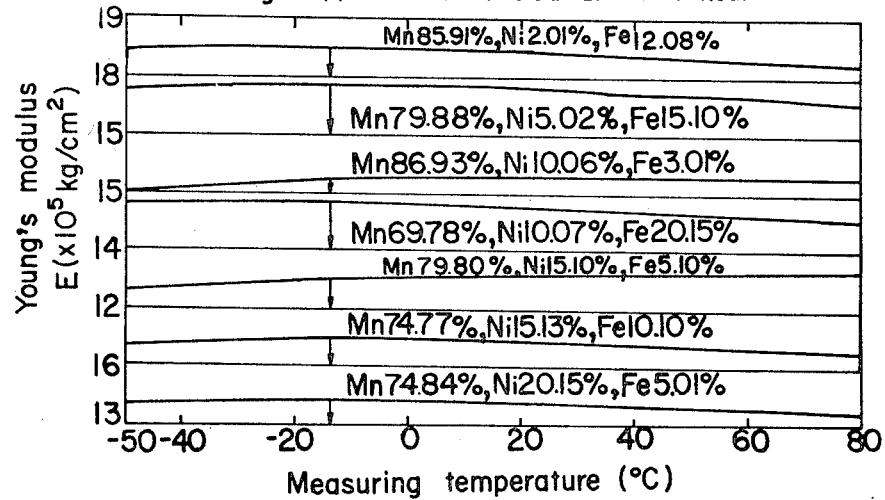
Figure 30A:
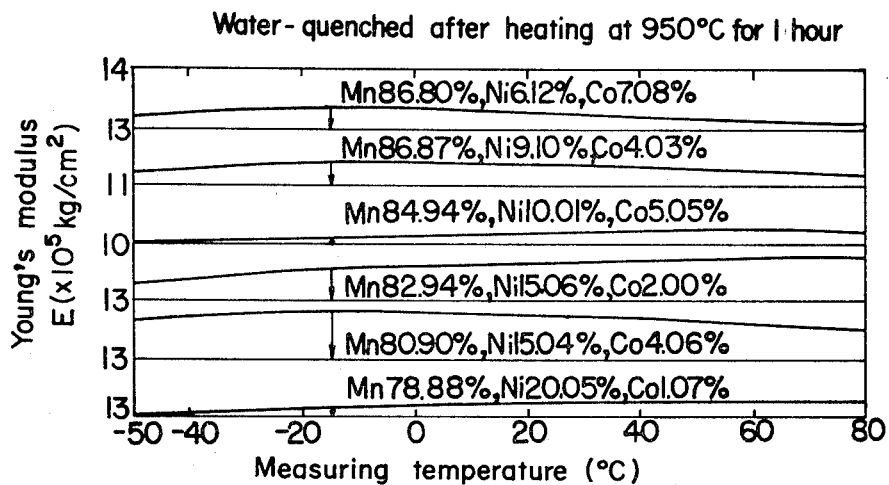
Figure 30B:
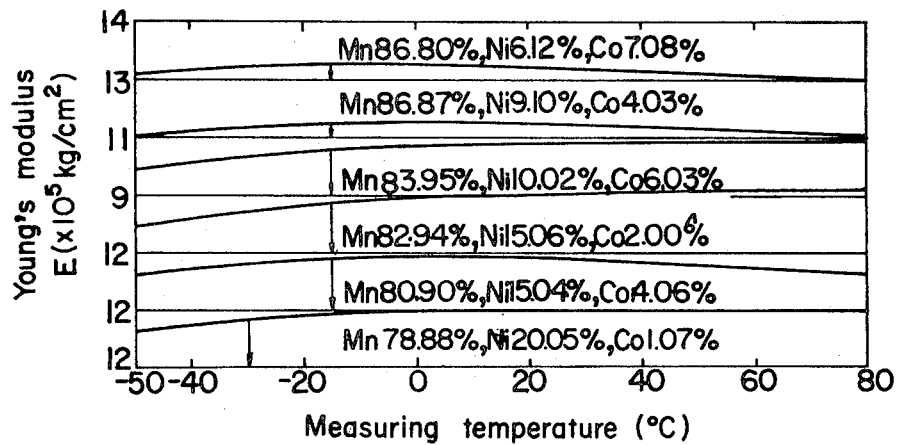
Figure 30C:
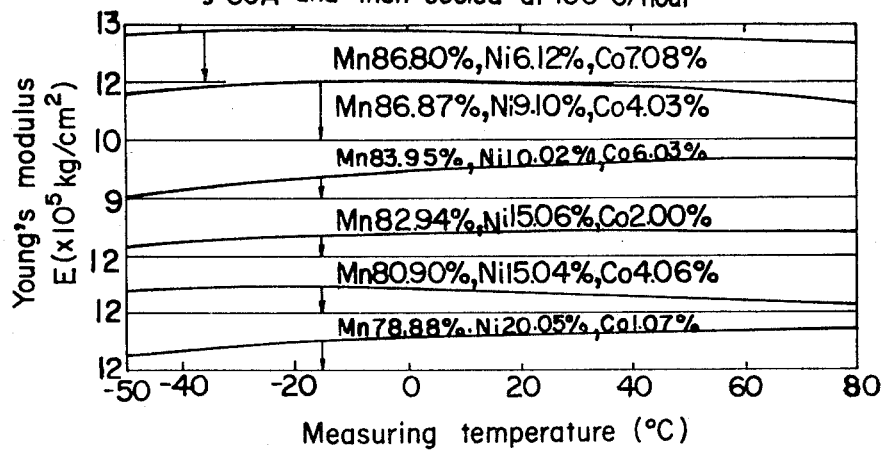
Figure 30D:
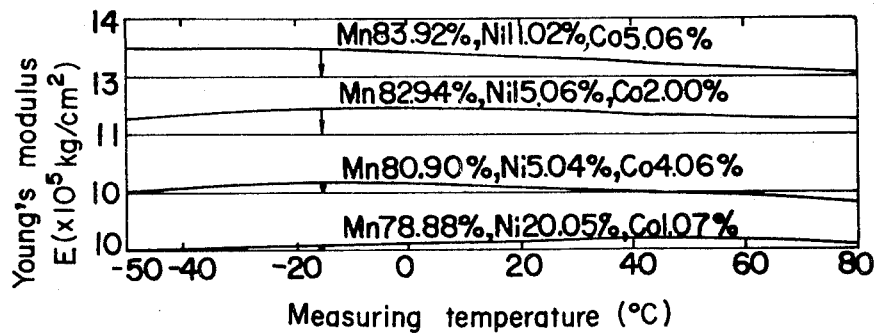

FIGS. 26A and 26B illustrate the values of Young's modulus at various temperatures from −50° C. to 80° C., for different Mn-Ni-Fe and Mn-Ni-Co ternary alloys of the invention, respectively, in the state as annealed by cooling at a speed of 100° C./hour after heating at 950° C. for 1 hour.

FIGS. 27A to 27E and FIGS. 28A to 28D show the values of Young's modulus at various temperatures from −50° C. to 80° C., for different Mn-Ni-Fe and Mn-Ni-Co ternary alloys of the invention, respectively, in the state as cold-worked with a working rate of 96% after the annealing of FIGS. 26A and 26B, respectively, and in the states as tempered by cooling at a speed of 100° C./hour after heating at different temperatures for 1 hour following the above referred cold-work, respectively.

FIGS. 29A to 29E and FIGS. 30A to 30D show the values of Young's modulus at various temperatures from −50° C. to 80° C., for different Mn-Ni-Fe and Mn-Ni-Co ternary alloys of the invention, respectively, in the state as water quenched after the annealing of FIGS. 26A and 26B, respectively, and in the state as tempered by cooling at a speed of 100° C./hour after heating at different temperatures for 1 hour following the above referred water quenching.

TABLE 8

Physical properties of Mn-Ni-Fe and Mn-Ni-Co alloys, as annealed by cooling at 100° C./hour after heating at 950° C. for 1 hour

| Alloy composition | | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|---|
| Mn (percent) | Ni (percent) | Fe (percent) | Co (percent) | | | | | |
| 85.91 | 2.01 | 12.08 | | 14.65×10⁵ | −10.38×10⁻⁵ | 5.83×10⁵ | −12.37×10⁻⁵ | 220 |
| 89.95 | 5.02 | 5.03 | | 14.20×10⁵ | −16.15×10⁻⁵ | 5.18×10⁵ | −17.22×10⁻⁵ | 165 |
| 79.88 | 5.02 | 15.10 | | 13.66×10⁵ | −10.12×10⁻⁵ | 5.33×10⁵ | −11.35×10⁻⁵ | 163 |
| 86.93 | 10.06 | 3.01 | | 12.50×10⁵ | +1.25×10⁻⁵ | 5.28×10⁵ | +1.05×10⁻⁵ | 121 |
| 69.78 | 10.07 | 20.15 | | 11.60×10⁵ | −5.58×10⁻⁵ | 5.03×10⁵ | −6.79×10⁻⁵ | 124 |
| 73.86 | 15.11 | 11.03 | | 13.65×10⁵ | +5.66×10⁻⁵ | 5.31×10⁵ | +4.34×10⁻⁵ | 132 |
| 69.77 | 15.13 | 15.10 | | 13.70×10⁵ | −16.50×10⁻⁵ | 5.36×10⁵ | −17.31×10⁻⁵ | 135 |
| 74.84 | 20.15 | 5.01 | | 12.40×10⁵ | −7.15×10⁻⁵ | 5.26×10⁵ | −8.00×10⁻⁵ | 123 |
| 84.94 | 10.01 | | 5.05 | 12.90×10⁵ | −16.90×10⁻⁵ | 4.77×10⁵ | −17.12×10⁻⁵ | 171 |
| 80.90 | 15.04 | | 4.06 | 12.42×10⁵ | −5.13×10⁻⁵ | 4.72×10⁵ | −6.75×10⁻⁵ | 150 |
| 81.91 | 16.08 | | 2.01 | 12.40×10⁵ | +6.55×10⁻⁵ | 4.70×10⁵ | +4.66×10⁻⁵ | 150 |
| 76.88 | 20.10 | | 3.02 | 12.45×10⁵ | −5.46×10⁻⁵ | 4.48×10⁵ | −6.26×10⁻⁵ | 125 |
| 74.87 | 23.12 | | 2.01 | 12.41×10⁵ | −11.63×10⁻⁵ | 4.46×10⁵ | −12.72×10⁻⁵ | 120 |

TABLE 9A

Physical properties of Mn-Ni-Fe alloys

| Alloy composition | | | Young's modulus (kg./cm.², 20° C.) | Temperature coefficient of Young's modulus $e$, (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Fe (percent) | | | | | |
| As cold-worked with a working rate of 96% after annealing of Table 8 | | | | | | | |
| 82.89 | 2.01 | 15.10 | 16.60×10⁵ | −10.12×10⁻⁵ | 6.73×10⁵ | −12.38×10⁻⁵ | 285 |
| 88.85 | 5.02 | 6.13 | 14.30×10⁵ | −16.55×10⁻⁵ | 5.75×10⁵ | −17.21×10⁻⁵ | 265 |
| 69.65 | 5.10 | 25.25 | 13.75×10⁵ | −5.50×10⁻⁵ | 5.51×10⁵ | −6.17×10⁻⁵ | 240 |
| 86.93 | 10.06 | 3.01 | 12.60×10⁵ | −7.16×10⁻⁵ | 5.37×10⁵ | −9.00×10⁻⁵ | 237 |
| 69.78 | 10.07 | 20.15 | 11.66×10⁵ | +9.18×10⁻⁵ | 4.98×10⁵ | +7.24×10⁻⁵ | 236 |
| 74.77 | 15.13 | 10.10 | 13.85×10⁵ | +11.28×10⁻⁵ | 5.59×10⁵ | +8.33×10⁻⁵ | 228 |
| 74.84 | 20.15 | 5.01 | 12.50×10⁵ | +4.80×10⁻⁵ | 5.34×10⁵ | +3.65×10⁻⁵ | 231 |

TABLE 10A
Physical properties of Mn-Ni-Fe alloys

| Alloy composition | | | Young's modulus (kg./cm.², 20° C.) | Temperature coefficient of Young's modulus e, (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Fe (percent) | | | | | |

As water quenched after heating at 950° C. for 1 hour, following the annealing of Table 8

| Mn (percent) | Ni (percent) | Fe (percent) | Young's modulus | Temp. coeff. Young's | Modulus of rigidity | Temp. coeff. rigidity | Vickers hardness |
|---|---|---|---|---|---|---|---|
| 85.91 | 2.01 | 12.08 | $18.50 \times 10^5$ | $-14.15 \times 10^{-5}$ | $7.22 \times 10^5$ | $-15.22 \times 10^{-5}$ | 180 |
| 89.95 | 5.02 | 5.03 | $16.70 \times 10^5$ | $-18.56 \times 10^{-5}$ | $6.75 \times 10^5$ | $-19.00 \times 10^{-5}$ | 210 |
| 79.88 | 5.02 | 15.10 | $15.75 \times 10^5$ | $-10.10 \times 10^{-5}$ | $6.43 \times 10^5$ | $-11.53 \times 10^{-5}$ | 145 |
| 86.93 | 10.06 | 3.01 | $15.20 \times 10^5$ | $+1.25 \times 10^{-5}$ | $6.26 \times 10^5$ | $+1.36 \times 10^{-5}$ | 131 |
| 69.78 | 10.07 | 20.15 | $14.77 \times 10^5$ | $+1.42 \times 10^{-5}$ | $5.90 \times 10^5$ | $+1.17 \times 10^{-5}$ | 139 |
| 80.86 | 15.11 | 40.3 | $12.50 \times 10^5$ | $+18.25 \times 10^{-5}$ | $5.35 \times 10^5$ | $+17.12 \times 10^{-5}$ | 125 |
| 74.77 | 15.13 | 10.10 | $16.35 \times 10^5$ | $+7.22 \times 10^{-5}$ | $6.63 \times 10^5$ | $+6.64 \times 10^{-5}$ | 139 |
| 74.84 | 20.15 | 5.01 | $13.35 \times 10^5$ | $-6.09 \times 10^{-5}$ | $5.41 \times 10^5$ | $-7.29 \times 10^{-5}$ | 130 |

Tempered by cooling at 100° C./hour after heating at 200° C. for 1 hour, following the above referred water quenching

| Mn | Ni | Fe | Young's | Temp. Y | Rigidity | Temp. R | Hardness |
|---|---|---|---|---|---|---|---|
| 85.91 | 2.01 | 12.08 | $18.35 \times 10^5$ | $-18.25 \times 10^{-5}$ | $7.13 \times 10^5$ | $-19.13 \times 10^{-5}$ | 525 |
| 79.88 | 5.02 | 15.10 | $15.70 \times 10^5$ | $-7.12 \times 10^{-5}$ | $6.42 \times 10^5$ | $-8.33 \times 10^{-5}$ | 190 |
| 69.65 | 5.10 | 25.25 | $16.30 \times 10^5$ | $-15.20 \times 10^{-5}$ | $6.64 \times 10^5$ | $-16.35 \times 10^{-5}$ | 140 |
| 86.93 | 10.06 | 3.01 | $15.15 \times 10^5$ | $+7.61 \times 10^{-5}$ | $6.23 \times 10^5$ | $+5.38 \times 10^{-5}$ | 140 |
| 69.78 | 10.07 | 20.15 | $14.70 \times 10^5$ | $+2.60 \times 10^{-5}$ | $5.85 \times 10^5$ | $+2.02 \times 10^{-5}$ | 147 |
| 80.86 | 15.11 | 4.03 | $12.45 \times 10^5$ | $+14.16 \times 10^{-5}$ | $5.25 \times 10^5$ | $+13.11 \times 10^{-5}$ | 133 |
| 74.77 | 15.13 | 10.10 | $16.30 \times 10^5$ | $+12.13 \times 10^{-5}$ | $6.60 \times 10^5$ | $+10.05 \times 10^{-5}$ | 143 |
| 74.84 | 20.15 | 5.01 | $13.30 \times 10^5$ | $-5.70 \times 10^{-5}$ | $5.40 \times 10^5$ | $-7.25 \times 10^{-5}$ | 143 |

Tempered by cooling at 100° C./hour after heating at 400° C. for 1 hour, following the above referred water quenching

| Mn | Ni | Fe | Young's | Temp. Y | Rigidity | Temp. R | Hardness |
|---|---|---|---|---|---|---|---|
| 85.91 | 2.01 | 12.08 | $18.35 \times 10^5$ | $-18.75 \times 10^{-5}$ | $7.15 \times 10^5$ | $-19.33 \times 10^{-5}$ | 380 |
| 79.88 | 5.02 | 15.10 | $15.70 \times 10^5$ | $-2.30 \times 10^{-5}$ | $6.43 \times 10^5$ | $-3.58 \times 10^{-5}$ | 180 |
| 69.65 | 5.10 | 25.25 | $16.32 \times 10^5$ | $-11.07 \times 10^{-5}$ | $6.61 \times 10^5$ | $-13.55 \times 10^{-5}$ | 150 |
| 86.93 | 10.06 | 3.01 | $15.14 \times 10^5$ | $-3.55 \times 10^{-5}$ | $6.20 \times 10^5$ | $-4.21 \times 10^{-5}$ | 203 |
| 69.78 | 10.07 | 20.15 | $14.68 \times 10^5$ | $+1.52 \times 10^{-5}$ | $5.80 \times 10^5$ | $+1.36 \times 10^{-5}$ | 172 |
| 79.80 | 15.10 | 5.10 | $12.50 \times 10^5$ | $+16.80 \times 10^{-5}$ | $5.27 \times 10^5$ | $+13.97 \times 10^{-5}$ | 154 |
| 74.77 | 15.13 | 10.10 | $16.30 \times 10^5$ | $+6.65 \times 10^{-5}$ | $6.62 \times 10^5$ | $+5.30 \times 10^{-5}$ | 174 |
| 74.84 | 20.15 | 5.01 | $13.30 \times 10^5$ | $-3.89 \times 10^{-5}$ | $5.40 \times 10^5$ | $-5.14 \times 10^{-5}$ | 151 |

Tempered by cooling at 100° C./hour after heating at 600° C. for 1 hour, following the above referred water quenching

| Mn | Ni | Fe | Young's | Temp. Y | Rigidity | Temp. R | Hardness |
|---|---|---|---|---|---|---|---|
| 84.92 | 3.01 | 12.07 | $18.40 \times 10^5$ | $-16.65 \times 10^{-5}$ | $7.18 \times 10^5$ | $-17.32 \times 10^{-5}$ | 850 |
| 79.88 | 5.02 | 15.10 | $15.73 \times 10^5$ | $-2.83 \times 10^{-5}$ | $6.44 \times 10^5$ | $-3.95 \times 10^{-5}$ | 860 |
| 74.55 | 5.10 | 20.35 | $16.50 \times 10^5$ | $-17.85 \times 10^{-5}$ | $6.70 \times 10^5$ | $-18.33 \times 10^{-5}$ | 864 |
| 86.93 | 10.06 | 3.01 | $15.20 \times 10^5$ | $+3.35 \times 10^{-5}$ | $6.26 \times 10^5$ | $+2.56 \times 10^{-5}$ | 130 |
| 69.78 | 10.07 | 20.15 | $14.70 \times 10^5$ | $+0.66 \times 10^{-5}$ | $5.84 \times 10^5$ | $+0.38 \times 10^{-5}$ | 134 |
| 79.80 | 15.10 | 5.10 | $12.55 \times 10^5$ | $+16.83 \times 10^{-5}$ | $5.37 \times 10^5$ | $+15.44 \times 10^{-5}$ | 127 |
| 74.77 | 15.13 | 10.10 | $16.35 \times 10^5$ | $+5.79 \times 10^{-5}$ | $6.64 \times 10^5$ | $+3.70 \times 10^{-5}$ | 135 |
| 74.84 | 20.15 | 5.01 | $13.33 \times 10^5$ | $-4.51 \times 10^{-5}$ | $5.42 \times 10^5$ | $-6.12 \times 10^{-5}$ | 127 |

Tempered by cooling at 100° C./hour after heating at 800° C. for 1 hour, following the above referred water quenching

| Mn | Ni | Fe | Young's | Temp. Y | Rigidity | Temp. R | Hardness |
|---|---|---|---|---|---|---|---|
| 85.91 | 2.01 | 12.08 | $18.36 \times 10^5$ | $-15.15 \times 10^{-5}$ | $7.16 \times 10^5$ | $-16.83 \times 10^{-5}$ | 925 |
| 79.88 | 5.02 | 15.10 | $15.70 \times 10^5$ | $-13.51 \times 10^{-5}$ | $6.44 \times 10^5$ | $-15.72 \times 10^{-5}$ | 835 |
| 86.93 | 10.06 | 3.01 | $15.15 \times 10^5$ | $+2.23 \times 10^{-5}$ | $6.21 \times 10^5$ | $+1.96 \times 10^{-5}$ | 205 |
| 69.78 | 10.07 | 20.15 | $14.67 \times 10^5$ | $-9.70 \times 10^{-5}$ | $5.79 \times 10^5$ | $-10.99 \times 10^{-5}$ | 140 |
| 79.80 | 15.10 | 5.10 | $12.50 \times 10^5$ | $+5.99 \times 10^{-5}$ | $5.26 \times 10^5$ | $+4.65 \times 10^{-5}$ | 132 |
| 74.77 | 15.13 | 10.10 | $16.34 \times 10^5$ | $-10.56 \times 10^{-5}$ | $6.60 \times 10^5$ | $-12.00 \times 10^{-5}$ | 143 |
| 78.84 | 20.15 | 5.01 | $13.30 \times 10^5$ | $-11.51 \times 10^{-5}$ | $5.41 \times 10^5$ | $-12.41 \times 10^{-5}$ | 134 |

TABLE 10B
Physical properties of Mn-Ni-Co alloys

| Alloy composition | | | Young's modulus (kg./cm.², 20° C.) | Temperature coefficient of Young's modulus e, (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Co (percent) | | | | | |

As water quenched after heating at 950° C. for 1 hour, following the annealing of Table 8

| Mn | Ni | Co | Young's | Temp. Y | Rigidity | Temp. R | Hardness |
|---|---|---|---|---|---|---|---|
| 86.80 | 6.12 | 7.08 | $13.25 \times 10^5$ | $-19.12 \times 10^{-5}$ | $5.10 \times 10^5$ | $-19.96 \times 10^{-5}$ | 305 |
| 86.87 | 9.10 | 4.03 | $11.37 \times 10^5$ | $-5.36 \times 10^{-5}$ | $5.08 \times 10^5$ | $-7.22 \times 10^{-5}$ | 282 |
| 84.94 | 10.01 | 5.05 | $10.13 \times 10^5$ | $+16.27 \times 10^{-5}$ | $5.07 \times 10^5$ | $+14.15 \times 10^{-5}$ | 280 |
| 82.94 | 15.06 | 2.00 | $13.65 \times 10^5$ | $+10.61 \times 10^{-5}$ | $4.76 \times 10^5$ | $+8.63 \times 10^{-5}$ | 172 |
| 80.90 | 15.04 | 4.06 | $13.77 \times 10^5$ | $-15.96 \times 10^{-5}$ | $4.87 \times 10^5$ | $-16.27 \times 10^{-5}$ | 200 |
| 78.88 | 20.05 | 1.07 | $13.19 \times 10^5$ | $+5.56 \times 10^{-5}$ | $4.86 \times 10^5$ | $+3.93 \times 10^{-5}$ | 156 |

Tempered by cooling at 100° C./hour after heating at 200° C. for 1 hour, following the above referred water quenching

| Mn | Ni | Co | Young's | Temp. Y | Rigidity | Temp. R | Hardness |
|---|---|---|---|---|---|---|---|
| 86.80 | 6.12 | 7.08 | $13.20 \times 10^5$ | $-19.65 \times 10^{-5}$ | $5.09 \times 10^5$ | $-20.00 \times 10^{-5}$ | 290 |
| 86.87 | 9.10 | 4.03 | $11.15 \times 10^5$ | $-16.73 \times 10^{-5}$ | $5.02 \times 10^5$ | $-17.18 \times 10^{-5}$ | 273 |
| 83.95 | 10.02 | 6.03 | $9.89 \times 10^5$ | $+10.25 \times 10^{-5}$ | $5.00 \times 10^5$ | $+8.36 \times 10^{-5}$ | 265 |
| 82.94 | 15.06 | 2.00 | $12.91 \times 10^5$ | $+15.37 \times 10^{-5}$ | $4.77 \times 10^5$ | $+13.21 \times 10^{-5}$ | 145 |
| 80.90 | 15.04 | 4.06 | $12.82 \times 10^5$ | $-9.22 \times 10^{-5}$ | $4.79 \times 10^5$ | $-11.63 \times 10^{-5}$ | 177 |
| 78.88 | 20.05 | 1.07 | $12.98 \times 10^5$ | $+0.98 \times 10^{-5}$ | $4.63 \times 10^5$ | $+0.65 \times 10^{-5}$ | 136 |

Tempered by cooling at 100° C./hour after heating at 400° C. for 1 hour, following the above referred water quenching

| Mn | Ni | Co | Young's | Temp. Y | Rigidity | Temp. R | Hardness |
|---|---|---|---|---|---|---|---|
| 86.80 | 6.12 | 7.08 | $12.85 \times 10^5$ | $-18.85 \times 10^{-5}$ | $5.02 \times 10^5$ | $-19.22 \times 10^{-5}$ | 270 |
| 86.87 | 9.10 | 4.03 | $10.91 \times 10^5$ | $-17.65 \times 10^{-5}$ | $4.98 \times 10^5$ | $-18.36 \times 10^{-5}$ | 255 |
| 83.95 | 10.02 | 6.03 | $9.50 \times 10^5$ | $+9.25 \times 10^{-5}$ | $4.97 \times 10^5$ | $+7.39 \times 10^{-5}$ | 252 |
| 82.94 | 15.06 | 2.00 | $12.37 \times 10^5$ | $+5.56 \times 10^{-5}$ | $4.46 \times 10^5$ | $+3.17 \times 10^{-5}$ | 120 |
| 80.90 | 15.04 | 4.06 | $12.30 \times 10^5$ | $-10.25 \times 10^{-5}$ | $4.85 \times 10^5$ | $-12.96 \times 10^{-5}$ | 154 |
| 78.88 | 20.05 | 1.07 | $12.56 \times 10^5$ | $+12.15 \times 10^{-5}$ | $4.20 \times 10^5$ | $+11.54 \times 10^{-5}$ | 118 |

Tempered by cooling at 100° C./hour after heating at 600° C. for 1 hour, following the above referred water quenching

| Mn | Ni | Co | Young's | Temp. Y | Rigidity | Temp. R | Hardness |
|---|---|---|---|---|---|---|---|
| 83.92 | 11.02 | 5.06 | $13.33 \times 10^5$ | $-18.25 \times 10^{-5}$ | $5.09 \times 10^5$ | $-19.30 \times 10^{-5}$ | 302 |
| 82.94 | 15.06 | 2.00 | $11.39 \times 10^5$ | $-2.27 \times 10^{-5}$ | $5.08 \times 10^5$ | $-3.35 \times 10^{-5}$ | 285 |
| 80.90 | 15.04 | 4.06 | $10.02 \times 10^5$ | $-10.63 \times 10^{-5}$ | $5.00 \times 10^5$ | $-11.92 \times 10^{-5}$ | 260 |
| 78.88 | 20.05 | 1.07 | $10.09 \times 10^5$ | $+5.25 \times 10^{-5}$ | $4.96 \times 10^5$ | $+3.65 \times 10^{-5}$ | 261 |

TABLE 11

Relation between cooling speed and temperature coefficient of Young's modulus $e$, 0° C. to 40° C, for Mn-Ni-Fe and Mn-Ni-Co alloys

| Alloy composition | | | | Cooling speed after heating at 950° C. for 1 hour | | | | |
|---|---|---|---|---|---|---|---|---|
| Mn (percent) | Ni (percent) | Fe (percent) | Co (percent) | 170° C./sec. (water quenched) | 9° C./sec. (air quenched) | 500° C./hour (annealed) | 100° C./hour (annealed) | 10° C./hour (annealed) |
| 86.93 | 10.06 | 3.01 | | $+1.25 \times 10^{-5}$ | $+1.25 \times 10^{-5}$ | $+1.25 \times 10^{-5}$ | $+1.25 \times 10^{-5}$ | $+1.25 \times 10^{-5}$ |
| 69.78 | 10.07 | 20.15 | | $+1.42 \times 10^{-5}$ | $-1.00 \times 10^{-5}$ | $-5.02 \times 10^{-5}$ | $-5.58 \times 10^{-5}$ | $-6.70 \times 10^{-5}$ |
| 73.86 | 15.11 | 11.03 | | $+18.25 \times 10^{-5}$ | $+13.70 \times 10^{-5}$ | $+6.83 \times 10^{-5}$ | $+5.66 \times 10^{-5}$ | $+3.90 \times 10^{-5}$ |
| 74.84 | 20.15 | 5.01 | | $-6.09 \times 10^{-5}$ | $-6.50 \times 10^{-5}$ | $-7.00 \times 10^{-5}$ | $-7.15 \times 10^{-5}$ | $-7.30 \times 10^{-5}$ |
| 84.94 | 10.01 | | 5.05 | $+16.10 \times 10^{-5}$ | $+4.00 \times 10^{-5}$ | $+8.60 \times 10^{-5}$ | $-16.90 \times 10^{-5}$ | $-21.50 \times 10^{-5}$ |
| 84.95 | 13.03 | | 2.02 | $+2.30 \times 10^{-5}$ | $-3.60 \times 10^{-5}$ | $-10.50 \times 10^{-5}$ | $-13.00 \times 10^{-5}$ | $-15.50 \times 10^{-5}$ |
| 80.90 | 15.04 | | 4.06 | $+5.30 \times 10^{-5}$ | $+1.50 \times 10^{-5}$ | $-3.30 \times 10^{-5}$ | $-5.00 \times 10^{-5}$ | $-6.50 \times 10^{-5}$ |
| 79.90 | 10.02 | | 10.08 | $-25.50 \times 10^{-5}$ | $-26.70 \times 10^{-5}$ | $-27.60 \times 10^{-5}$ | $-28.10 \times 10^{-5}$ | $-28.50 \times 10^{-5}$ |

As can be seen from FIGS. 19A, 19B, 20A to 20E, and 21A to 21D, manganese-nickel-iron and manganese-nickel-cobalt alloys, consisting of 60 to 95 wt. percent of manganese, up to 40 wt. percent of nickel, and either up to 30 wt. percent of iron or up to 20 wt. percent of cobalt, respectively, have temperature coefficient of Young's modulus $e$ ranging from a comparatively large negative value to a comparatively large positive value, depending on the composition of the alloys, in any of the states as annealed (A), as cold-work (B) with a working rate of 95% after the annealing, and as tempered (B') after the cold-work. Accordingly, those Mn-Ni-Fe and Mn-Ni-Co alloys, whose temperature coefficient of Young's modulus $e$ falls in a range crossing the zero line between a negative value domain and a positive value domain, have the so-called Elinvar characteristics or temperature-independent elasticity.

As can be seen from FIGS. 22A to 22E and FIGS. 23A to 23D, the manganese-nickel-iron and manganese-nickel-cobalt ternary alloys, consisting of 60 to 95 wt. percent of manganese, up to 40 wt. percent of nickel, and either up to 30 wt. percent of iron or up to 20 wt. percent of cobalt, respectively, have temperature cofficient of Young's modulus $e$, which varies greatly depending on the composition of the alloys in any of the states as water quenched (C) after the annealing, and as tempered (C') after the water quenching. Accordingly, the manganese-nickel-iron and manganese-nickel-cobalt ternary alloys as water quenched (C) and as the tempered (C') can also have the so-called Elinvar characteristics.

In the case of FIGS. 20A and 21A, the working rate for the cold-work process was 96%. FIGS. 24A and 24B illustrate the effects of different working rates, or different degrees of cold-work, on the temperature coefficient of Young's modulus $e$, for four different Mn-Ni-Fe ternary alloys and four different Mn-Ni-Co ternary alloys of the invention. As can be seen from the figures, the temperature coefficient $e$ of the alloys of the invention can be improved by cold-work, even by slight cold-work with a working rate as small as 1%.

In the case of the heat treatments of FIGS. 19A, 19B, 22A, and 23A, the annealing was carried out by cooling at a speed of 100° C./hour after heating at 950° C. for 1 hour, while the quenching is effected by using water cooling from 950° C. Table 11 and FIGS. 25A and 25B show how the temperature coefficient of Young's modulus $e$ is affected by variation of the cooling speed and the quenching temperature. It is apparent from Table 11 and FIGS. 25A and 25B that the temperature coefficient $e$ is greatly affected by the cooling speed and the quenching temperature.

Since the physical properties of the alloys of the invention are greatly affected by the working rate of cold-work, the quenching temperature, and the cooling speed, the shape of the curves of FIGS. 20A to 20E, 21A to 21D, 22A to 22E, and 23A to 24D may well be greatly changed if the working rate, quenching temperature, and/or the cooling speed are changed from those on which the curves of the figures are based.

EXAMPLE 4

Ingredients of different samples (each weighing about 500 grams) of alloys of the invention, consisting of 40 to 95 wt. percent of manganese, 1 to 40 wt. percent of nickel, and suitable amounts of other elements (for instance, as shown in Table 12), were melted in alumina crucibles, which were disposed in a high-frequency induction furnace or an electric resistance furnace, while passing argon gas therethrough. The molten ingredients were thoroughly agitated, and poured into iron moulds, for producing cylindrical ingots of about 100 mm. dia.

The ingots thus produced were heated at 950° C. for 1 hour and cooled at a speed of 100° C./hour, and swaged at room temperature into round rods of about 2 mm. dia. with a working rate of 96%, i.e., the cross sectional area of the ingots was reduced by 96%. The round rods were cut into about 11 cm. long specimens, which were used for the measurement of the effects of the aforesaid cold-work of the process (B).

Some of the about 11 cm. long specimens of about 2 mm. dia. were heated at 950° C. for 1 hour. It is known to those skilled in the art that, as far as the resiliency of alloys is concerned, such heating at a solution treatment temperature (e.g., 950° C.) for 1 hour brings the alloy structure to a condition prior to the cold-work of the process (B). Accordingly, the ensuing slow cooling of the metal thus heated may result in the aforesaid annealing of the process (A), and the ensuing quick water cooling of the metal thus heated may result in the aforesaid water quenching of the process (C).

Thus, the about 11 cm. long specimens of about 2 mm. dia. were divided into two groups after the heating at 950° C. The first group specimens were annealed by cooling at a speed of 100° C./hour, which were used for the measurement of the effects of the aforesaid annealing of the process (A). The second group specimens were quenched for the measurement of the effects of the aforesaid water quenching of the process (C).

Some of the aforesaid specimens subjected to the cold-work of the process (B) and the quenching of the process (C) were again heated at various temperatures below 950° C. for 1 hour, and cooled at a speed of 100° C./hour, so as to provide specimens for the measurement of the effects of the tempering treatment of the processes (B') and (C'), respectively.

The Young's modulus of the specimens was determined by measuring the resonant frequency thereof by a device having a sensitive electrostatic capacitor, and calculating the Young's modulus from the resonant frequency thus measured.

The coefficient of linear expansion $\alpha$ of the specimens in the proximity of room temperature was measured by using a precision linear dilatometer of vertical type.

The results of the measurements, for the case of manganese-nickel-molybdenum and manganese-nickel-tungsten ternary alloys, are shown in FIGS. 31A to 42E.

Figure 31A:
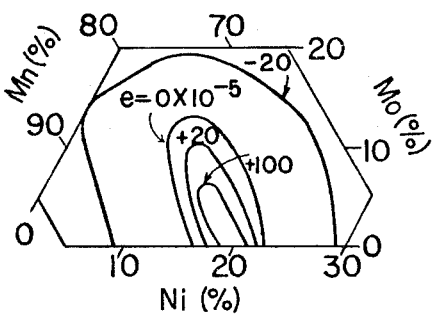
FIG. 31A is a diagram illustrating the relations between the composition of manganese-nickel-molybdenum ternary alloy of the invention and the mean temperature coefficient of Young's modulus thereof, 0° C. to 40° C., for the state as annealed.
Figure 31B:
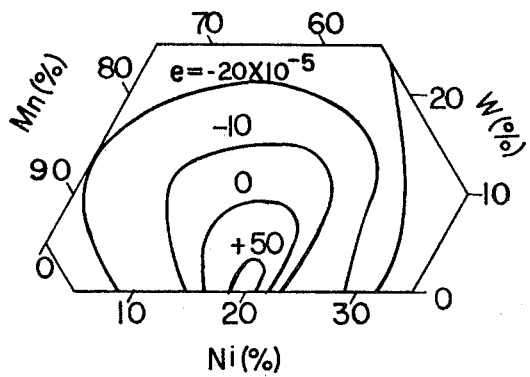
FIG. 31B is a diagram similar to FIG. 31A, illustrating the relations between the composition of manganese-nickel-tungsten ternary alloy of the invention and the mean temperature coefficient of Young's modulus thereof, 0° C. to 40° C., for the state as annealed.

FIGS. 31A and 31B show the relation between the composition of the manganese-nickel-molybdenum and manganese-nickel-tungsten ternary alloys and the mean temperature coefficient of Young's modulus $e$ thereof between 0° C. to 40° C. in the state as annealed by the process (A), respectively.

Figure 32A:
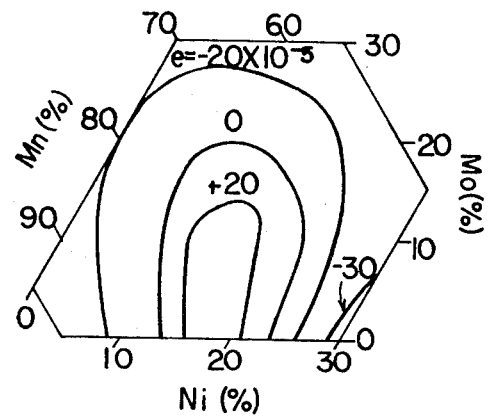
FIGS. 32A to 32E are diagrams similar to FIG. 31A, illustrating similar relations for the manganese-nickel-molybdenum ternary alloys of the invention, for the state as cold-worked and for the state as tempered under different conditions after the cold-work.
Figure 32B:
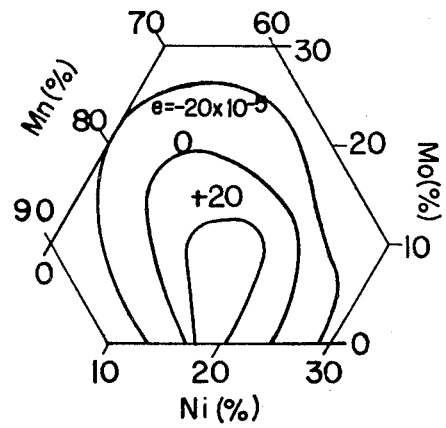
Figure 32C:
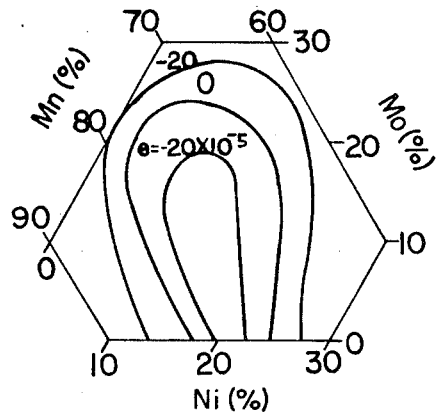
Figure 32D:
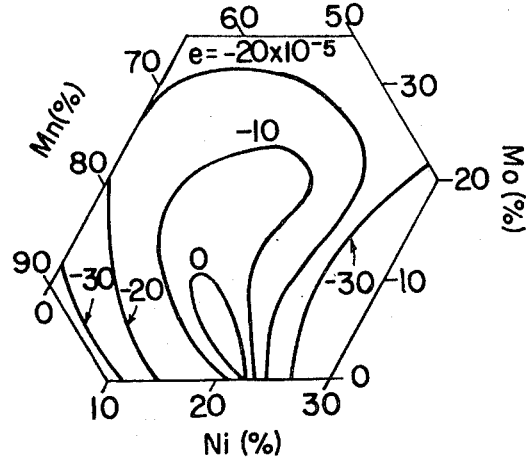
Figure 32E:
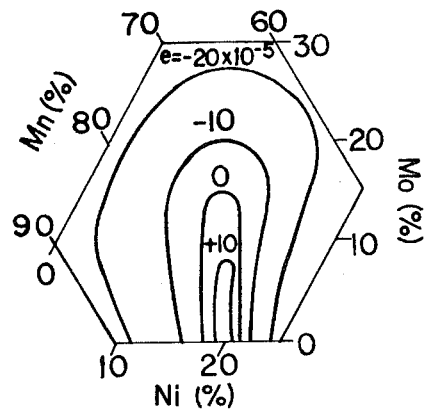
Figure 33A:
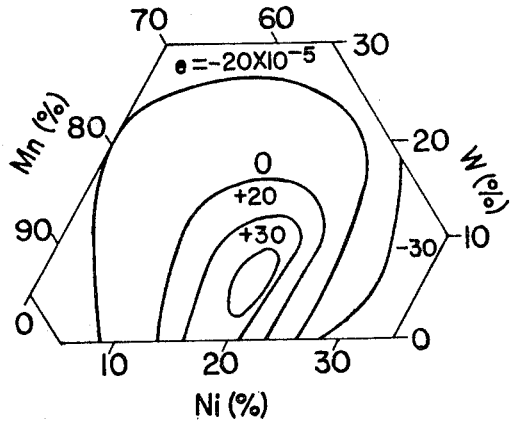
FIGS. 33A to 33E are diagrams similar to FIG. 31B, illustrating similar relations for the manganese-nickel-tungsten ternary alloys of the invention, for the state as cold-worked and for the state as tempered under different conditions after the cold-work.
Figure 33B:
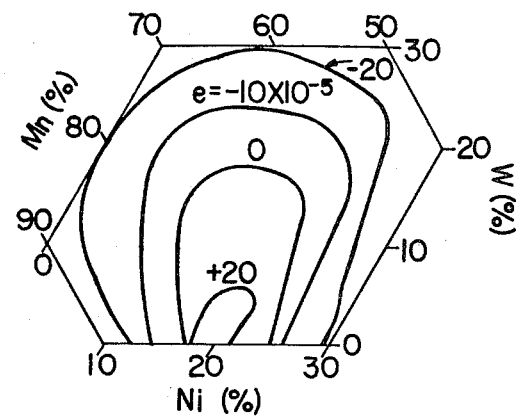
Figure 33C:
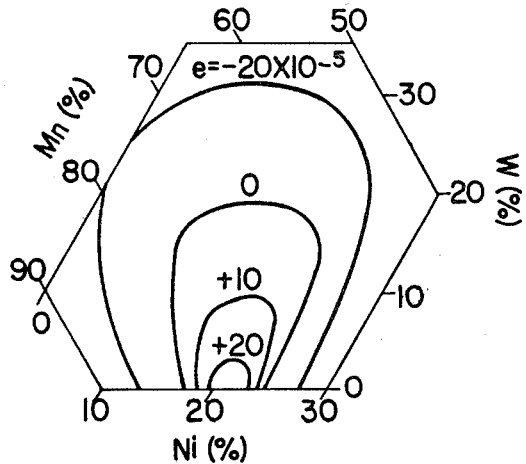
Figure 33D:
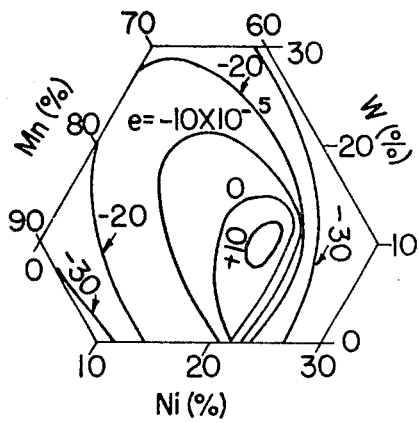
Figure 33E:
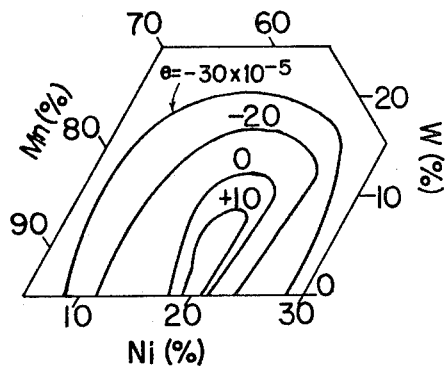

FIGS. 32A and 33A show the relation between the composition of the manganese-nickel-molybdenum and manganese-nickel-tungsten ternary alloys and the means temperature coefficient of Young's modulus $e$ thereof, 0° C. to 40° C., for the state as cold-worked (B) after the annealing, respectively. FIGS. 32B to 32E and FIGS. 33B to 33E show similar relation for the same alloys, respectively, for the state as tempered (B′) by cooling at a speed of 100° C./hour after heating at different temperatures for one hour.

Figure 34A:
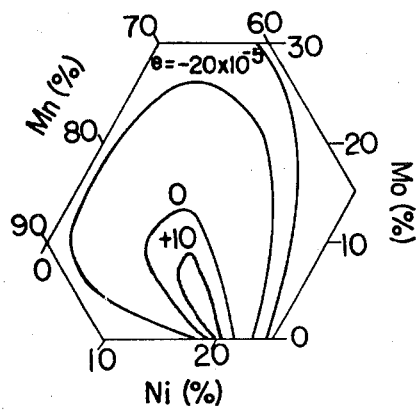
FIGS. 34A to 34E are diagrams similar to FIGS. 32A to 32E, respectively, illustrating similar relations for the manganese-nickel-molybdenum ternary alloys of the invention, for the state as water quenched and for the state as tempered under different conditions after the water quenching.
Figure 34B:
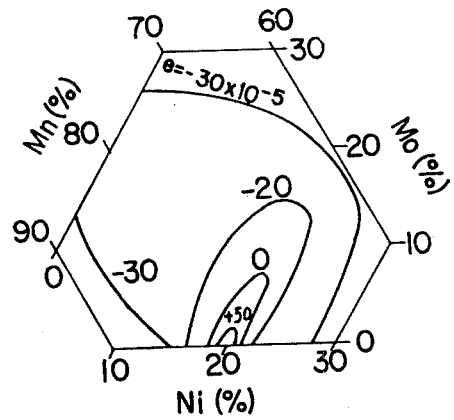
Figure 34C:
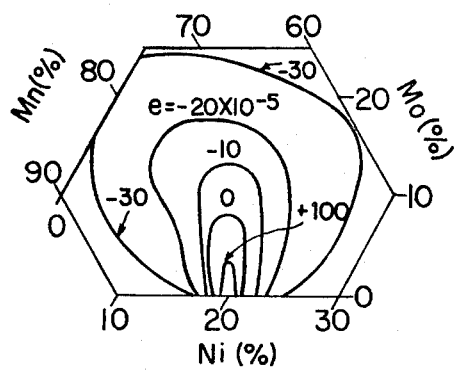
Figure 34D:
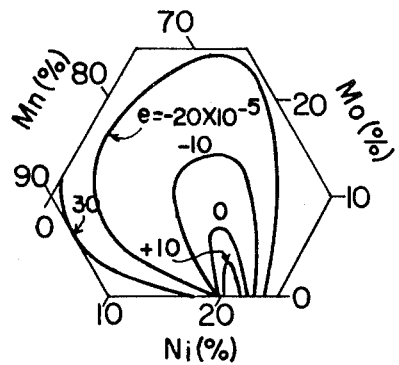
Figure 34E:
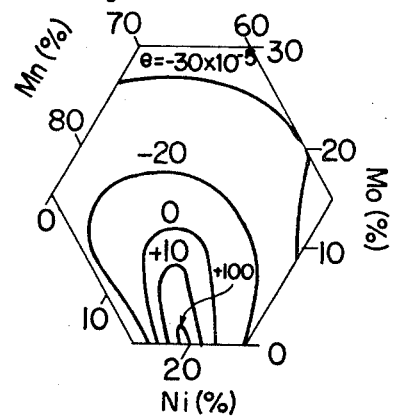
Figure 35A:
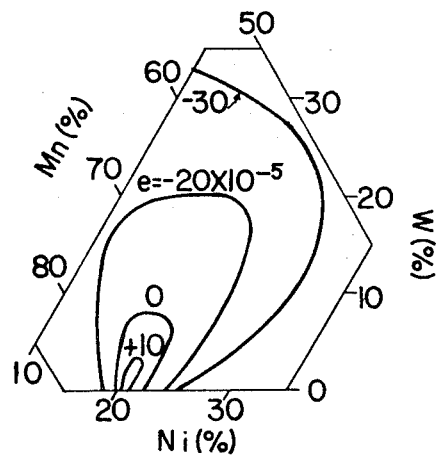
FIGS. 35A to 35E are diagrams similar to FIGS. 33A to 33E, respectively, illustrating similar relations for the manganese-nickel-tungsten ternary alloys of the invention, for the state as water quenched and for the state as tempered at different temperatures after the water quenching.
Figure 35B:
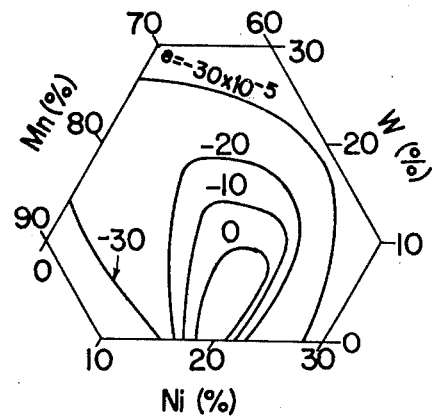
Figure 35C:
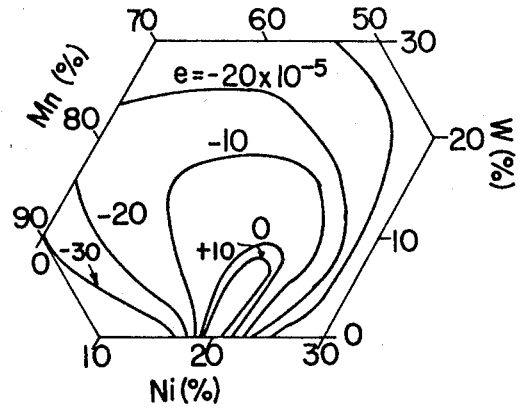
Figure 35D:
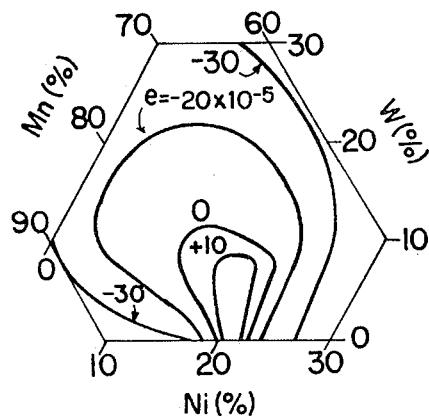
Figure 35E:
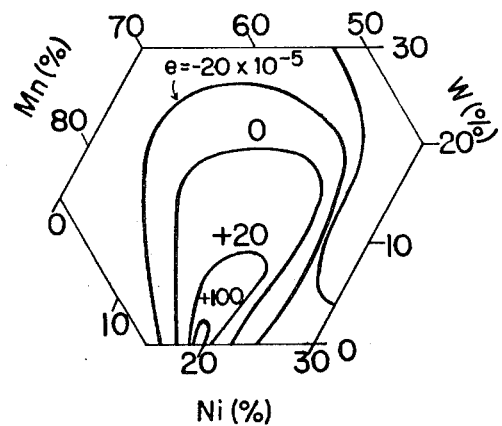

FIGS. 34A and 35A show the similar relation for the same manganese-nickel-molybdenum and manganese-nickel-tungsten ternary alloys, respectively, for the state as water quenched (C) after the annealing. FIGS. 34B to 34E and FIGS. 35B to 35E show similar relation for the same alloys, respectively, for the state as tempered (C′) by cooling at a speed of 100° C./hour after heating for one hour at different temperatures.

Tables 12, 13, and 14 summarize typical measured values of physical properties, inclusive of Vickers hardness, of manganese - nickel - molybdenum, manganese-nickel-tungsten ternary and manganese-nickel-molybdenum-tungsten quaternary alloys having compositions of the present invention.

Table 15 shows the relation between the cooling speed and the temperature coefficient of Young's modulus $e$, 0° C. to 40° C., for three manganese-nickel-tungsten alloys, three manganese-nickel-molybdenum alloys and two manganese-nickel-molybdenum-tungsten alloys.

Table 16, Tables 17A to 17W, and Tables 18A to 18W illustrate the variation of physical properties caused by different heat treatments and cold-work, for ternary alloys consisting of manganese-nickel base composition plus a third element other than molybdenum and tungsten.

Figure 36A:
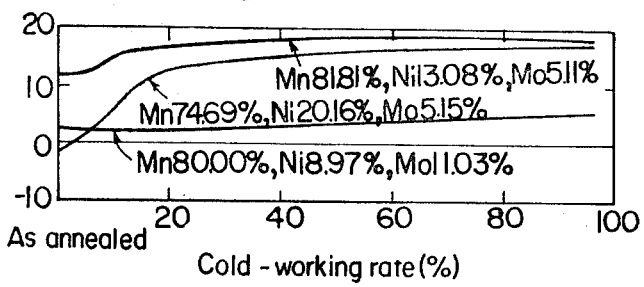
FIG. 36A is a graph, showing the relations between the mean temperature coefficient of Young's modulus, 0° C. to 40° C., of three different manganese-nickel-molybdenum ternary alloys of the invention and the working rate of cold-work applied thereto.
Figure 36B:
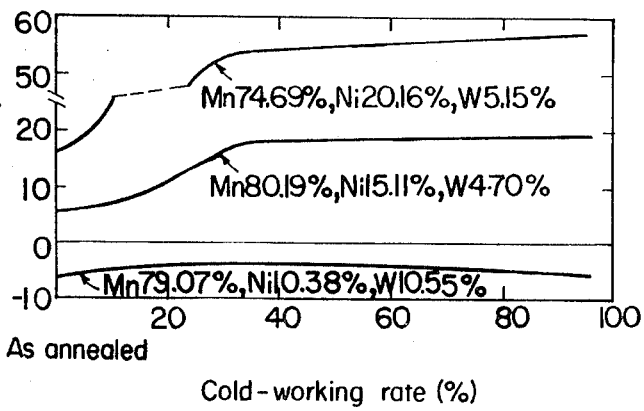
FIG. 36B is a graph similar to FIG. 36A, showing similar relations for three different manganese-nickel-tungsten ternary alloys of the invention.

FIGS. 36A and 36B illustrate the relation between the working rate for the cold-work and the temperature coefficient of Young's modulus $e$, 0° C. to 40° C., for three of the alloys as shown in Table 15.

Figure 37A:
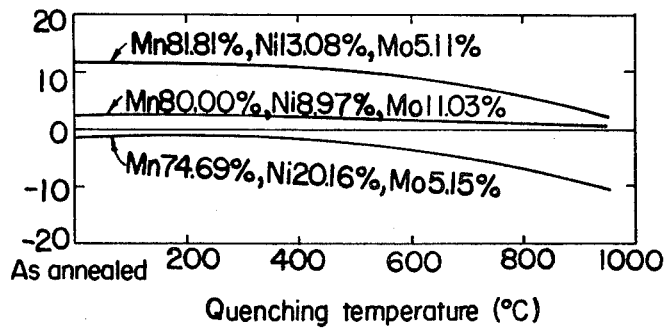
FIG. 37A is a graph, showing the relation between the mean temperature coefficient of Young's modulus, 0° C. to 40° C., of the three manganese-nickel-molybdenum ternary alloys of the invention and the quenching temperature of the water quenching applied thereto.
Figure 37B:
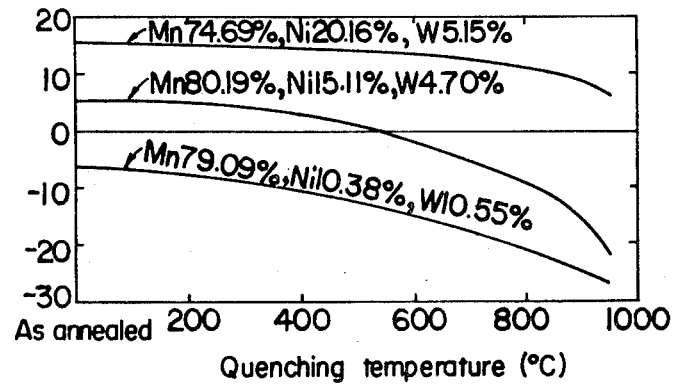
FIG. 37B is a graph similar to FIG. 37A, illustrating similar relations for three manganese-nickel-tungsten ternary alloys of the invention.

Similarly, FIGS. 37A and 37B show the relation between the quenching temperature and the temperature coefficient of Young's modulus $e$, 0° C. to 40° C., for the same three ternary alloys according to the invention as FIGS. 36A and 36B, respectively.

Figure 38A:
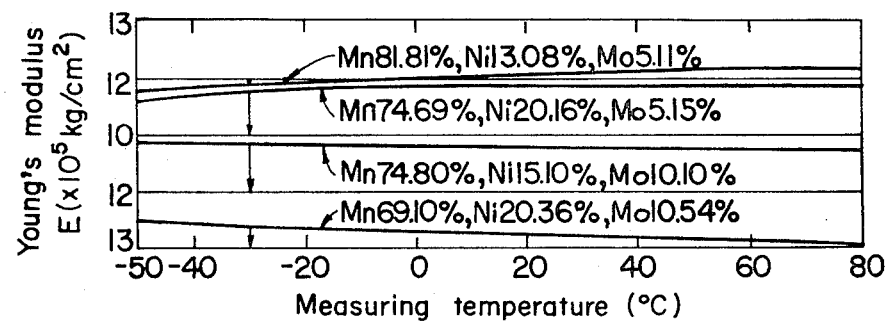
FIG. 38A is a graph showing the Young's modulus of manganese-nickel-molybdenum ternary alloys of the invention at different temperatures, for the state as annealed by cooling at a speed of 100° C./hour after heating at 950° C. for one hour.
Figure 38B:
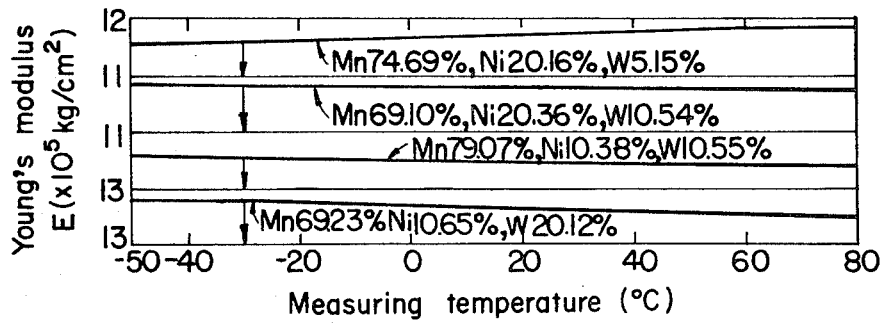
FIG. 38B is a graph similar to FIG. 38A, illustrating the Young's modulus of manganese-nickel-tungsten ternary alloys of the invention, for the state as annealed by cooling at a speed of 100° C./hour after heating at 950° C. for one hour.
Figure 39A:
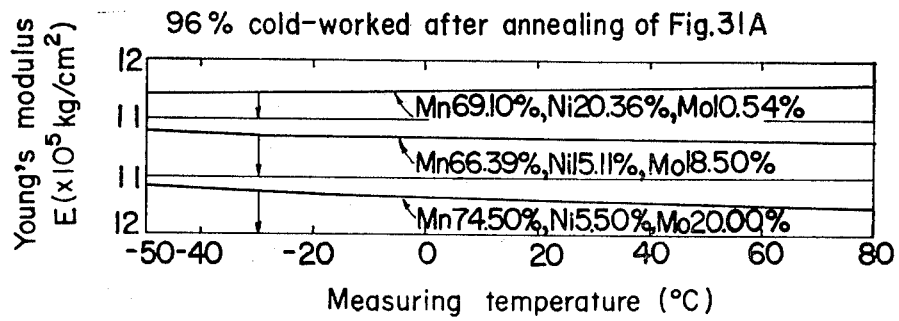
Figure 39B:
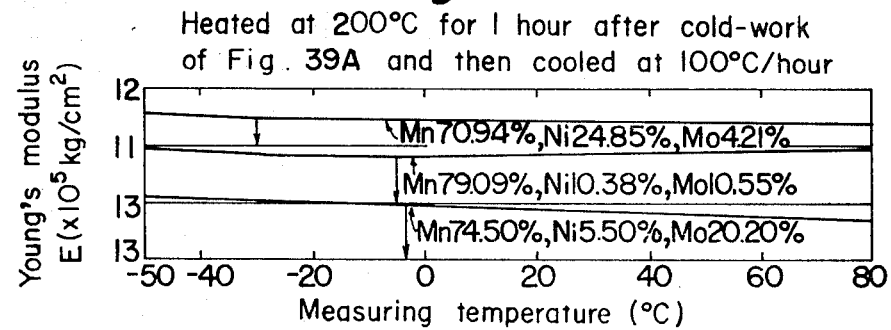
Figure 39C:
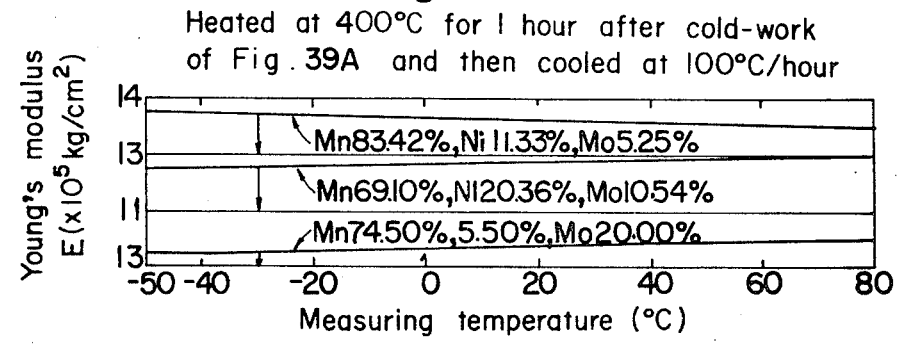
Figure 39D:
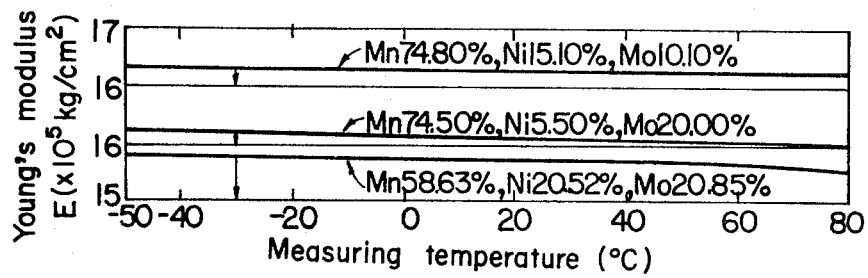
Figure 39E:
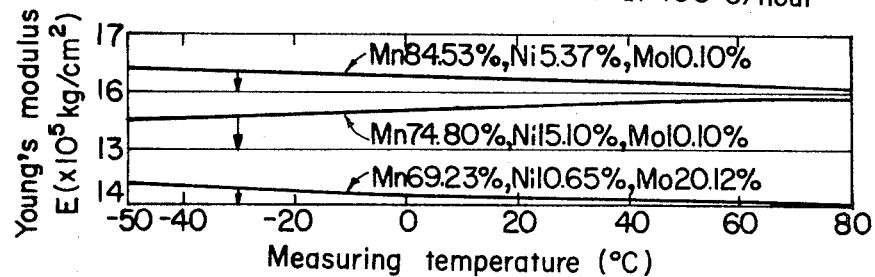
Figure 40A:
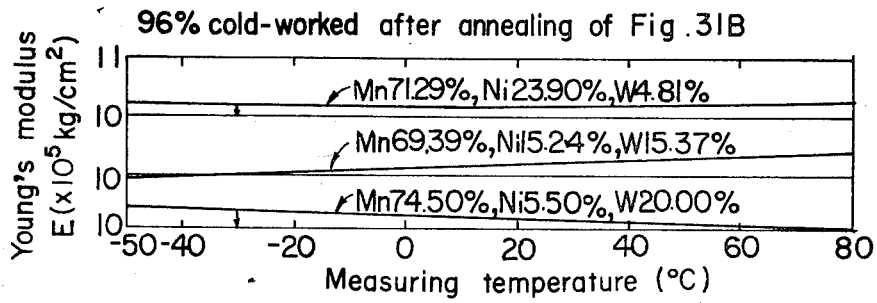
Figure 40B:
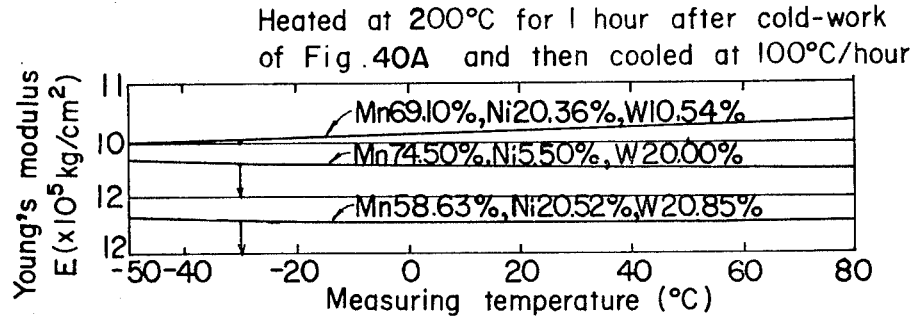
Figure 40C:
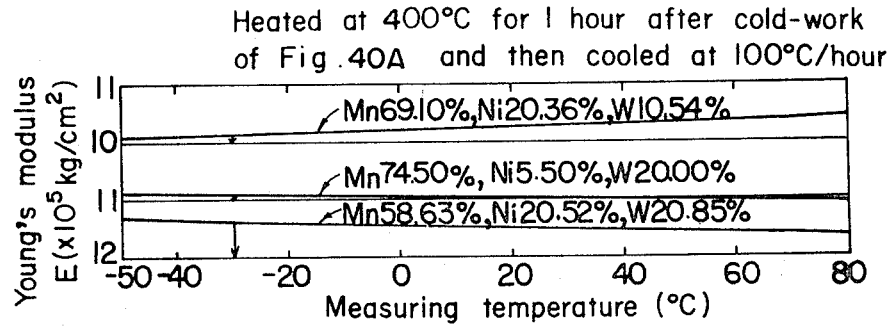
Figure 40D:
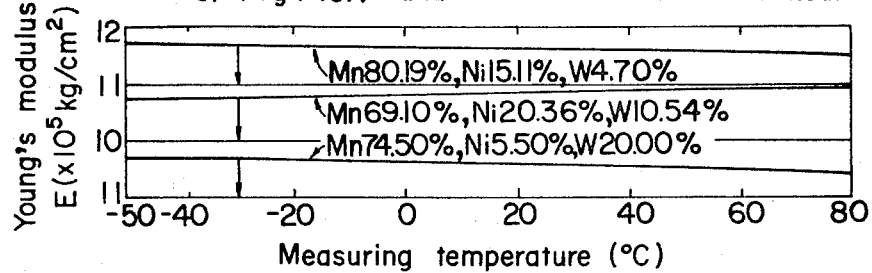
Figure 40E:
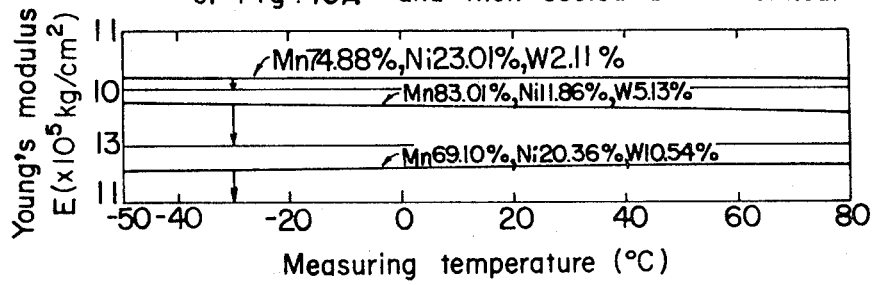
Figure 41A:
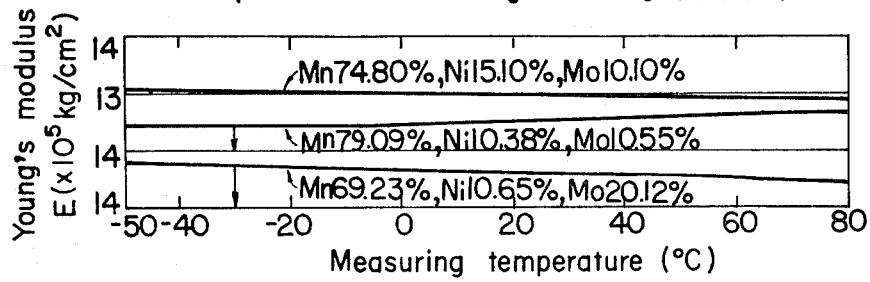
Figure 41B:
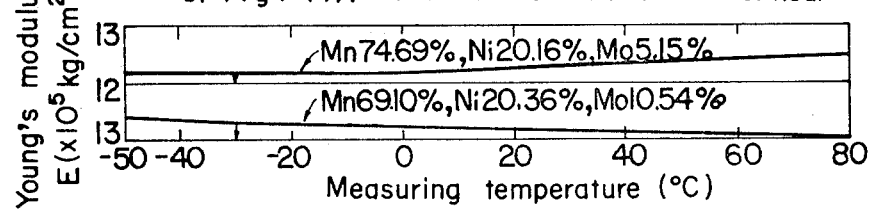
Figure 41C:
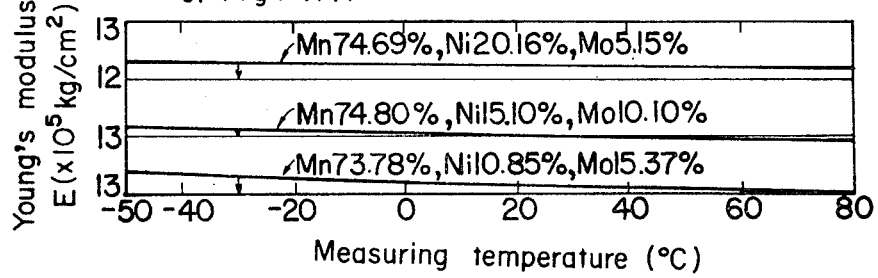
Figure 41D:
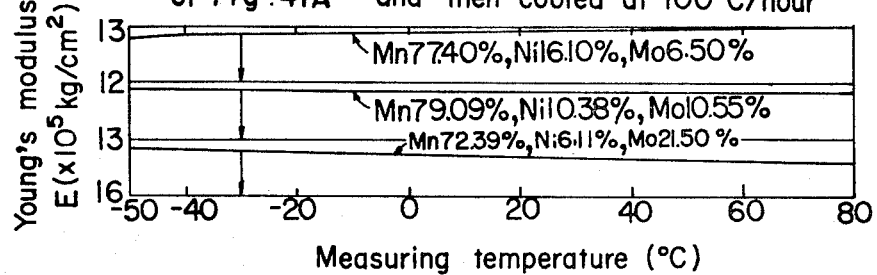
Figure 41E:
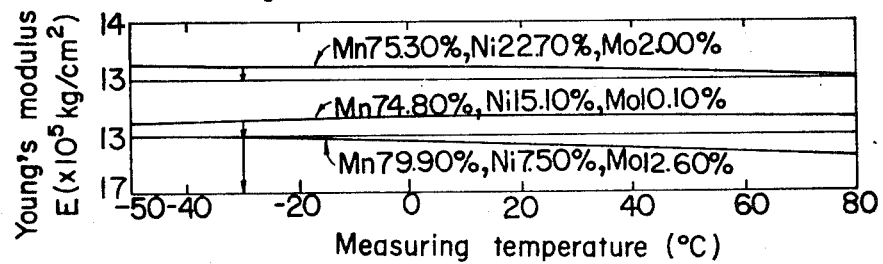
Figure 42A:
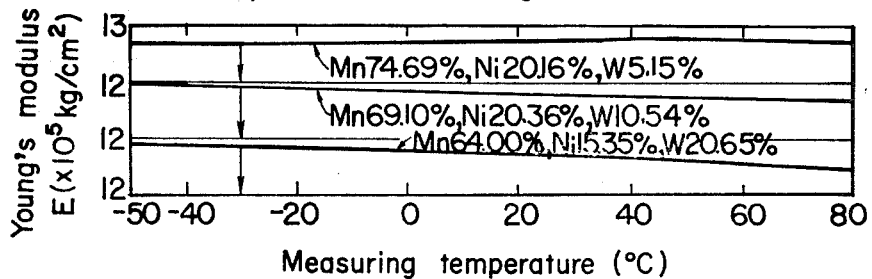
Figure 42B:
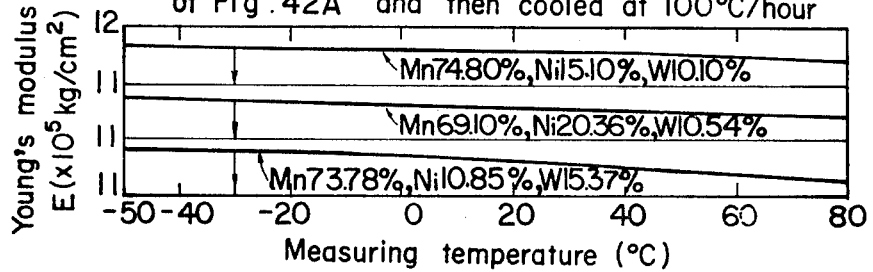
Figure 42C:
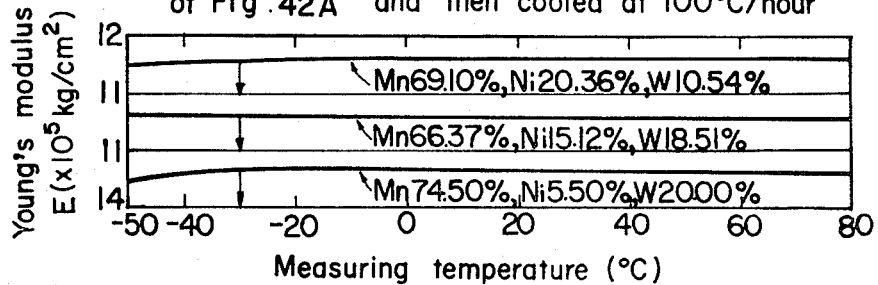
Figure 42D:
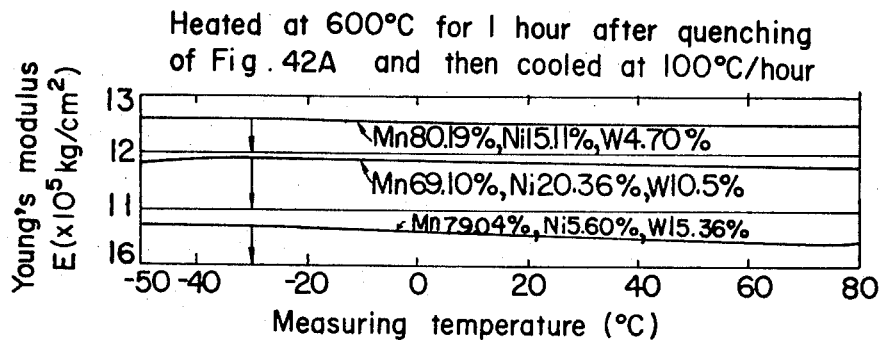
Figure 42E:
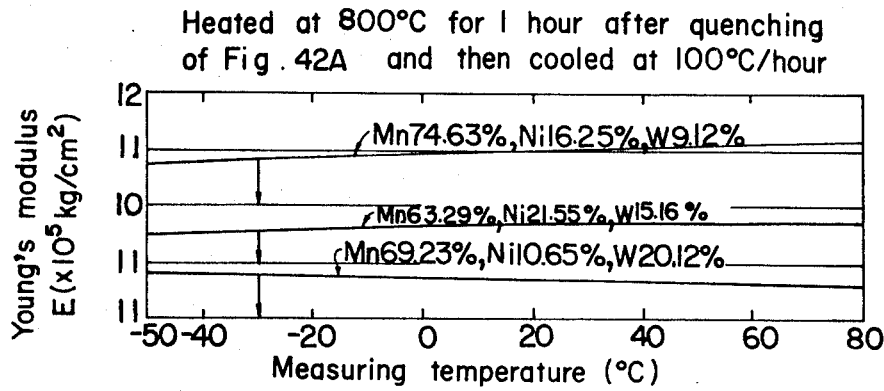

FIGS. 38A and 38B illustrate the values of Young's modulus at various temperatures from −50° C. to 80° C., for different manganese-nickel-molybdenum and manganese-nickel-tungsten ternary alloys of the invention, respectively, in the state as annealed by cooling at a speed of 100° C./hour after heating at 950° C. for one hour.

FIGS. 39A to 39E and FIGS. 40A to 40E show the values of Young's modulus at various temperatures from −50° C. to 80° C., for different manganese-nickel-molybdenum and manganese-nickel-tungsten ternary alloys of the invention, respectively, in the state as cold-worked with a working rate of 96% after the annealing of FIGS. 38A and 38B, respectively, and in the states as tempered by cooling at a speed of 100° C./hour after heating at different temperatures for one hour following the above referred cold-work, respectively.

FIGS. 41A to 41E and FIGS. 42A to 42E show the values of Young's modulus at various temperatures from −50° C. to 80° C., for different manganese-nickel-molybdenum and manganese-nickel-tungsten ternary alloys of the invention, respectively, in the state as water quenched after the annealing of FIGS. 38A and 38B, respectively, and in the states as tempered by cooling at a speed of 100° C./hour after heating at different temperatures for one hour following the above referred water quenching.

TABLE 12

Physical properties of Mn-Ni-Mo, Mn-Ni-W and Mn-Ni-Mo-W alloys, as annealed by cooling at 100°C./hour after heating at 950° C. for 1 hour

| Alloy composition | | | | Young's modulus (kg./cm.², 20° C.) | Temperature coefficient of Young's modulus $e$ (0. to 40° C.) | Modulus of rigidity (kg./cm.², 20° C.) | Temperature coefficient of modulus of rigidity (0 to 40° C.) | Vickers hardness (20° C.) |
| --- | --- | --- | --- | --- | --- | --- | --- | --- |
| Mn (percent) | Ni (percent) | Mo (percent) | W (percent) | | | | | |
| 81.81 | 13.08 | 5.11 | | $12.00 \times 10^5$ | $+11.36 \times 10^{-5}$ | $5.09 \times 10^5$ | $+10.00 \times 10^{-5}$ | 160 |
| 74.69 | 20.16 | 5.15 | | $10.85 \times 10^5$ | $-1.25 \times 10^{-5}$ | $4.73 \times 10^5$ | $-2.32 \times 10^{-5}$ | 130 |
| 74.80 | 15.10 | 10.10 | | $12.72 \times 10^5$ | $-1.55 \times 10^{-5}$ | $5.33 \times 10^5$ | $-2.26 \times 10^{-5}$ | 189 |
| 69.10 | 20.36 | 10.54 | | $13.22 \times 10^5$ | $-15.54 \times 10^{-5}$ | $5.47 \times 10^5$ | $-16.35 \times 10^{-5}$ | 200 |
| 74.69 | 20.16 | | 5.15 | $11.73 \times 10^5$ | $+15.33 \times 10^{-5}$ | $5.01 \times 10^5$ | $+13.85 \times 10^{-5}$ | 148 |
| 69.10 | 20.36 | | 10.54 | $11.75 \times 10^5$ | $-7.62 \times 10^{-5}$ | $5.01 \times 10^5$ | $-8.01 \times 10^{-5}$ | 149 |
| 79.07 | 10.38 | | 10.55 | $13.45 \times 10^5$ | $-6.17 \times 10^{-5}$ | $5.53 \times 10^5$ | $-7.27 \times 10^{-5}$ | 220 |
| 69.23 | 10.65 | | 20.12 | $13.67 \times 10^5$ | $-18.22 \times 10^{-5}$ | $5.61 \times 10^5$ | $-18.89 \times 10^{-5}$ | 230 |
| 74.73 | 20.12 | 2.10 | 3.05 | $13.36 \times 10^5$ | $-2.30 \times 10^{-5}$ | $5.49 \times 10^5$ | $-3.66 \times 10^{-5}$ | 228 |
| 74.81 | 15.10 | 5.05 | 5.05 | $13.65 \times 10^5$ | $-6.20 \times 10^{-5}$ | $5.61 \times 10^5$ | $-7.03 \times 10^{-5}$ | 242 |

TABLE 13

Physical properties of Mn-Ni-Mo, Mn-Ni-W and Mn-Ni-Mo-W alloys

| Alloy composition | | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
| --- | --- | --- | --- | --- | --- | --- | --- | --- |
| Mn (percent) | Ni (percent) | Mo (percent) | W (percent) | | | | | |
| As water quenched after heating at 950° C. for 1 hour, following the annealing of Table 12 | | | | | | | | |
| 74.80 | 15.10 | 10.10 | | $13.00 \times 10^5$ | $-2.25 \times 10^{-5}$ | $5.40 \times 10^5$ | $-4.05 \times 10^{-5}$ | 190 |
| 79.09 | 10.38 | 10.55 | | $14.55 \times 10^5$ | $+2.18 \times 10^{-5}$ | $5.90 \times 10^5$ | $+1.66 \times 10^{-5}$ | 260 |
| 69.23 | 10.65 | 20.12 | | $14.66 \times 10^5$ | $-15.36 \times 10^{-5}$ | $5.91 \times 10^5$ | $-17.25 \times 10^{-5}$ | 280 |
| 74.69 | 20.16 | | 5.15 | $12.75 \times 10^5$ | $+6.37 \times 10^{-5}$ | $5.33 \times 10^5$ | $+4.48 \times 10^{-5}$ | 260 |
| 69.10 | 20.36 | | 10.54 | $12.80 \times 10^5$ | $-11.21 \times 10^{-5}$ | $5.34 \times 10^5$ | $-13.35 \times 10^{-5}$ | 211 |
| 64.00 | 15.35 | | 20.65 | $12.77 \times 10^5$ | $-18.00 \times 10^{-5}$ | $5.33 \times 10^5$ | $-19.00 \times 10^{-5}$ | 209 |
| 74.81 | 15.10 | 5.05 | 5.04 | $13.34 \times 10^5$ | $-2.10 \times 10^{-5}$ | $5.42 \times 10^5$ | $-4.35 \times 10^{-5}$ | 202 |
| 69.35 | 10.33 | 10.08 | 10.24 | $14.58 \times 10^5$ | $-14.25 \times 10^{-5}$ | $5.93 \times 10^5$ | $-14.36 \times 10^{-5}$ | 295 |
| Tempered by colling at 100° C./hour after heating at 200° C. for 1 hour, following the above referred water quenching | | | | | | | | |
| 74.69 | 20.16 | 5.15 | | $12.25 \times 10^5$ | $+10.25 \times 10^{-5}$ | $5.17 \times 10^5$ | $+8.38 \times 10^{-5}$ | 150 |
| 69.10 | 20.36 | 10.54 | | $13.15 \times 10^5$ | $-15.26 \times 10^{-5}$ | $5.45 \times 10^5$ | $-17.35 \times 10^{-5}$ | 191 |
| 74.80 | 16.10 | | 10.10 | $11.62 \times 10^5$ | $-5.13 \times 10^{-5}$ | $4.97 \times 10^5$ | $-7.14 \times 10^{-5}$ | 198 |
| 69.10 | 20.36 | | 10.54 | $11.60 \times 10^5$ | $-7.22 \times 10^{-5}$ | $4.96 \times 10^5$ | $-9.38 \times 10^{-5}$ | 197 |
| 73.78 | 10.85 | | 15.37 | $11.65 \times 10^5$ | $-16.52 \times 10^{-5}$ | $4.97 \times 10^5$ | $-17.39 \times 10^{-5}$ | 205 |
| 74.73 | 20.12 | 2.10 | 3.05 | $12.03 \times 10^5$ | $+9.11 \times 10^{-5}$ | $5.16 \times 10^5$ | $+8.10 \times 10^{-5}$ | 145 |
| 68.64 | 20.72 | 5.44 | 5.20 | $11.54 \times 10^5$ | $-6.34 \times 10^{-5}$ | $4.95 \times 10^5$ | $-8.00 \times 10^{-5}$ | 195 |
| Tempered by cooling at 100° C./hour after heating at 400° C. for 1 hour, following the above referred water quenching | | | | | | | | |
| 74.69 | 20.16 | 5.15 | | $12.25 \times 10^5$ | $-4.27 \times 10^{-5}$ | $5.17 \times 10^5$ | $-6.29 \times 10^{-5}$ | 150 |
| 74.80 | 15.10 | 10.10 | | $13.00 \times 10^5$ | $-5.76 \times 10^{-5}$ | $5.41 \times 10^5$ | $-7.99 \times 10^{-5}$ | 188 |
| 73.78 | 10.85 | 15.37 | | $13.10 \times 10^5$ | $-16.25 \times 10^{-5}$ | $5.44 \times 10^5$ | $-17.05 + 10^{-5}$ | 200 |
| 69.10 | 20.36 | | 10.54 | $11.60 \times 10^5$ | $-1.52 \times 10^{-5}$ | $4.96 \times 10^5$ | $-3.25 \times 10^{-5}$ | 202 |
| 66.37 | 15.12 | | 18.51 | $11.55 \times 10^5$ | $-9.25 \times 10^{-5}$ | $4.95 \times 10^5$ | $-11.36 \times 10^{-5}$ | 190 |
| 74.50 | 5.50 | | 20.00 | $14.60 \times 10^5$ | $-13.63 \times 10^{-5}$ | $5.91 \times 10^5$ | $-14.82 \times 10^{-5}$ | 340 |
| 74.81 | 15.10 | 5.05 | 5.04 | $12.89 \times 10^5$ | $-5.13 \times 10^{-5}$ | $5.40 \times 10^5$ | $-6.65 \times 10^{-5}$ | 193 |
| 68.64 | 20.72 | 5.44 | 5.20 | $11.58 \times 10^5$ | $-0.66 \times 10^{-5}$ | $4.96 \times 10^5$ | $-2.24 \times 10^{-5}$ | 216 |

TABLE 13—Continued

| Alloy composition | | | | Young's modulus (kg./cm.², 20° C.) | Temperature coefficient of Young's modulus e (0. to 40° C.) | Modulus of rigidity (kg./cm.², 20° C.) | Temperature coefficient of modulus of rigidity (0 to 40° C.) | Vicker hardness (20° C.) |
|---|---|---|---|---|---|---|---|---|
| Mn (percent) | Ni (percent) | Mo (percent) | W (percent) | | | | | |
| | Tempered by cooling at 100° C./hour after heating at 600° C. for 1 four, following the above referred water quenching |
| 77.40 | 16.10 | 6.50 | ---------- | 12.90×10⁵ | +1.23×10⁻⁵ | 5.37×10⁵ | +0.66×10⁻⁵ | 170 |
| 79.09 | 10.38 | 10.55 | ---------- | 13.85×10⁵ | −10.00×10⁻⁵ | 5.68×10⁵ | −12.74×10⁻⁵ | 200 |
| 72.39 | 6.11 | 21.50 | ---------- | 16.67×10⁵ | −14.30×10⁻⁵ | 6.53×10⁵ | −16.83×10⁻⁵ | 500 |
| 80.19 | 15.11 | ---------- | 4.70 | 12.55×10⁵ | −0.55×10⁻⁵ | 5.25×10⁵ | −2.00×10⁻⁵ | 295 |
| 69.10 | 20.36 | ---------- | 10.54 | 11.85×10⁵ | −4.30×10⁻⁵ | 5.05×10⁵ | −6.45×10⁻⁵ | 217 |
| 79.04 | 5.60 | ---------- | 15.36 | 16.53×10⁵ | −14.25×10⁻⁵ | 6.51×10⁵ | −16.36×10⁻⁵ | 505 |
| 76.86 | 16.25 | 2.24 | 4.65 | 12.87×10⁵ | +1.58×10⁻⁵ | 5.35×10⁵ | +1.33×10⁻⁵ | 185 |
| 72.44 | 5.95 | 10.01 | 11.60 | 12.45×10⁵ | −12.28×10⁻⁵ | 6.28×10⁵ | −15.75×10⁻⁵ | 442 |
| | Tempered by cooling at 100° C./hour after heating at 800° C. for 1 hour, following the above referred water quenching |
| 75.30 | 22.70 | 2.00 | ---------- | 13.15×10⁵ | −10.25×10⁻⁵ | 5.45×10⁵ | −12.44×10⁻⁵ | 150 |
| 74.80 | 15.10 | 10.10 | ---------- | 13.32×10⁵ | +3.15×10⁻⁵ | 5.51×10⁵ | +1.00×10⁻⁵ | 206 |
| 79.90 | 7.50 | 12.60 | ---------- | 17.85×10⁵ | −15.20×10⁻⁵ | 6.91×10⁵ | −16.16×10⁻⁵ | 600 |
| 74.63 | 16.25 | ---------- | 9.12 | 10.99×10⁵ | +18.22×10⁻⁵ | 4.77×10⁵ | +16.35×10⁻⁵ | 228 |
| 63.29 | 21.55 | ---------- | 15.16 | 11.67×10⁵ | +2.75×10⁻⁵ | 4.92×10⁵ | +1.95×10⁻⁵ | 230 |
| 69.23 | 10.65 | ---------- | 20.12 | 11.63×10⁵ | −6.63×10⁻⁵ | 4.91×10⁵ | −8.75×10⁻⁵ | 231 |
| 74.81 | 15.10 | 5.05 | 5.04 | 13.08×10⁵ | +2.76×10⁻⁵ | 5.48×10⁵ | +2.23×10⁻⁵ | 224 |
| 69.35 | 10.33 | 10.08 | 10.24 | 10.82×10⁴ | −3.63×10⁻⁵ | 4.75×10⁵ | −4.76×10⁻⁵ | 240 |

TABLE 14

Physical properties of Mn-Ni-Mo, Mn-Ni-W and Mn-Ni-Mo-W alloys

| Alloy composition | | | | Young's modulus (kg./cm.², 20° C.) | Temperature coefficient of Young's modulus e (0. to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|---|
| Mn (percent) | Ni (percent) | Mo (percent) | W (percent) | | | | | |
| | As cold-worked with a working rate of 96%, after annealing of Table 12 |
| 69.10 | 20.36 | 10.54 | ---------- | 11.55×10⁵ | +11.00×10⁻⁵ | 4.95×10⁵ | +9.00×10⁻⁵ | 273 |
| 66.39 | 15.11 | 18.50 | ---------- | 11.68×10⁵ | −2.21×10⁻⁵ | 4.99×10⁵ | −4.23×10⁻⁵ | 290 |
| 74.50 | 5.50 | 20.00 | ---------- | 12.55×10⁵ | −14.15×10⁻⁵ | 5.27×10⁵ | −16.22×10⁻⁵ | 350 |
| 71.29 | 23.90 | ---------- | 4.81 | 10.15×10⁵ | +0.25×10⁻⁵ | 4.51×10⁵ | +0.11×10⁻⁵ | 242 |
| 69.39 | 15.24 | ---------- | 15.37 | 10.14×10⁵ | +9.00×10⁻⁵ | 4.51×10⁵ | −7.35×10⁻⁵ | 240 |
| 74.50 | 5.50 | ---------- | 20.00 | 10.18×10⁵ | −16.33×10⁻⁵ | 4.52×10⁵ | −17.18×10⁻⁵ | 245 |
| 68.64 | 20.72 | 5.44 | 5.20 | 11.25×10⁵ | +11.24×10⁻⁵ | 4.96×10⁵ | −8.83×10⁻⁵ | 285 |
| 66.14 | 15.36 | 10.20 | 8.30 | 11.44×10⁵ | −2.50×10⁻⁵ | 4.98×10⁵ | −3.20×10⁻⁵ | 280 |
| | Tempered by cooling at 100° C. hour after heating at 200° C. for 1 hour, following the above referred cold-work |
| 70.94 | 24.85 | 4.21 | ---------- | 11.45×10⁵ | −5.19×10⁻⁵ | 4.92×10⁵ | −7.25×10⁻⁵ | 250 |
| 79.09 | 10.38 | 10.55 | ---------- | 13.85×10⁵ | +6.57×10⁻⁵ | 5.65×10⁵ | +5.11×10⁻⁵ | 400 |
| 74.50 | 5.50 | 20.00 | ---------- | 13.86×10⁵ | −12.00×10⁻⁵ | 5.67×10⁵ | −10.35×10⁻⁵ | 405 |
| 69.10 | 20.36 | ---------- | 10.54 | 10.18×10⁵ | +9.12×10⁻⁵ | 4.53×10⁵ | +7.19×10⁻⁵ | 247 |
| 74.50 | 5.50 | ---------- | 20.00 | 12.55×10⁵ | −10.35×10⁻⁵ | 5.27×10⁵ | −12.50×10⁻⁵ | 400 |
| 58.63 | 20.52 | ---------- | 20.85 | 12.58×10⁵ | −8.23×10⁻⁵ | 5.27×10⁵ | −10.55×10⁻⁵ | 266 |
| 70.91 | 24.63 | 2.20 | 2.26 | 13.77×10⁵ | −5.00×10⁻⁵ | 5.64×10⁵ | −4.88×10⁻⁵ | 285 |
| 79.35 | 10.10 | 5.30 | 5.25 | 13.63×10⁵ | +5.11×10⁻⁵ | 5.61×10⁵ | +4.76×10⁻⁵ | 366 |
| | Tempered by cooling at 100° C. hour after heating at 400° C. for 1 hour, following the above referred cold-work |
| 83.42 | 11.33 | 5.25 | ---------- | 13.63×10⁵ | −16.77×10⁻⁵ | 5.60×10⁵ | −18.68×10⁻⁵ | 380 |
| 69.10 | 20.36 | 10.54 | ---------- | 11.90×10⁵ | +5.35×10⁻⁵ | 5.05×10⁵ | +3.96×10⁻⁵ | 290 |
| 24.50 | 5.50 | 20.00 | ---------- | 13.40×10⁵ | +9.96×10⁻⁵ | 5.53×10⁵ | +8.00×10⁻⁵ | 330 |
| 69.10 | 20.36 | ---------- | 10.54 | 10.25×10⁵ | +8.36×10⁻⁵ | 4.53×10⁵ | +6.65×10⁻⁵ | 227 |
| 74.50 | 5.60 | ---------- | 20.00 | 11.00×10⁵ | −11.22×10⁻⁵ | 4.78×10⁵ | −13.38×10⁻⁵ | 280 |
| 58.63 | 20.52 | ---------- | 20.85 | 12.50×10⁵ | −16.05×10⁻⁵ | 5.23×10⁵ | −18.23×10⁻⁵ | 251 |
| 74.73 | 20.12 | 2.10 | 3.05 | 13.16×10⁵ | −14.27×10⁻⁵ | 5.57×10⁵ | −16.35×10⁻⁵ | 372 |
| 59.02 | 20.11 | 10.10 | 10.77 | 12.85×10⁵ | −15.11×10⁻⁵ | 5.34×10⁵ | −16.63×10⁻⁵ | 292 |
| | Tempered by cooling at 100° C./hour after heating at 600° C. for 1 hour, following the above referred cold-work |
| 74.80 | 15.10 | 10.10 | ---------- | 16.25×10⁵ | −2.25×10⁻⁵ | 6.41×10⁵ | −3.96×10⁻⁵ | 365 |
| 74.50 | 5.50 | 20.00 | ---------- | 16.10×10⁵ | −15.33×10⁻⁵ | 6.35×10⁵ | −17.39×10⁻⁵ | 350 |
| 58.63 | 20.52 | 20.85 | ---------- | 15.71×10⁵ | −12.27×10⁻⁵ | 6.23×10⁵ | −14.76×10⁻⁵ | 315 |
| 80.19 | 15.11 | ---------- | 4.70 | 11.60×10⁵ | −11.16×10⁻⁵ | 4.97×10⁵ | −13.17×10⁻⁵ | 300 |
| 69.10 | 20.36 | ---------- | 10.54 | 10.80×10⁵ | +11.00×10⁻⁵ | 4.72×10⁵ | +9.05×10⁻⁵ | 224 |
| 74.50 | 5.50 | ---------- | 20.00 | 11.55×10⁵ | −12.26×10⁻⁵ | 4.95×10⁵ | −14.35×10⁻⁵ | 291 |
| 74.81 | 15.10 | 5.05 | 5.04 | 15.83×10⁵ | −2.00×10⁻⁵ | 6.39×10⁵ | −3.50×10⁻⁵ | 344 |
| 18.64 | 20.72 | 5.44 | 5.20 | 10.66×10⁵ | +9.25×10⁻⁵ | 4.70×10⁵ | +8.86×10⁻⁵ | 245 |
| | Tempered by cooling at 100° C./hour after heating at 800° C. for 1 hour, following the above referred cold-work |
| 84.53 | 5.37 | 10.10 | ---------- | 16.25×10⁵ | −17.75×10⁻⁵ | 6.42×10⁵ | −19.76×10⁻⁵ | 340 |
| 74.80 | 15.10 | 10.10 | ---------- | 13.75×10⁵ | +8.34×10⁻⁵ | 5.62×10⁵ | +6.25×10⁻⁵ | 227 |
| 69.23 | 10.65 | 20.12 | ---------- | 14.10×10⁵ | −10.25×10⁻⁵ | 5.74×10⁵ | −12.42×10⁻⁵ | 260 |
| 74.88 | 23.01 | ---------- | 2.11 | 10.15×10⁵ | −5.25×10⁻⁵ | 4.52×10⁵ | −7.38×10⁻⁵ | 155 |
| 83.01 | 11.86 | ---------- | 5.13 | 13.65×10⁵ | −17.15×10⁻⁵ | 5.61×10⁵ | −18.64×10⁻⁵ | 380 |
| 69.10 | 20.36 | ---------- | 10.54 | 11.60×10⁵ | +3.00×10⁻⁵ | 4.96×10⁵ | +2.00×10⁻⁵ | 212 |
| 84.35 | 5.65 | 5.10 | 4.90 | 16.30×10⁵ | −16.28×10⁻⁵ | 6.45×10⁵ | −17.35×10⁻⁵ | 320 |
| 69.35 | 10.33 | 10.08 | 10.24 | 14.09×10⁵ | −10.00×10⁻⁵ | 5.74×10⁵ | −12.39×10⁻⁵ | 255 |

TABLE 15

Relation between cooling speed and temperature coefficient of Young's modulus $e$, 0° C. to 40° C., for Mn-Ni-Mo, Mn-Ni-W and Mn-Ni-Mo-W alloys

| Alloy composition | | | | Cooling speed after heating at 950° C. for 1 hour | | | | |
|---|---|---|---|---|---|---|---|---|
| Mn (percent) | Ni (percent) | Mo (percent) | W (percent) | 170° C./sec. (water quenched) | 9° C./sec. (air quenched) | 500° C./hour (annealed) | 100° C./hour (annealed) | 10° C./hour (annealed) |
| 81.81 | 13.08 | 5.11 | | $+0.15 \times 10^{-5}$ | $+4.12 \times 10^{-5}$ | $+10.06 \times 10^{-5}$ | $+11.36 \times 10^{-5}$ | $+12.91 \times 10^{-5}$ |
| 74.69 | 20.16 | 5.15 | | $-6.13 \times 10^{-5}$ | $-3.15 \times 10^{-5}$ | $-1.95 \times 10^{-5}$ | $-1.25 \times 10^{-5}$ | $-1.00 \times 10^{-5}$ |
| 80.00 | 8.97 | 11.03 | | $-0.13 \times 10^{-5}$ | $+0.82 \times 10^{-5}$ | $+1.70 \times 10^{-5}$ | $+2.05 \times 10^{-5}$ | $+2.28 \times 10^{-5}$ |
| 80.19 | 15.11 | | 4.70 | $-21.19 \times 10^{-5}$ | $-12.00 \times 10^{-5}$ | $+1.85 \times 10^{-5}$ | $+5.25 \times 10^{-5}$ | $+7.83 \times 10^{-5}$ |
| 74.69 | 20.16 | | 5.15 | $+6.00 \times 10^{-5}$ | $+9.13 \times 10^{-5}$ | $+14.21 \times 10^{-5}$ | $+15.33 \times 10^{-5}$ | $+16.25 \times 10^{-5}$ |
| 79.07 | 10.38 | | 10.55 | $-24.45 \times 10^{-5}$ | $-18.22 \times 10^{-5}$ | $-8.65 \times 10^{-5}$ | $-6.17 \times 10^{-5}$ | $-4.12 \times 10^{-5}$ |
| 74.81 | 15.10 | 5.05 | 5.04 | $-2.10 \times 10^{-5}$ | $-4.20 \times 10^{-5}$ | $-5.11 \times 10^{-5}$ | $-6.20 \times 10^{-5}$ | $-6.20 \times 10^{-5}$ |
| 69.35 | 10.33 | 10.08 | 10.24 | $-14.25 \times 10^{-5}$ | $-9.50 \times 10^{-5}$ | $-4.25 \times 10^{-5}$ | $-1.15 \times 10^{-5}$ | $-0.25 \times 10^{-5}$ |

TABLE 16

Physical properties of alloys of Mn-Ni plus third element, as annealed by cooling at 100° C./hour after heating at 950° C. for 1 hour

| Alloy composition | | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|---|
| Mn (percent) | Ni (percent) | Third element | Percent | | | | | |
| 73.70 | 10.20 | In | 16.10 | $11.10 \times 10^5$ | $+1.00 \times 10^{-5}$ | $4.80 \times 10^5$ | $-1.10 \times 10^{-5}$ | 759 |
| 64.60 | 10.30 | In | 25.10 | $10.80 \times 10^5$ | $-14.50 \times 10^{-5}$ | $4.72 \times 10^5$ | $-16.10 \times 10^{-5}$ | 657 |
| 64.60 | 15.15 | Ti | 20.25 | $10.50 \times 10^5$ | $-15.50 \times 10^{-5}$ | $4.63 \times 10^5$ | $-17.60 \times 10^{-5}$ | 182 |
| 72.70 | 22.20 | Ti | 5.10 | $10.25 \times 10^5$ | $+1.30 \times 10^{-5}$ | $4.55 \times 10^5$ | $-1.00 \times 10^{-5}$ | 161 |
| 70.70 | 10.10 | V | 19.20 | $13.40 \times 10^5$ | $-15.25 \times 10^{-5}$ | $5.53 \times 10^5$ | $-17.30 \times 10^{-5}$ | 640 |
| 74.70 | 15.20 | V | 10.10 | $10.55 \times 10^5$ | $+12.50 \times 10^{-5}$ | $4.64 \times 10^5$ | $+10.80 \times 10^{-5}$ | 165 |
| 74.55 | 10.20 | Au | 15.25 | $11.05 \times 10^5$ | $-10.55 \times 10^{-5}$ | $4.80 \times 10^5$ | $-12.65 \times 10^{-5}$ | 556 |
| 75.50 | 19.25 | Au | 5.00 | $8.50 \times 10^5$ | $-1.53 \times 10^{-5}$ | $4.01 \times 10^5$ | $-3.60 \times 10^{-5}$ | 134 |
| 69.85 | 10.15 | Ag | 20.00 | $11.10 \times 10^5$ | $-16.30 \times 10^{-5}$ | $4.81 \times 10^5$ | $-18.35 \times 10^{-5}$ | 583 |
| 76.80 | 18.20 | Ag | 5.00 | $8.55 \times 10^5$ | $-2.50 \times 10^{-5}$ | $4.03 \times 10^5$ | $-4.55 \times 10^{-5}$ | 132 |
| 70.70 | 10.15 | Ta | 19.25 | $11.20 \times 10^5$ | $-17.45 \times 10^{-5}$ | $4.84 \times 10^5$ | $-19.35 \times 10^{-5}$ | 636 |
| 74.70 | 15.20 | Ta | 10.10 | $8.60 \times 10^5$ | $+5.30 \times 10^{-5}$ | $4.04 \times 10^5$ | $+3.25 \times 10^{-5}$ | 154 |
| 74.80 | 10.10 | Zr | 15.10 | $13.40 \times 10^5$ | $-15.60 \times 10^{-5}$ | $5.53 \times 10^5$ | $-17.60 \times 10^{-5}$ | 584 |
| 78.65 | 16.25 | Zr | 5.10 | $12.50 \times 10^5$ | $+5.50 \times 10^{-5}$ | $5.25 \times 10^5$ | $+3.40 \times 10^{-5}$ | 143 |
| 79.90 | 5.10 | Pd | 15.00 | $15.15 \times 10^5$ | $-14.33 \times 10^{-5}$ | $6.08 \times 10^5$ | $-16.35 \times 10^{-5}$ | 756 |
| 79.85 | 15.15 | Pd | 5.00 | $8.90 \times 10^5$ | $+2.30 \times 10^{-5}$ | $5.30 \times 10^5$ | $+0.20 \times 10^{-5}$ | 122 |
| 72.75 | 10.15 | Cd | 17.10 | $11.50 \times 10^5$ | $-15.80 \times 10^{-5}$ | $4.94 \times 10^5$ | $-17.90 \times 10^{-5}$ | 615 |
| 77.80 | 15.10 | Cd | 7.20 | $8.80 \times 10^5$ | $+2.40 \times 10^{-5}$ | $5.00 \times 10^5$ | $+0.35 \times 10^{-5}$ | 110 |
| 74.73 | 10.12 | Ge | 15.15 | $15.65 \times 10^5$ | $-12.30 \times 10^{-5}$ | $6.06 \times 10^5$ | $-14.30 \times 10^{-5}$ | 726 |
| 77.60 | 17.30 | Ge | 5.10 | $8.55 \times 10^5$ | $-1.55 \times 10^{-5}$ | $4.20 \times 10^5$ | $-3.54 \times 10^{-5}$ | 135 |
| 72.25 | 10.25 | Se | 17.50 | $12.10 \times 10^5$ | $-17.50 \times 10^{-5}$ | $5.52 \times 10^5$ | $-19.40 \times 10^{-5}$ | 744 |
| 74.80 | 15.10 | Se | 10.10 | $9.50 \times 10^5$ | $-2.40 \times 10^{-5}$ | $4.32 \times 10^5$ | $-4.35 \times 10^{-5}$ | 123 |
| 74.80 | 10.10 | Bi | 15.10 | $11.25 \times 10^5$ | $-14.70 \times 10^{-5}$ | $4.86 \times 10^5$ | $-16.73 \times 10^{-5}$ | 766 |
| 77.60 | 15.20 | Bi | 7.20 | $8.80 \times 10^5$ | $+1.50 \times 10^{-5}$ | $4.10 \times 10^5$ | $-0.55 \times 10^{-5}$ | 123 |
| 74.75 | 15.15 | Sm | 10.10 | $9.50 \times 10^5$ | $-15.80 \times 10^{-5}$ | $4.32 \times 10^5$ | $-17.85 \times 10^{-5}$ | 134 |
| 78.40 | 15.10 | Sm | 6.50 | $9.25 \times 10^5$ | $+2.50 \times 10^{-5}$ | $4.24 \times 10^5$ | $+0.44 \times 10^{-5}$ | 122 |
| 79.80 | 10.10 | Nb | 10.10 | $13.40 \times 10^5$ | $+5.60 \times 10^{-5}$ | $5.53 \times 10^5$ | $+3.70 \times 10^{-5}$ | 825 |
| 74.60 | 10.15 | Nb | 15.25 | $13.84 \times 10^5$ | $-17.20 \times 10^{-5}$ | $5.67 \times 10^5$ | $-19.10 \times 10^{-5}$ | 833 |
| 72.00 | 15.20 | Sb | 12.80 | $9.13 \times 10^5$ | $-16.50 \times 10^{-1}$ | $4.21 \times 10^5$ | $-18.40 \times 10^{-5}$ | 134 |
| 77.10 | 17.80 | Sb | 5.10 | $8.75 \times 10^5$ | $+2.55 \times 10^{-5}$ | $4.09 \times 10^5$ | $+0.48 \times 10^{-5}$ | 115 |
| 77.90 | 15.10 | Al | 8.00 | $10.14 \times 10^5$ | $-1.50 \times 10^{-5}$ | $4.52 \times 10^5$ | $-3.60 \times 10^{-5}$ | 164 |
| 70.00 | 15.20 | Al | 14.80 | $10.26 \times 10^5$ | $-18.50 \times 10^{-5}$ | $4.55 \times 10^5$ | $-19.90 \times 10^{-5}$ | 188 |
| 75.80 | 10.10 | Si | 14.10 | $11.80 \times 10^5$ | $-18.40 \times 10^{-5}$ | $5.03 \times 10^5$ | $-19.80 \times 10^{-5}$ | 765 |
| 77.40 | 15.10 | Si | 7.50 | $9.55 \times 10^5$ | $-1.50 \times 10^{-5}$ | $4.33 \times 10^5$ | $-3.60 \times 10^{-5}$ | 166 |
| 69.90 | 15.15 | Sn | 14.95 | $9.56 \times 10^5$ | $-19.50 \times 10^{-5}$ | $4.33 \times 10^5$ | $-19.90 \times 10^{-5}$ | 153 |
| 73.40 | 15.10 | Sn | 11.50 | $9.44 \times 10^5$ | $-1.55 \times 10^{-5}$ | $4.30 \times 10^5$ | $-3.60 \times 10^{-5}$ | 142 |
| 74.70 | 15.20 | Te | 10.10 | $9.33 \times 10^5$ | $-14.40 \times 10^{-5}$ | $4.27 \times 10^5$ | $-16.45 \times 10^{-5}$ | 122 |
| 77.70 | 17.20 | Te | 5.10 | $8.88 \times 10^5$ | $1.50 \times 10^{-5}$ | $4.53 \times 10^5$ | $-0.60 \times 10^{-5}$ | 110 |
| 71.55 | 15.15 | Gd | 13.50 | $9.15 \times 10^5$ | $-17.60 \times 10^{-5}$ | $4.21 \times 10^5$ | $-19.50 \times 10^{-5}$ | 144 |
| 73.40 | 21.50 | Gd | 5.10 | $9.05 \times 10^5$ | $+1.55 \times 10^{-5}$ | $4.18 \times 10^5$ | $-0.65 \times 10^{-5}$ | 136 |
| 75.40 | 15.10 | Zn | 9.50 | $9.33 \times 10^5$ | $-18.00 \times 10^{-5}$ | $4.27 \times 10^5$ | $-19.65 \times 10^{-5}$ | 135 |
| 75.30 | 20.20 | Zn | 4.50 | $8.70 \times 10^5$ | $-2.50 \times 10^{-5}$ | $4.07 \times 10^5$ | $-4.40 \times 10^{-5}$ | 105 |
| 80.75 | 15.15 | Be | 4.10 | $10.80 \times 10^5$ | $-1.50 \times 10^{-5}$ | $4.72 \times 10^5$ | $-3.40 \times 10^{-5}$ | 215 |
| 70.60 | 25.50 | Be | 4.20 | $13.55 \times 10^5$ | $-15.50 \times 10^{-5}$ | $5.58 \times 10^5$ | $-17.40 \times 10^{-5}$ | 196 |
| 84.10 | 15.10 | B | 0.80 | $15.10 \times 10^5$ | $-18.60 \times 10^{-5}$ | $6.06 \times 10^5$ | $-19.90 \times 10^{-5}$ | 285 |
| 78.00 | 21.50 | B | 0.50 | $14.60 \times 10^5$ | $-1.80 \times 10^{-5}$ | $5.91 \times 10^5$ | $-3.75 \times 10^{-5}$ | 276 |

TABLE 17A

Physical properties of Mn-Ni-In alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | In (percent) | | | | | |
| As water quenched after heating at 950° C. for 1 hour, following the annealing of Table 16 | | | | | | | |
| 74.70 | 20.20 | 5.10 | $8.30 \times 10^5$ | $+3.50 \times 10^{-5}$ | $3.95 \times 10^5$ | $+2.40 \times 10^{-5}$ | 122 |
| Tempered by cooling at 100° C./hr. after heating at 200° C. for 1 hr., following above referred water quenching | | | | | | | |
| 74.70 | 20.20 | 5.10 | $8.29 \times 10^5$ | $+3.48 \times 10^{-5}$ | $3.94 \times 10^5$ | $+1.50 \times 10^{-5}$ | 121 |
| Tempered by cooling at 100° C./hr. after heating at 400° C. for 1 hr., following above referred water quenching | | | | | | | |
| 74.70 | 20.20 | 5.10 | $8.30 \times 10^5$ | $+3.40 \times 10^{-5}$ | $3.94 \times 10^5$ | $+1.55 \times 10^{-5}$ | 120 |
| Tempered by cooling at 100° C./hr. after heating at 600° C. for 1 hr., following above referred water quenching | | | | | | | |
| 74.70 | 20.20 | 5.10 | $8.31 \times 10^5$ | $+1.80 \times 10^{-5}$ | $3.94 \times 10^5$ | $-0.50 \times 10^{-5}$ | 122 |
| Tempered by cooling at 100° C./hr. after heating at 800° C. for 1 hr., following above referred water quenching | | | | | | | |
| 74.70 | 20.20 | 5.10 | $8.32 \times 10^5$ | $-1.50 \times 10^{-5}$ | $3.96 \times 10^5$ | $-3.60 \times 10^{-5}$ | 124 |

TABLE 17B
Physical properties of Mn-Ni-Ti alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Ti (percent) | | | | | |
| As water quenched after heating at 950° C. for 1 hour, following the annealing of Table 16 ||||||||
| 69.70 | 20.18 | 10.12 | $10.70 \times 10^5$ | $-15.50 \times 10^{-5}$ | $4.66 \times 10^5$ | $-17.60 \times 10^{-5}$ | 185 |
| Tempered by cooling at 100° C./hr. after heating at 200° C. for 1 hr., following above referred water quenching ||||||||
| 69.70 | 20.18 | 10.12 | $10.75 \times 10^5$ | $-9.60 \times 10^{-5}$ | $4.67 \times 10^5$ | $-11.55 \times 10^{-5}$ | 186 |
| Tempered by cooling at 100° C./hr. after heating at 400° C. for 1 hr., following above referred water quenching ||||||||
| 69.70 | 20.18 | 10.12 | $10.70 \times 10^5$ | $-5.00 \times 10^{-5}$ | $4.66 \times 10^5$ | $-7.10 \times 10^{-5}$ | 184 |
| Tempered by cooling at 100° C./hr. after heating at 600° C. for 1 hr., following above referred water quenching ||||||||
| 69.70 | 20.18 | 10.12 | $10.76 \times 10^5$ | $-2.50 \times 10^{-5}$ | $4.68 \times 10^5$ | $-4.40 \times 10^{-5}$ | 183 |
| Tempered by cooling at 100° C./hr. after heating at 800° C. for 1 hr., following above referred water quenching ||||||||
| 69.70 | 20.18 | 10.12 | $10.75 \times 10^5$ | $-1.20 \times 10^{-5}$ | $4.68 \times 10^5$ | $-3.30 \times 10^{-5}$ | 185 |

TABLE 17C
Physical properties of Mn-Ni-V alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | V (percent) | | | | | |
| As water quenched after heating at 950° C. for 1 hour, following the annealing of Table 16 ||||||||
| 74.70 | 15.20 | 10.10 | $10.50 \times 10^5$ | $-19.50 \times 10^{-5}$ | $4.55 \times 10^5$ | $-19.98 \times 10^{-5}$ | 164 |
| Tempered by cooling at 100° C./hr. after heating at 200° C. for 1 hr., following above referred water quenching ||||||||
| 74.70 | 15.20 | 10.10 | $10.50 \times 10^5$ | $-16.00 \times 10^{-5}$ | $4.55 \times 10^5$ | $-18.10 \times 10^{-5}$ | 165 |
| Tempered by cooling at 100° C./hr. after heating at 400° C. for 1 hr., following above referred water quenching ||||||||
| 74.70 | 15.20 | 10.10 | $10.52 \times 10^5$ | $-10.20 \times 10^{-5}$ | $4.56 \times 10^5$ | $-11.90 \times 10^{-5}$ | 164 |
| Tempered by cooling at 100° C./hr. after heating at 600° C. for 1 hr., following above referred water quenching ||||||||
| 74.70 | 15.20 | 10.10 | $10.53 \times 10^5$ | $-1.10 \times 10^{-5}$ | $4.56 \times 10^5$ | $-3.10 \times 10^{-5}$ | 163 |
| Tempered by cooling at 100° C./hr. after heating at 800° C. for 1 hr., following above referred water quenching ||||||||
| 74.70 | 15.20 | 10.10 | $10.53 \times 10^5$ | $+12.30 \times 10^{-5}$ | $4.56 \times 10^5$ | $+10.25 \times 10^{-5}$ | 164 |

TABLE 17D
Physical properties of Mn-Ni-Au alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Au (percent) | | | | | |
| As water quenched after heating at 950° C. for 1 hour, following the annealing of Table 16 ||||||||
| 79.80 | 15.10 | 5.10 | $8.80 \times 10^5$ | $-5.50 \times 10^{-5}$ | $4.11 \times 10^5$ | $-7.40 \times 10^{-5}$ | 125 |
| Tempered by cooling at 100° C./hr. after heating at 200° C. for 1 hr., following above referred water quenching ||||||||
| 79.80 | 15.10 | 5.10 | $8.78 \times 10^5$ | $-2.50 \times 10^{-5}$ | $4.10 \times 10^5$ | $-4.60 \times 10^{-5}$ | 124 |
| Tempered by cooling at 100° C./hr. after heating at 400° C. for 1 hr., following above referred water quenching ||||||||
| 79.80 | 15.10 | 5.10 | $8.79 \times 10^5$ | $+6.60 \times 10^{-5}$ | $4.11 \times 10^5$ | $+4.50 \times 10^{-5}$ | 124 |
| Tempered by cooling at 100° C./hr. after heating at 600° C. for 1 hr., following above referred water quenching ||||||||
| 79.80 | 15.10 | 5.10 | $8.70 \times 10^5$ | $+14.00 \times 10^{-5}$ | $4.10 \times 10^5$ | $+11.90 \times 10^{-5}$ | 125 |
| Tempered by cooling at 100° C./hr. after heating at 800° C. for 1 hr., following above referred water quenching ||||||||
| 79.80 | 15.10 | 5.10 | $8.70 \times 10^5$ | $+18.30 \times 10^{-5}$ | $4.10 \times 10^5$ | $+16.20 \times 10^{-5}$ | 215 |

TABLE 17E
Physical properties of Mn-Ni-Ag alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Ag (percent) | | | | | |
| *As water quenched after heating at 950° C. for 1 hour, following the annealing of Table 16* | | | | | | | |
| 76.80 | 18.20 | 5.00 | $8.50 \times 10^5$ | $-2.45 \times 10^{-5}$ | $4.01 \times 10^5$ | $-4.55 \times 10^{-5}$ | 128 |
| *Tempered by cooling at 100° C./hr. after heating at 200° C. for 1 hr., following above referred water quenching* | | | | | | | |
| 76.80 | 18.20 | 5.00 | $8.55 \times 10^5$ | $-2.37 \times 10^{-5}$ | $4.02 \times 10^5$ | $-4.40 \times 10^{-5}$ | 130 |
| *Tempered by cooling at 100° C./hr. after heating at 400° C. for 1 hr., following above referred water quenching* | | | | | | | |
| 76.80 | 18.20 | 5.00 | $8.55 \times 10^5$ | $-2.35 \times 10^{-5}$ | $4.02 \times 10^5$ | $-4.45 \times 10^{-5}$ | 131 |
| *Tempered by cooling at 100° C./hr. after heating at 600° C. for 1 hr., following above referred water quenching* | | | | | | | |
| 76.80 | 18.20 | 5.00 | $8.55 \times 10^5$ | $-2.30 \times 10^{-5}$ | $4.02 \times 10^5$ | $-4.40 \times 10^{-5}$ | 130 |
| *Tempered by cooling at 100° C./hr. after heating at 800° C. for 1 hr., following above referred water quenching* | | | | | | | |
| 76.80 | 18.20 | 5.00 | $8.54 \times 10^5$ | $-2.40 \times 10^{-5}$ | $4.01 \times 10^5$ | $-4.41 \times 10^{-5}$ | 131 |

TABLE 17F
Physical properties of Mn-Ni-Ta alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Ta (percent) | | | | | |
| *As water quenched after heating at 950° C. for 1 hour, following the annealing of Table 16* | | | | | | | |
| 74.70 | 15.20 | 10.10 | $8.62 \times 10^5$ | $-18.50 \times 10^{-5}$ | $4.04 \times 10^5$ | $-19.60 \times 10^{-5}$ | 153 |
| *Tempered by cooling at 100° C./hr. after heating at 200° C. for 1 hr., following above referred water quenching* | | | | | | | |
| 74.70 | 15.20 | 10.10 | $8.63 \times 10^5$ | $-11.30 \times 10^{-5}$ | $4.05 \times 10^5$ | $-13.40 \times 10^{-5}$ | 154 |
| *Tempered by cooling at 100° C./hr. after heating at 400° C. for 1 hr., following above referred water quenching* | | | | | | | |
| 74.70 | 15.20 | 10.10 | $8.62 \times 10^5$ | $-4.20 \times 10^{-5}$ | $4.04 \times 10^5$ | $-6.30 \times 10^{-5}$ | 152 |
| *Tempered by cooling at 100° C./hr. after heating at 600° C. for 1 hr., following above referred water quenching* | | | | | | | |
| 74.70 | 15.20 | 10.10 | $8.60 \times 10^5$ | $+0.50 \times 10^{-5}$ | $4.02 \times 10^5$ | $-1.50 \times 10^{-5}$ | 152 |
| *Tempered by cooling at 100° C./hr. after heating at 800° C. for 1 hr., following above referred water quenching* | | | | | | | |
| 74.70 | 15.20 | 10.10 | $8.61 \times 10^5$ | $+5.20 \times 10^{-5}$ | $4.03 \times 10^5$ | $+3.11 \times 10^{-5}$ | 153 |

TABLE 17G
Physical properties of Mn-Ni-Zr alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Zr (percent) | | | | | |
| *As water quenched after heating at 950° C. for 1 hour, following the annealing of Table 16* | | | | | | | |
| 71.30 | 20.20 | 8.50 | $11.53 \times 10^5$ | $-1.00 \times 10^{-5}$ | $4.94 \times 10^5$ | $-3.10 \times 10^{-5}$ | 153 |
| *Tempered by cooling at 100° C./hr. after heating at 200° C. for 1 hr., following above referred water quenching* | | | | | | | |
| 71.30 | 20.20 | 8.50 | $11.52 \times 10^5$ | $-2.00 \times 10^{-5}$ | $4.93 \times 10^5$ | $-4.10 \times 10^{-5}$ | 152 |
| *Tempered by cooling at 100° C./hr. after heating at 400° C. for 1 hr., following above referred water quenching* | | | | | | | |
| 71.30 | 20.20 | 8.50 | $11.51 \times 10^5$ | $-5.10 \times 10^{-5}$ | $4.92 \times 10^5$ | $-7.21 \times 10^{-5}$ | 152 |
| *Tempered by cooling at 100° C./hr. after heating at 600° C. for 1 hr., following above referred water quenching* | | | | | | | |
| 71.30 | 20.20 | 8.50 | $11.50 \times 10^5$ | $-10.55 \times 10^{-5}$ | $4.91 \times 10^5$ | $-12.65 \times 10^{-5}$ | 151 |
| *Tempered by cooling at 100° C./hr. after heating at 800° C. for 1 hr., following above referred water quenching* | | | | | | | |
| 71.30 | 20.20 | 8.50 | $11.50 \times 10^5$ | $-15.30 \times 10^{-5}$ | $4.90 \times 10^5$ | $-17.45 \times 10^{-5}$ | 151 |

TABLE 17H
Physical properties of Mn-Ni-Pd alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Pd (percent) | | | | | |
| As water quenched after heating at 950° C. for 1 hour, following the annealing of Table 16 ||||||||
| 79.85 | 15.15 | 5.00 | $8.90 \times 10^5$ | $-10.50 \times 10^{-5}$ | $4.13 \times 10^5$ | $-12.65 \times 10^{-5}$ | 120 |
| Tempered by cooling at 100° C./hr. after heating at 200° C. for 1 hr., following above referred water quenching ||||||||
| 79.85 | 15.15 | 5.00 | $8.90 \times 10^5$ | $-8.75 \times 10^{-5}$ | $4.13 \times 10^5$ | $-10.85 \times 10^{-5}$ | 122 |
| Tempered by cooling at 100° C./hr. after heating at 400° C. for 1 hr., following above referred water quenching ||||||||
| 79.85 | 15.15 | 5.00 | $8.96 \times 10^5$ | $-5.15 \times 10^{-5}$ | $4.15 \times 10^5$ | $-7.15 \times 10^{-5}$ | 123 |
| Tempered by cooling at 100° C./hr. after heating at 600° C. for 1 hr., following above referred water quenching ||||||||
| 79.85 | 15.15 | 5.00 | $8.95 \times 10^5$ | $-0.80 \times 10^{-5}$ | $4.14 \times 10^5$ | $-2.90 \times 10^{-5}$ | 121 |
| Tempered by cooling at 100° C./hr. after heating at 800° C. for 1 hr., following above referred water quenching ||||||||
| 79.85 | 15.15 | 5.00 | $8.90 \times 10^5$ | $+2.20 \times 10^{-5}$ | $4.13 \times 10^5$ | $+1.10 \times 10^{-5}$ | 122 |

TABLE 17I
Physical properties of Mn-Ni-Cd alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Cd (percent) | | | | | |
| As water quenched after heating at 950° C. for 1 hour, following the annealing of Table 16 ||||||||
| 77.80 | 15.10 | 7.20 | $8.78 \times 10^5$ | $-15.00 \times 10^{-5}$ | $3.82 \times 10^5$ | $-17.10 \times 10^{-5}$ | 109 |
| Tempered by cooling at 100° C./hr. after heating at 200° C. for 1 hr., following above referred water quenching ||||||||
| 77.80 | 15.10 | 7.20 | $8.76 \times 10^5$ | $-8.10 \times 10^{-5}$ | $3.81 \times 10^5$ | $-10.20 \times 10^{-5}$ | 108 |
| Tempered by cooling at 100° C./hr. after heating at 400° C. for 1 hr., following above referred water quenching ||||||||
| 77.80 | 15.10 | 7.20 | $8.75 \times 10^5$ | $-3.00 \times 10^{-5}$ | $3.80 \times 10^5$ | $-5.13 \times 10^{-5}$ | 107 |
| Tempered by cooling at 100° C./hr. after heating at 600° C. for 1 hr., following above referred water quenching ||||||||
| 77.80 | 15.10 | 7.20 | $8.77 \times 10^5$ | $+0.80 \times 10^{-5}$ | $3.81 \times 10^5$ | $-1.20 \times 10^{-5}$ | 107 |
| Tempered by cooling at 100° C./hr. after heating at 800° C. for 1 hr., following above referred water quenching ||||||||
| 77.80 | 15.10 | 7.20 | $8.80 \times 10^5$ | $+2.30 \times 10^{-5}$ | $3.83 \times 10^5$ | $+1.15 \times 10^{-5}$ | 108 |

TABLE 17J
Physical properties of Mn-Ni-Ge alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Ge (percent) | | | | | |
| As water quenched after heating at 950° C. for 1 hour, following the annealing of Table 16 ||||||||
| 74.30 | 15.50 | 10.20 | $8.40 \times 10^5$ | $-4.50 \times 10^{-5}$ | $3.98 \times 10^5$ | $-5.95 \times 10^{-5}$ | 130 |
| Tempered by cooling at 100° C./hr. after heating at 200° C. for 1 hr., following above referred water quenching ||||||||
| 74.30 | 15.50 | 10.20 | $8.40 \times 10^5$ | $-4.75 \times 10^{-5}$ | $3.98 \times 10^5$ | $-6.80 \times 10^{-5}$ | 128 |
| Tempered by cooling at 100° C./hr. after heating at 400° C. for 1 hr., following above referred water quenching ||||||||
| 74.30 | 15.50 | 10.20 | $8.38 \times 10^5$ | $-5.50 \times 10^{-5}$ | $3.97 \times 10^5$ | $-7.51 \times 10^{-5}$ | 128 |
| Tempered by cooling at 100° C./hr. after heating at 600° C. for 1 hr., following above referred water quenching ||||||||
| 74.30 | 15.50 | 10.20 | $8.41 \times 10^5$ | $-7.70 \times 10^{-5}$ | $3.99 \times 10^5$ | $-9.75 \times 10^{-5}$ | 129 |
| Tempered by cooling at 100° C./hr. after heating at 800° C. for 1 hr., following above referred water quenching ||||||||
| 74.30 | 15.50 | 10.20 | $8.42 \times 10^5$ | $-10.30 \times 10^{-5}$ | $4.00 \times 10^5$ | $-12.33 \times 10^{-5}$ | 131 |

TABLE 17K
Physical properties of Mn-Ni-Se alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Se (percent) | | | | | |
| As water quenched after heating at 950° C. for 1 hour, following the annealing of Table 16 ||||||||
| 74.80 | 15.10 | 10.10 | $9.20 \times 10^5$ | $-10.20 \times 10^{-5}$ | $4.23 \times 10^5$ | $-12.25 \times 10^{-5}$ | 120 |
| Tempered by cooling at 100° C./hr. after heating at 200° C. for 1 hr., following above referred water quenching ||||||||
| 74.80 | 15.10 | 10.10 | $9.30 \times 10^5$ | $-10.20 \times 10^{-5}$ | $4.24 \times 10^5$ | $-12.15 \times 10^{-5}$ | 24 |
| Tempered by cooling at 100° C./hr. after heating at 400° C. for 1 hr., following above referred water quenching ||||||||
| 74.80 | 15.10 | 10.10 | $9.30 \times 10^5$ | $-9.00 \times 10^{-5}$ | $4.24 \times 10^5$ | $-11.00 \times 10^{-5}$ | 125 |
| Tempered by cooling at 100° C./hr. after heating at 600° C. for 1 hr., following above referred water quenching ||||||||
| 74.80 | 15.10 | 10.10 | $9.43 \times 10^5$ | $-7.00 \times 10^{-5}$ | $4.27 \times 10^5$ | $-9.15 \times 10^{-5}$ | 1 |
| Tempered by cooling at 100° C./hr. after heating at 800° C. for 1 hr., following above referred water quenching ||||||||
| 74.80 | 15.10 | 10.10 | $9.40 \times 10^5$ | $-4.50 \times 10^{-5}$ | $4.26 \times 10^5$ | $-6.10 \times 10^{-5}$ | 124 |

TABLE 17L
Physical properties of Mn-Ni-Bi alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Bi (percent) | | | | | |
| As water quenched after heating at 950° C. for 1 hour, following the annealing of Table 16 ||||||||
| 77.60 | 15.20 | 7.20 | $8.50 \times 10^5$ | $-4.50 \times 10^{-5}$ | $4.01 \times 10^5$ | $-6.60 \times 10^{-5}$ | 116 |
| Tempered by cooling at 100° C./hr. after heating at 200° C. for 1 hr., following above referred water quenching ||||||||
| 77.60 | 15.20 | 7.20 | $8.60 \times 10^5$ | $-4.00 \times 10^{-5}$ | $4.05 \times 10^5$ | $-6.13 \times 10^{-5}$ | 118 |
| Tempered by cooling at 100° C./hr. after heating at 400° C. for 1 hr., following above referred water quenching ||||||||
| 77.60 | 15.20 | 7.20 | $8.80 \times 10^5$ | $-2.85 \times 10^{-5}$ | $4.08 \times 10^5$ | $-4.75 \times 10^{-5}$ | 118 |
| Tempered by cooling at 100° C./hr. after heating at 600° C. for 1 hr., following above referred water quenching ||||||||
| 77.60 | 15.20 | 7.20 | $8.70 \times 10^5$ | $-0.80 \times 10^{-5}$ | $4.06 \times 10^5$ | $-2.84 \times 10^{-5}$ | 119 |
| Tempered by cooling at 100° C./hr. after heating at 800° C. for 1 hr., following above referred water quenching ||||||||
| 77.60 | 15.20 | 7.20 | $8.80 \times 10^5$ | $-0.40 \times 10^{-5}$ | $4.08 \times 10^5$ | $-2.45 \times 10^{-5}$ | 180 |

TABLE 17M
Physical properties of Mn-Ni-Sm alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Sm (percent) | | | | | |
| As water quenched after heating at 950° C. for 1 hour, following the annealing of Table 16 ||||||||
| 74.75 | 15.15 | 10.10 | $9.15 \times 10^5$ | $-16.5 \times 10^{-5}$ | $4.21 \times 10^5$ | $-18.54 \times 10^{-5}$ | 115 |
| Tempered by cooling at 100° C./hr. after heating at 200° C. for 1 hr., following above referred water quenching ||||||||
| 74.75 | 15.15 | 10.10 | $9.10 \times 10^5$ | $-15.50 \times 10^{-5}$ | $4.20 \times 10^5$ | $-17.40 \times 10^{-5}$ | 117 |
| Tempered by cooling at 100° C./hr. after heating at 400° C. for 1 hr., following above referred water quenching ||||||||
| 74.75 | 15.15 | 10.10 | $9.00 \times 10^5$ | $-10.33 \times 10^{-5}$ | $4.19 \times 10^5$ | $-11.53 \times 10^{-5}$ | 117 |
| Tempered by cooling at 100° C./hr. after heating at 600° C. for 1 hr., following above referred water quenching ||||||||
| 74.75 | 15.15 | 10.10 | $9.10 \times 10^5$ | $-7.70 \times 10^{-5}$ | $4.20 \times 10^5$ | $-9.81 \times 10^{-5}$ | 118 |
| Tempered by cooling at 100° C./hr. after heating at 800° C. for 1 hr., following above referred water quenching ||||||||
| 74.75 | 15.15 | 10.10 | $9.20 \times 10^5$ | $+2.40 \times 10^{-5}$ | $4.22 \times 10^5$ | $-0.43 \times 10^{-5}$ | 120 |

TABLE 17N
Physical properties of Mn-Ni-Nb alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Nb (percent) | | | | | |
| As water quenched after heating at 950° C. for 1 hour, following the annealing of Table 16 ||||||||
| 74.80 | 15.10 | 10.10 | $12.50 \times 10^5$ | $-2.50 \times 10^{-5}$ | $5.25 \times 10^5$ | $-4.60 \times 10^{-5}$ | 130 |
| Tempered by cooling at 100° C./hr. after heating at 200° C. for 1 hr., following above referred water quenching ||||||||
| 74.80 | 15.10 | 10.10 | $12.50 \times 10^5$ | $-2.50 \times 10^{-5}$ | $5.25 \times 10^5$ | $-4.44 \times 10^{-5}$ | 131 |
| Tempered by cooling at 100° C./hr. after heating at 400° C. for 1 hr., following above referred water quenching ||||||||
| 74.80 | 15.10 | 10.10 | $12.45 \times 10^5$ | $-1.33 \times 10^{-5}$ | $5.23 \times 10^5$ | $-3.37 \times 10^{-5}$ | 132 |
| Tempered by cooling at 100° C./hr. after heating at 600° C. for 1 hr., following above referred water quenching ||||||||
| 74.80 | 15.10 | 10.10 | $12.55 \times 10^5$ | $+1.00 \times 10^{-5}$ | $5.24 \times 10^5$ | $-1.15 \times 10^{-5}$ | 134 |
| Tempered by cooling at 100° C./hr. after heating at 800° C. for 1 hr., following above referred water quenching ||||||||
| 74.80 | 15.10 | 10.10 | $12.58 \times 10^5$ | $+3.70 \times 10^{-5}$ | $5.27 \times 10^5$ | $+2.65 \times 10^{-5}$ | 134 |

TABLE 17O
Physical properties of Mn-Ni-Sb alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Sb (percent) | | | | | |
| As water quenched after heating at 950° C. for 1 hour, following the annealing of Table 16 ||||||||
| 77.10 | 17.80 | 5.10 | $8.67 \times 10^5$ | $+0.30 \times 10^{-5}$ | $4.06 \times 10^5$ | $-1.75 \times 10^{-5}$ | 114 |
| Tempered by cooling at 100° C./hr. after heating at 200° C. for 1 hr., following above referred water quenching ||||||||
| 77.10 | 17.80 | 5.10 | $8.68 \times 10^5$ | $+1.00 \times 10^{-5}$ | $4.07 \times 10^5$ | $-1.10 \times 10^{-5}$ | 113 |
| Tempered by cooling at 100° C./hr. after heating at 400° C. for 1 hr., following above referred water quenching ||||||||
| 77.10 | 17.80 | 5.10 | $8.68 \times 10^5$ | $+1.50 \times 10^{-5}$ | $4.07 \times 10^5$ | $-0.55 \times 10^{-5}$ | 113 |
| Tempered by cooling at 100° C./hr. after heating at 600° C. for 1 hr., following above referred water quenching ||||||||
| 77.10 | 17.80 | 5.10 | $8.69 \times 10^5$ | $+2.00 \times 10^{-5}$ | $4.08 \times 10^5$ | $-0.10 \times 10^{-5}$ | 115 |
| Tempered by cooling at 100° C./hr. after heating at 800° C. for 1 hr., following above referred water quenching ||||||||
| 77.10 | 17.80 | 5.10 | $8.70 \times 10^5$ | $+2.40 \times 10^{-5}$ | $4.09 \times 10^5$ | $+0.41 \times 10^{-5}$ | 114 |

TABLE 17P
Physical properties of Mn-Ni-Al alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Al (percent) | | | | | |
| As water quenched after heating at 950° C. for 1 hour, following the annealing of Table 16 ||||||||
| 77.90 | 15.10 | 8.00 | $10.23 \times 10^5$ | $-1.32 \times 10^{-5}$ | $4.54 \times 10^5$ | $-3.33 \times 10^{-5}$ | 165 |
| Tempered by cooling at 100° C./hr. after heating at 200° C. for 1 hr., following above referred water quenching ||||||||
| 77.90 | 15.10 | 8.00 | $10.23 \times 10^5$ | $-1.35 \times 10^{-5}$ | $4.54 \times 10^5$ | $-3.35 \times 10^{-5}$ | 163 |
| Tempered by cooling at 100° C./hr. after heating at 400° C. for 1 hr., following above referred water quenching ||||||||
| 77.90 | 15.10 | 8.00 | $10.24 \times 10^5$ | $-1.30 \times 10^{-5}$ | $4.55 \times 10^5$ | $-3.30 \times 10^{-5}$ | 163 |
| Tempered by cooling at 100° C./hr. after heating at 600° C. for 1 hr., following above referred water quenching ||||||||
| 77.90 | 15.10 | 8.00 | $10.25 \times 10^5$ | $-1.30 \times 10^{-5}$ | $4.56 \times 10^5$ | $-3.32 \times 10^{-5}$ | 165 |
| Tempered by cooling at 100° C./hr. after heating at 800° C. for 1 hr., following above referred water quenching ||||||||
| 77.90 | 15.10 | 8.00 | $10.20 \times 10^5$ | $-1.40 \times 10^{-5}$ | $4.50 \times 10^5$ | $-3.40 \times 10^{-5}$ | 164 |

TABLE 17Q
Physical properties of Mn-Ni-Si alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Si (percent) | | | | | |
| As water quenched after heating at 950° C. for 1 hour, following the annealing of Table 16 ||||||||
| 77.40 | 15.10 | 7.50 | $9.50 \times 10^5$ | $-15.00 \times 10^{-5}$ | $4.32 \times 10^5$ | $-17.10 \times 10^{-5}$ | 160 |
| Tempered by cooling at 100° C./hr. after heating at 200° C. for 1 hr., following above referred water quenching ||||||||
| 77.40 | 15.10 | 7.50 | $9.51 \times 10^5$ | $-14.55 \times 10^{-5}$ | $4.33 \times 10^5$ | $-16.51 \times 10^{-5}$ | 163 |
| Tempered by cooling at 100° C./hr. after heating at 400° C. for 1 hr., following above referred water quenching ||||||||
| 77.40 | 15.10 | 7.50 | $9.52 \times 10^5$ | $-12.60 \times 10^{-5}$ | $14.34 \times 10^5$ | $-14.55 \times 10^{-5}$ | 162 |
| Tempered by cooling at 100° C./hr. after heating at 600° C. for 1 hr., following above referred water quenching ||||||||
| 77.40 | 15.10 | 7.50 | $9.53 \times 10^5$ | $-10.80 \times 10^{-5}$ | $4.35 \times 10^5$ | $-12.81 \times 10^{-5}$ | 164 |
| Tempered by cooling at 100° C./hr. after heating at 800° C. for 1 hr., following above referred water quenching ||||||||
| 77.40 | 15.10 | 7.50 | $9.54 \times 10^5$ | $-6.30 \times 10^{-5}$ | $4.36 \times 10^5$ | $-8.32 \times 10^{-5}$ | 165 |

TABLE 17R
Physical properties of Mn-Ni-Sn alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Sn (percent) | | | | | |
| As water quenched after heating at 950° C. for 1 hour, following the annealing of Table 16 ||||||||
| 79.80 | 15.10 | 5.10 | $9.10 \times 10^5$ | $-5.55 \times 10^{-5}$ | $4.19 \times 10^5$ | $-7.53 \times 10^{-5}$ | 125 |
| Tempered by cooling at 100° C./hr. after heating at 200° C. for 1 hr., following above referred water quenching ||||||||
| 79.80 | 15.10 | 5.10 | $9.10 \times 10^5$ | $-8.30 \times 10^{-5}$ | $4.19 \times 10^5$ | $-10.34 \times 10^{-5}$ | 125 |
| Tempered by cooling at 100° C./hr. after heating at 400° C. for 1 hr., following above referred water quenching ||||||||
| 79.80 | 15.10 | 5.10 | $9.15 \times 10^5$ | $-12.53 \times 10^{-5}$ | $4.20 \times 10^5$ | $-14.55 \times 10^{-5}$ | 122 |
| Tempered by cooling at 100° C./hr. after heating at 600° C. for 1 hr., following above referred water quenching ||||||||
| 79.80 | 15.10 | 5.10 | $9.20 \times 10^5$ | $-17.10 \times 10^{-5}$ | $4.21 \times 10^5$ | $-19.30 \times 10^{-5}$ | 120 |
| Tempered by cooling at 100° C./hr. after heating at 800° C. for 1 hr., following above referred water quenching ||||||||
| 79.80 | 15.10 | 5.10 | $9.30 \times 10^5$ | $-22.00 \times 10^{-5}$ | $4.22 \times 10^5$ | $-24.20 \times 10^{-5}$ | 120 |

TABLE 17S
Physical properties of Mn-Ni-Te alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Te (percent) | | | | | |
| As water quenched after heating at 950° C. for 1 hour, following the annealing of Table 16 ||||||||
| 74.70 | 15.20 | 10.10 | $9.70 \times 10^5$ | $-15.60 \times 10^{-5}$ | $4.38 \times 10^5$ | $-17.50 \times 10^{-5}$ | 120 |
| Tempered by cooling at 100° C./hr. after heating at 200° C. for 1 hr., following above referred water quenching ||||||||
| 74.70 | 15.20 | 10.10 | $9.70 \times 10^5$ | $-15.10 \times 10^{-5}$ | $4.38 \times 10^5$ | $-17.05 \times 10^{-5}$ | 121 |
| Tempered by cooling at 100° C./hr. after heating at 400° C. for 1 hr., following above referred water quenching ||||||||
| 74.70 | 15.20 | 10.10 | $9.28 \times 10^5$ | $-14.40$ | $4.25 \times 10^5$ | $-16.41 \times 10^{-5}$ | 120 |
| Tempered by cooling at 100° C./hr. after heating at 600° C. for 1 hr., following above referred water quenching ||||||||
| 74.70 | 15.20 | 10.10 | $9.28 \times 10^5$ | $-14.40 \times 10^{-5}$ | $4.25 \times 10^5$ | $-16.35 \times 10^{-5}$ | 122 |
| Tempered by cooling at 100° C./hr. after heating at 800° C. for 1 hr., following above referred water quenching ||||||||
| 74.70 | 15.20 | 10.10 | $9.30 \times 10^5$ | $-14.30 \times 10^{-5}$ | $4.26 \times 10^5$ | $-16.43 \times 10^{-5}$ | 123 |

TABLE 17T
Physical properties of Mn-Ni-Gd alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Gd (percent) | | | | | |
| As water quenched after heating at 950° C. for 1 hour, following the annealing of Table 16 ||||||||
| 74.80 | 15.20 | 10.00 | $9.10 \times 10^5$ | $-4.50 \times 10^{-5}$ | $4.19 \times 10^5$ | $-6.57 \times 10^{-5}$ | 135 |
| Tempered by cooling at 100° C./hr. after heating at 200° C. for 1 hr., following above referred water quenching ||||||||
| 74.80 | 15.20 | 10.00 | $9.12 \times 10^5$ | $-4.33 \times 10^{-5}$ | $4.20 \times 10^5$ | $-6.33 \times 10^{-5}$ | 134 |
| Tempered by cooling at 100° C./hr. after heating at 400° C. for 1 hr., following above referred water quenching ||||||||
| 74.80 | 15.20 | 10.00 | $9.13 \times 10^5$ | $-3.30 \times 10^{-5}$ | $4.22 \times 10^5$ | $-5.32 \times 10^{-5}$ | 132 |
| Tempered by cooling at 100° C./hr. after heating at 600° C. for 1 hr., following above referred water quenching ||||||||
| 74.80 | 15.20 | 10.00 | $9.14 \times 10^5$ | $-0.83 \times 10^{-5}$ | $4.23 \times 10^5$ | $-2.93 \times 10^{-5}$ | 131 |
| Tempered by cooling at 100° C./hr. after heating at 800° C. for 1 hr., following above referred water quenching ||||||||
| 74.80 | 15.20 | 10.00 | $9.14 \times 10^5$ | $+2.20 \times 10^{-5}$ | $4.24 \times 10^5$ | $+1.50 \times 10^{-5}$ | 130 |

TABLE 17U
Physical properties of Mn-Ni-Zn alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Zn (percent) | | | | | |
| As water quenched after heating at 950° C. for 1 hour, following the annealing of Table 16 ||||||||
| 75.30 | 20.20 | 4.50 | $8.62 \times 10^5$ | $+6.50 \times 10^{-5}$ | $4.05 \times 10^5$ | $+4.5 \times 10^{-5}$ | 102 |
| Tempered by cooling at 100° C./hr. after heating at 200° C. for 1 hr., following above referred water quenching ||||||||
| 75.30 | 20.20 | 4.50 | $8.62 \times 10^5$ | $+5.50 \times 10^{-5}$ | $4.05 \times 10^5$ | $+3.50 \times 10^{-5}$ | 102 |
| Tempered by cooling at 100° C./hr. after heating at 400° C. for 1 hr., following above referred water quenching ||||||||
| 75.30 | 20.20 | 4.50 | $8.63 \times 10^5$ | $+4.20 \times 10^{-5}$ | $4.06 \times 10^5$ | $+2.15 \times 10^{-5}$ | 103 |
| Tempered by cooling at 100° C./hr. after heating at 600° C. for 1 hr., following above referred water quenching ||||||||
| 75.0 | 20.20 | 4.50 | $8.64 \times 10^5$ | $+2.80 \times 10^{-5}$ | $4.07 \times 10^5$ | $+0.84 \times 10^{-5}$ | 103 |
| Tempered by cooling at 100° C./hr. after heating at 800° C. for 1 hr., following above referred water quenching ||||||||
| 75.0 | 20.20 | 4.50 | $8.65 \times 10^5$ | $-2.30 \times 10^{-5}$ | $4.08 \times 10^5$ | $-4.25 \times 10^{-5}$ | 104 |

TABLE 17V
Physical properties of Mn-Ni-Be alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Be (percent) | | | | | |
| As water quenched after heating at 950° C. for 1 hour, following the annealing of Table 16 ||||||||
| 80.75 | 15.15 | 4.10 | $10.73 \times 10^5$ | $+3.50 \times 10^{-5}$ | $4.70 \times 10^5$ | $+1.60 \times 10^{-5}$ | 214 |
| Tempered by cooling at 100° C./hr. after heating at 200° C. for 1 hr., following above referred water quenching ||||||||
| 80.75 | 15.15 | 4.10 | $10.73 \times 10^5$ | $+4.00 \times 10^{-5}$ | $4.70 \times 10^5$ | $+1.95 \times 10^{-5}$ | 213 |
| Tempered by cooling at 100° C./hr. after heating at 400° C. for 1 hr., following above referred water quenching ||||||||
| 80.75 | 15.15 | 4.10 | $10.75 \times 10^5$ | $+3.10 \times 10^{-5}$ | $4.71 \times 10^5$ | $+1.05 \times 10^{-5}$ | 213 |
| Tempered by cooling at 100° C./hr. after heating at 600° C. for 1 hr., following above referred water quenching ||||||||
| 80.75 | 15.15 | 4.10 | $10.75 \times 10^5$ | $+1.80 \times 10^{-5}$ | $4.71 \times 10^5$ | $-0.20 \times 10^{-5}$ | 214 |
| Tempered by cooling at 100° C./hr. after heating at 800° C. for 1 hr., following above referred water quenching ||||||||
| 80.75 | 15.15 | 4.10 | $10.76 \times 10^5$ | $-0.20 \times 10^{-5}$ | $4.72 \times 10^5$ | $-2.15 \times 10^{-5}$ | 215 |

TABLE 17W
Physical properties of Mn-Ni-B alloys

| Alloy composition | | | Young's modulus (kg./cm.$^2$, 20° C.) | Temperature coefficient of Young's modulus e (0 to 40° C.) | Modulus of rigidity (kg./cm.$^2$, 20° C.) | Temperature coefficient of modulus of rigidity (0 to 40° C.) | Vickers hardness (20° C.) |
|---|---|---|---|---|---|---|---|
| Mn (percent) | Ni (percent) | B (percent) | | | | | |
| As water quenched after heating at 950° C. for 1 hour, following the annealing of Table 16 ||||||||
| 78.00 | 21.50 | 0.50 | 14.55×10$^5$ | −1.75×10$^{-5}$ | 5.89×10$^5$ | −3.78×10$^{-5}$ | 271 |
| Tempered by cooling at 100° C./hr. after heating at 200° C. for 1 hr., following the above referred water quenching ||||||||
| 78.00 | 21.50 | 0.50 | 14.58×10$^5$ | −1.70×10$^{-5}$ | 5.90×10$^5$ | −3.73×10$^{-5}$ | 273 |
| Tempered by cooling at 100° C./hr. after heating at 400° C. for 1 hr., following the above referred water quenching ||||||||
| 78.00 | 21.50 | 0.50 | 14.60×10$^5$ | −1.71×10$^{-5}$ | 5.91×10$^5$ | −3.81×10$^{-5}$ | 274 |
| Tempered by cooling at 100° C./hr. after heating at 600° C. for 1 hr., following the above referred water quenching ||||||||
| 78.00 | 21.50 | 0.50 | 14.60×10$^5$ | −1.78×10$^{-5}$ | 5.91×10$^5$ | −3.88×10$^{-5}$ | 276 |
| Tempered by cooling at 100° C./hr. after heating at 800° C. for 1 hr., following the above referred water quenching ||||||||
| 78.00 | 21.50 | 0.50 | 14.65×10$^5$ | −1.80×10$^{-5}$ | 5.92×10$^5$ | −3.85×10$^{-5}$ | 276 |

TABLE 18A
Physical properties of Mn-Ni-In alloys

| Alloy composition | | | Young's modulus (kg./cm.$^2$, 20° C.) | Temperature coefficient of Young's modulus e (0 to 40° C.) | Modulus of rigidity (kg./cm.$^2$, 20° C.) | Temperature coefficient of modulus of rigidity (0 to 40° C.) | Vickers hardness (20° C.) |
|---|---|---|---|---|---|---|---|
| Mn (percent) | Ni (percent) | In (percent) | | | | | |
| As cold-worked with a working rate of 96%, after annealing of Table 16 ||||||||
| 63.25 | 21.55 | 15.20 | 12.65×10$^5$ | −5.60×10$^{-5}$ | 5.27×10$^5$ | −6.83×10$^{-5}$ | 245 |
| Tempered by cooling at 100° C./hr. after heating at 200° C. for 1 hr., following the above referred cold-work ||||||||
| 63.25 | 21.55 | 15.20 | 12.61×10$^5$ | −4.53×10$^{-5}$ | 5.27×10$^5$ | −6.25×10$^{-5}$ | 250 |
| Tempered by cooling at 100° C./hr. after heating at 400° C. for 1 hr., following the above referred cold-work ||||||||
| 63.25 | 21.55 | 15.20 | 12.55×10$^5$ | −5.96×10$^{-5}$ | 5.27×10$^5$ | −6.76×10$^{-5}$ | 251 |
| Tempered by cooling at 100° C./hr. after heating at 600° C. for 1 hr., following the above referred cold-work ||||||||
| 63.25 | 21.55 | 15.20 | 13.66×10$^5$ | −6.55×10$^{-5}$ | 5.61×10$^5$ | −7.25×10$^{-5}$ | 455 |
| Tempered by cooling at 100° C./hr. after heating at 800° C. for 1 hr., following the above referred cold-work ||||||||
| 63.25 | 21.55 | 15.20 | 13.85×10$^5$ | −7.00×10$^{-5}$ — | 5.67×10$^5$ | −7.72×10$^{-5}$ | 650 |

TABLE 18B
Physical properties of Mn-Ni-Ti alloys

| Alloy composition | | | Young's modulus (kg./cm.$^2$, 20° C.) | Temperature coefficient of Young's modulus e (0 to 40° C.) | Modulus of rigidity (kg./cm.$^2$, 20° C.) | Temperature coefficient of modulus of rigidity (0 to 40° C.) | Vickers hardness (20° C.) |
|---|---|---|---|---|---|---|---|
| Mn (percent) | Ni (percent) | Ti (percent) | | | | | |
| As cold-worked with a working rate of 96%, after annealing of Table 16 ||||||||
| 68.69 | 20.39 | 19.92 | 12.85×10$^5$ | −3.50×10$^{-5}$ | 5.37×10$^5$ | −3.87×10$^{-5}$ | 252 |
| Tempered by cooling at 100° C./hr. after heating at 200° C. for 1 hr., following the above referred cold-work ||||||||
| 68.69 | 20.39 | 10.92 | 12.77×10$^5$ | −2.25×10$^{-5}$ | 5.36×10$^5$ | −2.83×10$^{-5}$ | 255 |
| Tempered by cooling at 100° C./hr. after heating at 400° C. for 1 hr., following the above referred cold-work ||||||||
| 68.69 | 20.39 | 10.92 | 12.63×10$^5$ | −3.96×13$^{-5}$ | 5.29×10$^5$ | −4.45×10$^{-5}$ | 253 |
| Tempered by cooling at 100° C./hr. after heating at 600° C. for 1 hr., following the above referred cold-work ||||||||
| 68.69 | 20.39 | 10.92 | 12.87×10$^5$ | −4.25×10$^{-5}$ | 5.37×10$^5$ | −5.36×10$^{-5}$ | 390 |
| Tempered by cooling at 100° C./hr. after heating at 800° C. for 1 hr., following the above referred cold-work ||||||||
| 68.69 | 20.39 | 10.92 | 13.22×10$^5$ | −6.02×10$^{-5}$ | 5.48×10$^5$ | −7.38×10$^{-5}$ | 580 |

TABLE 18C
Physical properties of Mn-Ni-V alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | V (percent) | | | | | |
| As cold-worked with a working rate of 96%, after annealing of Table 16 | | | | | | | |
| 67.65 | 21.02 | 11.33 | 11.83×10⁵ | +2.35×10⁻⁵ | 5.03×10⁵ | +2.00×10⁻⁵ | 246 |
| Tempered by cooling at 100° C./hr. after heating at 200° C. for 1 hr., following the above referred cold-work | | | | | | | |
| 67.65 | 21.02 | 11.33 | 11.75×10⁵ | +5.33×10⁻⁵ | 5.01×10⁵ | +3.65×10⁻⁵ | 250 |
| Tempered by cooling at 100° C./hr. after heating at 400° C. for 1 hr., following the above referred cold-work | | | | | | | |
| 67.65 | 21.02 | 11.33 | 11.71×10⁵ | +1.61×10⁻⁵ | 4.99×10⁵ | −0.65×10⁻⁵ | 252 |
| Tempered by cooling at 100° C./hr. after heating at 600° C. for 1 hr., following the above referred cold-work | | | | | | | |
| 67.65 | 21.02 | 11.33 | 11.83×10⁵ | −2.74×10⁻⁵ | 5.03×10⁵ | −3.76×10⁻⁵ | 405 |
| Tempered by cooling at 100° C./hr. after heating at 800° C. for 1 hr., following the above referred cold-work | | | | | | | |
| 67.65 | 21.02 | 11.33 | 11.94×10⁵ | −3.25×10⁻⁵ | 5.07×10⁵ | −4.02×10⁻⁵ | 595 |

TABLE 18D
Physical properties of Mn-Ni-Au alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Au (percent) | | | | | |
| As cold-worked with a working rate of 96%, after annealing of Table 16 | | | | | | | |
| 74.42 | 20.08 | 5.50 | 9.65×10⁵ | −3.51×10⁻⁵ | 4.37×10⁵ | −4.20×10⁻⁵ | 180 |
| Tempered by cooling at 100° C./hr. after heating at 200° C. for 1 hr., following the above referred cold-work | | | | | | | |
| 74.42 | 20.08 | 5.50 | 9.61×10⁵ | −3.03×10⁻⁵ | 4.35×10⁵ | −3.66×10⁻⁵ | 175 |
| Tempered by cooling at 100° C./hr. after heating at 400° C. for 1 hr., following the above referred cold-work | | | | | | | |
| 74.42 | 20.08 | 5.50 | 9.55×10⁵ | −3.83×10⁻⁵ | 4.33×10⁵ | −4.35×10⁻⁵ | 178 |
| Tempered by cooling at 100° C./hr. after heating at 600° C. for 1 hr., following the above referred cold-work | | | | | | | |
| 74.42 | 20.08 | 5.50 | 9.63×10⁵ | −5.00×10⁻⁵ | 4.35×10⁵ | −5.65×10⁻⁵ | 182 |
| Tempered by cooling at 100° C./hr. after heating at 800° C. for 1 hr., following the above referred cold-work | | | | | | | |
| 74.42 | 20.08 | 5.50 | 9.85×10⁵ | −5.36×10⁻⁵ | 4.43×10⁵ | −6.11×10⁻⁵ | 390 |

TABLE 18E
Physical properties of Mn-Ni-Ag alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Ag (percent) | | | | | |
| As cold-worked with a working rate of 96%, after annealing of Table 16 | | | | | | | |
| 76.70 | 15.10 | 8.20 | 9.96×10⁵ | −5.50×10⁻⁵ | 4.45×10⁵ | −5.97×10⁻⁵ | 177 |
| Tempered by cooling at 100° C./hr. after heating at 200° C. for 1 hr., following the above referred cold-work | | | | | | | |
| 76.70 | 15.10 | 8.20 | 9.92×10⁵ | −5.01×10⁻⁵ | 4.44×10⁵ | −5.66×10⁻⁵ | 176 |
| Tempered by cooling at 100° C./hr. after heating at 400° C. for 1 hr., following the above referred cold-work | | | | | | | |
| 76.70 | 15.10 | 8.20 | 9.83×10⁵ | −5.25×10⁻⁵ | 4.42×10⁵ | −6.34×10⁻⁵ | 172 |
| Tempered by cooling at 100° C./hr. after heating at 600° C. for 1 hr., following the above referred cold-work | | | | | | | |
| 76.70 | 15.10 | 8.20 | 9.95×10⁵ | −6.68×10⁻⁵ | 4.45×10⁵ | −7.93×10⁻⁵ | 245 |
| Tempered by cooling at 100° C./hr. after heating at 800° C. for 1 hr., following the above referred cold-work | | | | | | | |
| 76.70 | 15.10 | 8.20 | 10.25×10⁵ | −7.33×10⁻⁵ | 4.55×10⁵ | −8.00×10⁻⁵ | 480 |

TABLE 18F
Physical properties of Mn-Ni-Ta alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Ta (percent) | | | | | |
| As cold-worked with a working rate of 96%, after annealing of Table 16 ||||||||
| 72.90 | 22.10 | 5.00 | $9.43 \times 10^5$ | $+9.85 \times 10^{-5}$ | $4.29 \times 10^5$ | $+8.76 \times 10^{-5}$ | 166 |
| Tempered by cooling at 100° C./hr. after heating at 200° C. for 1 hr., following the above referred cold-work ||||||||
| 72.90 | 22.10 | 5.00 | $9.40 \times 10^5$ | $+11.00 \times 10^{-5}$ | $4.29 \times 10^5$ | $+10.36 \times 10^{-5}$ | 160 |
| Tempered by cooling at 100° C./hr. after heating at 400° C. for 1 hr., following the above referred cold-work ||||||||
| 72.90 | 22.10 | 5.00 | $9.83 \times 10^5$ | $+10.36 \times 10^{-5}$ | $4.28 \times 10^5$ | $+9.27 \times 10^{-5}$ | 161 |
| Tempered by cooling at 100° C./hr. after heating at 600° C. for 1 hr., following the above referred cold-work ||||||||
| 72.90 | 22.10 | 5.00 | $9.56 \times 10^5$ | $+7.24 \times 10^{-5}$ | $4.33 \times 10^5$ | $+5.18 \times 10^{-5}$ | 255 |
| Tempered by cooling at 100° C./hr. after heating at 800° C. for 1 hr., following the above referred cold-work ||||||||
| 72.90 | 22.10 | 5.00 | $9.87 \times 10^5$ | $+3.65 \times 10^{-5}$ | $4.43 \times 10^5$ | $+1.24 \times 10^{-5}$ | 396 |

TABLE 18G
Physical properties of Mn-Ni-Zr alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Zr (percent) | | | | | |
| As cold-worked with a working rate of 96%, after annealing of Table 16 ||||||||
| 66.79 | 20.25 | 12.96 | $13.86 \times 10^5$ | $-3.31 \times 10^{-5}$ | $5.67 \times 10^5$ | $-3.76 \times 10^{-5}$ | 263 |
| Tempered by cooling at 100° C./hr. after heating at 200° C. for 1 hr., following the above referred cold-work ||||||||
| 66.79 | 20.25 | 12.96 | $13.80 \times 10^5$ | $-1.65 \times 10^{-5}$ | $5.65 \times 10^5$ | $-2.85 \times 10^{-5}$ | 261 |
| Tempered by cooling at 100° C./hr. after heating at 400° C. for 1 hr., following the above referred cold-work ||||||||
| 66.79 | 20.25 | 12.96 | $13.74 \times 10^5$ | $-2.25 \times 10^{-5}$ | $5.64 \times 10^5$ | $-3.65 \times 10^{-5}$ | 260 |
| Tempered by cooling at 100° C./hr. after heating at 600° C. for 1 hr., following the above referred cold-work ||||||||
| 66.79 | 20.25 | 12.96 | $13.85 \times 10^5$ | $-3.42 \times 10^{-5}$ | $5.67 \times 10^5$ | $-4.48 \times 10^{-5}$ | 340 |
| Tempered by cooling at 100° C./hr. after heating at 800° C. for 1 hr., following the above referred cold-work ||||||||
| 66.79 | 20.25 | 12.96 | $14.00 \times 10^5$ | $-4.65 \times 10^{-5}$ | $5.71 \times 10^5$ | $-5.25 \times 10^{-5}$ | 556 |

TABLE 18H
Physical properties of Mn-Ni-Pd alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Pd (percent) | | | | | |
| As cold-worked with a working rate of 96%, after annealing of Table 16 ||||||||
| 77.62 | 15.13 | 7.25 | $9.98 \times 10^5$ | $-13.25 \times 10^{-5}$ | $4.46 \times 10^5$ | $+2.99 \times 10^{-5}$ | 165 |
| Tempered by cooling at 100° C./hr. after heating at 200° C. for 1 hr., following the above referred cold-work ||||||||
| 77.62 | 15.13 | 7.25 | $9.95 \times 10^5$ | $+4.04 \times 10^{-5}$ | $4.45 \times 10^5$ | $+3.65 \times 10^{-5}$ | 168 |
| Tempered by cooling at 100° C./hr. after heating at 400° C. for 1 hr., following the above referred cold-work ||||||||
| 77.62 | 15.13 | 7.25 | $9.82 \times 10^5$ | $+3.38 \times 10^{-5}$ | $4.42 \times 10^5$ | $+3.16 \times 10^{-5}$ | 163 |
| Tempered by cooling at 100° C./hr. after heating at 600° C. for 1 hr., following the above referred cold-work ||||||||
| 77.62 | 15.13 | 7.25 | $9.97 \times 10^5$ | $+2.25 \times 10^{-5}$ | $4.46 \times 10^5$ | $+2.00 \times 10^{-5}$ | 257 |
| Tempered by cooling at 100° C./hr. after heating at 800° C. for 1 hr., following the above referred cold-work ||||||||
| 77.62 | 15.13 | 7.25 | $10.23 \times 10^5$ | $+2.00 \times 10^{-5}$ | $4.53 \times 10^5$ | $+1.66 \times 10^{-5}$ | 425 |

TABLE 18I

Physical properties of Mn-Ni-Cd alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Cd (percent) | | | | | |
| As cold-worked with a working rate of 96%, after annealing of Table 16 | | | | | | | |
| 69.62 | 15.18 | 15.20 | $12.25 \times 10^5$ | $-6.51 \times 10^{-5}$ | $5.17 \times 10^5$ | $-6.85 \times 10^{-5}$ | 241 |
| Tempered by cooling at 100° C./hr. after heating at 200° C. for 1 hr., following the above referred cold-work | | | | | | | |
| 69.62 | 15.18 | 15.20 | $12.21 \times 10^5$ | $-5.20 \times 10^{-5}$ | $5.15 \times 10^5$ | $-6.00 \times 10^{-5}$ | 240 |
| Tempered by cooling at 100° C./hr. after heating at 400° C. for 1 hr., following the above referred cold-work | | | | | | | |
| 69.62 | 15.18 | 15.20 | $12.17 \times 10^5$ | $-6.00 \times 10^{-5}$ | $5.14 \times 10^5$ | $-6.77 \times 10^{-5}$ | 238 |
| Tempered by cooling at 100° C./hr. after heating at 600° C. for 1 hr., following the above referred cold-work | | | | | | | |
| 69.62 | 15.18 | 15.20 | $12.26 \times 10^5$ | $-7.16 \times 10^{-5}$ | $5.17 \times 10^5$ | $-7.64 \times 10^{-5}$ | 377 |
| Tempered by cooling at 100° C./hr. after heating at 800° C. for 1 hr., following the above referred cold-work | | | | | | | |
| 69.62 | 15.18 | 15.20 | $12.76 \times 10^5$ | $-7.67 \times 10^{-5}$ | $5.33 \times 10^5$ | $-8.09 \times 10^{-5}$ | 546 |

TABLE 18J

Physical properties of Mn-Ni-Ge alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Ge (percent) | | | | | |
| As cold-worked with a working rate of 96%, after annealing of Table 16 | | | | | | | |
| 76.36 | 17.13 | 6.51 | $9.44 \times 10^5$ | $-1.21 \times 10^{-5}$ | $4.30 \times 10^5$ | $-2.36 \times 10^{-5}$ | 156 |
| Tempered by cooling at 100° C./hr. after heating at 200° C. for 1 hr., following the above referred cold-work | | | | | | | |
| 76.36 | 17.13 | 6.51 | $9.41 \times 10^5$ | $-0.52 \times 10^{-5}$ | $4.29 \times 10^5$ | $-1.87 \times 10^{-5}$ | 155 |
| Tempered by cooling at 100° C./hr. after heating at 400° C. for 1 hr., following the above referred cold-work | | | | | | | |
| 76.36 | 17.13 | 6.51 | $9.75 \times 10^5$ | $-1.83 \times 10^{-5}$ | $4.27 \times 10^5$ | $-2.44 \times 10^{-5}$ | 163 |
| Tempered by cooling at 100° C./hr. after heating at 600° C. for 1 hr., following the above referred cold-work | | | | | | | |
| 76.36 | 17.13 | 6.51 | $9.45 \times 10^5$ | $-2.26 \times 10^{-5}$ | $4.30 \times 10^5$ | $-3.63 \times 10^{-5}$ | 249 |
| Tempered by cooling at 100° C./hr. after heating at 800° C. for 1 hr., following the above referred cold-work | | | | | | | |
| 76.36 | 17.13 | 6.51 | $9.85 \times 10^5$ | $-3.53 \times 10^{-5}$ | $4.43 \times 10^5$ | $-4.46 \times 10^{-5}$ | 443 |

TABLE 18K

Physical properties of Mn-Ni-Se alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Se (percent) | | | | | |
| As cold-worked with a working rate of 96%, after annealing of Table 16 | | | | | | | |
| 66.46 | 15.33 | 18.21 | $10.11 \times 10^5$ | $-10.25 \times 10^{-5}$ | $4.51 \times 10^5$ | $-11.18 \times 10^{-5}$ | 172 |
| Tempered by cooling at 100° C./hr. after heating at 200° C. for 1 hr., following the above referred cold-work | | | | | | | |
| 66.46 | 15.33 | 18.21 | $10.02 \times 10^5$ | $-9.00 \times 10^{-5}$ | $4.46 \times 10^5$ | $-9.66 \times 10^{-5}$ | 170 |
| Tempered by cooling at 100° C./hr. after heating at 400° C. for 1 hr., following the above referred cold-work | | | | | | | |
| 66.46 | 15.33 | 18.21 | $9.87 \times 10^5$ | $-8.35 \times 10^{-5}$ | $4.43 \times 10^5$ | $-9.25 \times 10^{-5}$ | 171 |
| Tempered by cooling at 100° C./hr. after heating at 600° C. for 1 hr., following the above referred cold-work | | | | | | | |
| 66.46 | 15.33 | 18.21 | $10.00 \times 10^5$ | $-10.00 \times 10^{-5}$ | $4.47 \times 10^5$ | $-10.77 \times 10^{-5}$ | 247 |
| Tempered by cooling at 100° C./hr. after heating at 800° C. for 1 hr., following the above referred cold-work | | | | | | | |
| 66.46 | 15.33 | 18.21 | $10.45 \times 10^5$ | $-11.25 \times 10^{-5}$ | $4.61 \times 10^5$ | $-11.04 \times 10^{-5}$ | 505 |

TABLE 18L
Physical properties of Mn-Ni-Bi alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vicker hardness (20° C.) |
|---|---|---|---|---|---|---|---|
| Mn (percent) | Ni (percent) | Bi (percent) | | | | | |
| As cold-worked with a working rate of 96%, after annealing of Table 16 | | | | | | | |
| 67.09 | 20.06 | 12.85 | $10.45 \times 10^5$ | $-5.18 \times 10^{-5}$ | $4.61 \times 10^5$ | $-6.37 \times 10^{-5}$ | 180 |
| Tempered by cooling at 100° C./hr. after heating at 200° C. for 1 hr., following the above referred cold-work | | | | | | | |
| 67.09 | 20.06 | 12.85 | $10.41 \times 10^5$ | $-4.42 \times 10^{-5}$ | $4.59 \times 10^5$ | $-5.65 \times 10^{-5}$ | 196 |
| Tempered by cooling at 100° C./hr. after heating at 400° C. for 1 hr., following the above referred cold-work | | | | | | | |
| 67.09 | 20.06 | 12.85 | $10.27 \times 10^5$ | $-4.85 \times 10^{-5}$ | $4.55 \times 10^5$ | $-5.36 \times 10^{-5}$ | 195 |
| Tempered by cooling at 100° C./hr. after heating at 600° C. for 1 hr., following the above referred cold-work | | | | | | | |
| 67.09 | 20.06 | 12.85 | $10.56 \times 10^5$ | $-5.66 \times 10^{-5}$ | $4.64 \times 10^5$ | $-6.45 \times 10^{-5}$ | 400 |
| Tempered by cooling at 100° C./hr. after heating at 800° C. for 1 hr., following the above referred cold-work | | | | | | | |
| 67.09 | 20.06 | 12.85 | $10.95 \times 10^5$ | $-6.39 \times 10^{-5}$ | $4.77 \times 10^5$ | $-7.06 \times 10^{-5}$ | 502 |

TABLE 18M
Physical properties of Mn-Ni-Sm alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Sm (percent) | | | | | |
| As cold-worked with a working rate of 96%, after annealing of Table 16 | | | | | | | |
| 68.60 | 20.15 | 11.25 | $10.45 \times 10^5$ | $-4.22 \times 10^{-5}$ | $4.61 \times 10^5$ | $-4.85 \times 10^{-5}$ | 181 |
| Tempered by cooling at 100° C./hr. after heating at 200° C. for 1 hr., following the above referred cold-work | | | | | | | |
| 68.60 | 20.15 | 11.25 | $10.42 \times 10^5$ | $-3.65 \times 10^{-5}$ | $4.59 \times 10^5$ | $-4.01 \times 10^{-5}$ | 176 |
| Tempered by cooling at 100° C./hr. after heating at 400° C. for 1 hr., following the above referred cold-work | | | | | | | |
| 68.60 | 20.15 | 11.25 | $10.22 \times 10^5$ | $-3.30 \times 10^{-5}$ | $4.53 \times 10^5$ | $-3.96 \times 10^{-5}$ | 175 |
| Tempered by cooling at 100° C./hr. after heating at 600° C. for 1 hr., following the above referred cold-work | | | | | | | |
| 68.60 | 20.15 | 11.25 | $10.35 \times 10^5$ | $-4.29 \times 10^{-5}$ | $4.58 \times 10^5$ | $-5.25 \times 10^{-5}$ | 243 |
| Tempered by cooling at 100° C./hr. after heating at 800° C. for 1 hr., following the above referred cold-work | | | | | | | |
| 68.60 | 20.15 | 11.25 | $10.76 \times 10^5$ | $-5.80 \times 10^{-5}$ | $4.70 \times 10^5$ | $-6.33 \times 10^{-5}$ | 499 |

TABLE 18N
Physical properties of Mn-Ni-Nb alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Nb (percent) | | | | | |
| As cold-worked with a working rate of 96%, after annealing of Table 16 | | | | | | | |
| 73.80 | 20.55 | 5.65 | $12.15 \times 10^5$ | $-1.25 \times 10^{-5}$ | $5.13 \times 10^5$ | $-2.03 \times 10^{-5}$ | 242 |
| Tempered by cooling at 100° C./hr. after heating at 200° C. for 1 hr., following the above referred cold-work | | | | | | | |
| 73.80 | 20.55 | 5.65 | $12.11 \times 10^5$ | $-0.20 \times 10^{-5}$ | $5.12 \times 10^5$ | $-0.66 \times 10^{-5}$ | 240 |
| Tempered by cooling at 100° C./hr. after heating at 400° C. for 1 hr., following the above referred cold-work | | | | | | | |
| 73.80 | 20.55 | 5.65 | $12.06 \times 10^5$ | $-0.58 \times 10^{-5}$ | $5.11 \times 10^5$ | $-0.96 \times 10^{-5}$ | 230 |
| Tempered by cooling at 100° C./hr. after heating at 600° C. for 1 hr., following the above referred cold-work | | | | | | | |
| 73.80 | 20.55 | 5.65 | $12.38 \times 10^5$ | $-1.33 \times 10^{-5}$ | $5.21 \times 10^5$ | $-2.24 \times 10^{-5}$ | 361 |
| Tempered by cooling at 100° C./hr. after heating at 800° C. for 1 hr., following the above referred cold-work | | | | | | | |
| 73.80 | 20.55 | 5.65 | $12.55 \times 10^5$ | $-2.45 \times 10^{-5}$ | $5.27 \times 10^5$ | $-3.66 \times 10^{-5}$ | 488 |

TABLE 18O

Physical properties of Mn-Ni-Sb alloys

| Alloy composition | | | Young's modulus (kg./cm.$^2$, 20° C.) | Temperature coefficient of Young's modulus $e$ (0 to 40° C.) | Modulus of rigidity (kg./cm.$^2$, 20° C.) | Temperature coefficient of modulus of rigidity (0 to 40° C.) | Vickers hardness (20° C.) |
|---|---|---|---|---|---|---|---|
| Mn (percent) | Ni (percent) | Sb (percent) | | | | | |
| As cold-worked with a working rate of 96%, after annealing of Table 16 | | | | | | | |
| 67.06 | 20.05 | 12.89 | 10.65×10$^5$ | −6.86×10$^{-5}$ | 4.67×10$^5$ | −7.03×10$^{-5}$ | 236 |
| Tempered by cooling at 100° C./hr. after heating at 200° C. for 1 hr., following the above referred cold-work | | | | | | | |
| 67.06 | 20.05 | 12.89 | 10.42×10$^5$ | −7.15×10$^{-5}$ | 4.59×10$^5$ | −8.25×10$^{-5}$ | 241 |
| Tempered by cooling at 100° C./hr. after heating at 400° C. for 1 hr., following the above referred cold-work | | | | | | | |
| 67.06 | 20.05 | 12.89 | 10.11×10$^5$ | −7.63×10$^{-5}$ | 4.51×10$^5$ | −8.35×10$^{-5}$ | 240 |
| Tempered by cooling at 100° C./hr. after heating at 600° C. for 1 hr., following the above referred cold-work | | | | | | | |
| 67.06 | 20.05 | 12.89 | 10.58×10$^5$ | −8.11×10$^{-5}$ | 4.65×10$^5$ | −9.00×10$^{-5}$ | 399 |
| Tempered by cooling at 100° C./hr. after heating at 800° C. for 1 hr., following the above referred cold-work | | | | | | | |
| 67.06 | 20.05 | 12.89 | 10.92×10$^5$ | −8.82×10$^{-5}$ | 4.75×10$^5$ | −9.66×10$^{-5}$ | 563 |

TABLE 18P

Physical properties of Mn-Ni-Al alloys

| Alloy composition | | | Young's modulus (kg./cm.$^2$, 20° C.) | Temperature coefficient of Young's modulus $e$ (0 to 40° C.) | Modulus of rigidity (kg./cm.$^2$, 20° C.) | Temperature coefficient of modulus of rigidity (0 to 40° C.) | Vickers hardness (20° C.) |
|---|---|---|---|---|---|---|---|
| Mn (percent) | Ni (percent) | Al (percent) | | | | | |
| As cold-worked with a working rate of 96%, after annealing of Table 16 | | | | | | | |
| 73.99 | 17.16 | 8.85 | 11.39×10$^5$ | −2.35×10$^{-5}$ | 4.90×10$^5$ | −3.11×10$^{-5}$ | 192 |
| Tempered by cooling at 100° C./hr. after heating at 200° C. for 1 hr., following the above referred cold-work | | | | | | | |
| 73.99 | 17.16 | 8.85 | 11.17×10$^5$ | −1.04×10$^{-5}$ | 4.83×10$^5$ | −2.38×10$^{-5}$ | 190 |
| Tempered by cooling at 100° C./hr. after heating at 400° C. for 1 hr., following the above referred cold-work | | | | | | | |
| 73.99 | 17.16 | 8.85 | 11.02×10$^5$ | −2.00×10$^{-5}$ | 4.81×10$^5$ | −2.96×10$^{-5}$ | 193 |
| Tempered by cooling at 100° C./hr. after heating at 600° C. for 1 hr., following the above referred cold-work | | | | | | | |
| 73.99 | 17.16 | 8.85 | 11.73×10$^5$ | −3.25×10$^{-5}$ | 5.00×10$^5$ | −4.48×10$^{-5}$ | 291 |
| Tempered by cooling at 100° C./hr. after heating at 800° C. for 1 hr., following the above referred cold-work | | | | | | | |
| 73.99 | 17.16 | 8.85 | 11.89×10$^5$ | −3.66×10$^{-5}$ | 5.06×10$^5$ | −4.69×10$^{-5}$ | 485 |

TABLE 18Q

Physical properties of Mn-Ni-Si alloys

| Alloy composition | | | Young's modulus (kg./cm.$^2$, 20° C.) | Temperature coefficient of Young's modulus $e$ (0 to 40° C.) | Modulus of rigidity (kg./cm.$^2$, 20° C.) | Temperature coefficient of modulus of rigidity (0 to 40° C.) | Vickers hardness (20° C.) |
|---|---|---|---|---|---|---|---|
| Mn (percent) | Ni (percent) | Si (percent) | | | | | |
| As cold-worked with a working rate of 96%, after annealing of Table 16 | | | | | | | |
| 73.74 | 20.25 | 6.01 | 12.27×10$^5$ | −0.33×10$^{-5}$ | 5.18×10$^5$ | −0.87×10$^{-5}$ | 201 |
| Tempered by cooling at 100° C./hr. after heating at 200° C. for 1 hr., following the above referred cold-work | | | | | | | |
| 73.74 | 20.25 | 6.01 | 12.24×10$^5$ | +0.56×10$^{-5}$ | 5.17×10$^5$ | +0.21×10$^{-5}$ | 233 |
| Tempered by cooling at 100° C./hr. after heating at 400° C. for 1 hr., following the above referred cold-work | | | | | | | |
| 73.74 | 20.25 | 6.01 | 12.10×10$^5$ | −0.25×10$^{-5}$ | 5.12×10$^5$ | −0.94×10$^{-5}$ | 231 |
| Tempered by cooling at 100° C./hr. after heating at 600° C. for 1 hr., following the above referred cold-work | | | | | | | |
| 73.74 | 20.25 | 6.01 | 12.35×10$^5$ | −1.09×10$^{-5}$ | 5.20×10$^5$ | −1.63×10$^{-5}$ | 492 |
| Tempered by cooling at 100° C./hr. after heating at 800° C. for 1 hr., following the above referred cold-work | | | | | | | |
| 73.74 | 20.25 | 6.01 | 12.87×10$^5$ | −2.11×10$^{-5}$ | 5.37×10$^5$ | −2.72×10$^{-5}$ | 600 |

TABLE 18R
Physical properties of Mn-Ni-Sn alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Sn (percent) | | | | | |
| As cold-worked with a working rate of 96%, after annealing of Table 16 ||||||||
| 74.89 | 20.01 | 5.10 | $9.25 \times 10^5$ | $-4.47 \times 10^{-5}$ | $4.25 \times 10^5$ | $-4.96 \times 10^{-5}$ | 145 |
| Tempered by cooling at 100° C./hr. after heating at 200° C. for 1 hr., following the above referred cold-work ||||||||
| 74.89 | 20.01 | 5.10 | $9.21 \times 10^5$ | $-3.55 \times 10^{-5}$ | $4.23 \times 10^5$ | $-4.22 \times 10^{-5}$ | 140 |
| Tempered by cooling at 100° C./hr. after heating at 400° C. for 1 hr., following the above referred cold-work ||||||||
| 74.89 | 20.01 | 5.10 | $9.16 \times 10^5$ | $-6.29 \times 10^{-5}$ | $4.21 \times 10^5$ | $-7.13 \times 10^{-5}$ | 140 |
| Tempered by cooling at 100° C./hr. after heating at 600° C. for 1 hr., following the above referred cold-work ||||||||
| 74.89 | 20.01 | 5.10 | $9.78 \times 10^5$ | $-6.87 \times 10^{-5}$ | $4.40 \times 10^5$ | $-7.75 \times 10^{-5}$ | 316 |
| Tempered by cooling at 100° C./hr. after heating at 800° C. for 1 hr., following the above referred cold-work ||||||||
| 74.89 | 20.01 | 5.10 | $10.25 \times 10^5$ | $-7.75 \times 10^{-5}$ | $4.55 \times 10^5$ | $-8.11 \times 10^{-5}$ | 455 |

TABLE 18S
Physical properties of Mn-Ni-Te alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Te (percent) | | | | | |
| As cold-worked with a working rate of 96%, after annealing of Table 16 ||||||||
| 72.56 | 20.11 | 7.33 | $9.44 \times 10^5$ | $+5.25 \times 10^{-5}$ | $4.30 \times 10^5$ | $+4.33 \times 10^{-5}$ | 145 |
| Tempered by cooling at 100° C./hr. after heating at 200° C. for 1 hr., following the above referred cold-work ||||||||
| 72.56 | 20.11 | 7.33 | $9.40 \times 10^5$ | $+6.32 \times 10^{-5}$ | $4.29 \times 10^5$ | $+5.18 \times 10^{-5}$ | 138 |
| Tempered by cooling at 100° C./hr. after heating at 400° C. for 1 hr., following the above referred cold-work ||||||||
| 72.56 | 20.11 | 7.33 | $9.36 \times 10^5$ | $+5.44 \times 10^{-5}$ | $4.27 \times 10^5$ | $+4.66 \times 10^{-5}$ | 135 |
| Tempered by cooling at 100° C./hr. after heating at 600° C. for 1 hr., following the above referred cold-work ||||||||
| 72.56 | 20.11 | 7.33 | $9.57 \times 10^5$ | $+4.25 \times 10^{-5}$ | $4.33 \times 10^5$ | $+3.29 \times 10^{-5}$ | 245 |
| Tempered by cooling at 100° C./hr. after heating at 800° C. for 1 hr., following the above referred cold-work ||||||||
| 72.56 | 20.11 | 7.33 | $10.03 \times 10^5$ | $+2.03 \times 10^{-5}$ | $4.47 \times 10^5$ | $+1.45 \times 10^{-5}$ | 465 |

TABLE 18T
Physical properties of Mn-Ni-Gd alloys

| Alloy composition | | | Young's modulus (kg./cm.², 20° C.) | Temperature coefficient of Young's modulus e (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Gd (percent) | | | | | |
| As cold-worked with a working rate of 96%, after annealing of Table 16 ||||||||
| 69.87 | 20.00 | 10.13 | $11.63 \times 10^5$ | $-14.25 \times 10^{-5}$ | $4.97 \times 10^5$ | $-15.18 \times 10^{-5}$ | 182 |
| Tempered by cooling at 100° C./hr. after heating at 200° C. for 1 hr., following the above referred cold-work ||||||||
| 69.87 | 20.00 | 10.13 | $11.54 \times 10^5$ | $-12.25 \times 10^{-5}$ | $4.95 \times 10^5$ | $-13.36 \times 10^{-5}$ | 180 |
| Tempered by cooling at 100° C./hr. after heating at 400° C. for 1 hr., following the above referred cold-work ||||||||
| 69.87 | 20.00 | 10.13 | $11.42 \times 10^5$ | $-10.35 \times 10^{-5}$ | $4.91 \times 10^5$ | $-11.47 \times 10^{-5}$ | 175 |
| Tempered by cooling at 100° C./hr. after heating at 600° C. for 1 hr., following the above referred cold-work ||||||||
| 69.87 | 20.00 | 10.13 | $11.73 \times 10^5$ | $-13.71 \times 10^{-5}$ | $5.00 \times 10^5$ | $-14.22 \times 10^{-5}$ | 320 |
| Tempered by cooling at 100° C./hr. after heating at 800° C. for 1 hr., following the above referred cold-work ||||||||
| 69.87 | 20.00 | 10.13 | $12.24 \times 10^5$ | $-14.08 \times 10^{-5}$ | $5.17 \times 10^5$ | $-15.19 \times 10^{-5}$ | 551 |

TABLE 18U
Physical properties of Mn-Ni-Zn alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Zn (percent) | | | | | |
| As cold-worked with a working rate of 96%, after annealing of Table 16 ||||||||
| 71.20 | 20.06 | 8.74 | $10.25 \times 10^5$ | $-0.56 \times 10^{-5}$ | $4.55 \times 10^5$ | $-0.85 \times 10^{-5}$ | 165 |
| Tempered by cooling at 100° C./hr. after heating at 200° C. for 1 hr., following the above referred cold-work ||||||||
| 71.20 | 20.06 | 8.74 | $10.10 \times 10^5$ | $+0.25 \times 10^{-5}$ | $4.51 \times 10^5$ | $-10.20 \times 10^{-5}$ | 163 |
| Tempered by cooling at 100° C./hr. after heating at 400° C. for 1 hr., following the above referred cold-work ||||||||
| 71.20 | 20.06 | 8.74 | $9.96 \times 10^5$ | $+1.35 \times 10^{-5}$ | $4.46 \times 10^5$ | $+1.00 \times 10^{-5}$ | 160 |
| Tempered by cooling at 100° C./hr. after heating at 600° C. for 1 hr., following the above referred cold-work ||||||||
| 71.20 | 20.06 | 8.74 | $10.37 \times 10^5$ | $-0.22 \times 10^{-5}$ | $4.59 \times 10^5$ | $-0.83 \times 10^{-5}$ | 320 |
| Tempered by cooling at 100° C./hr. after heating at 800° C. for 1 hr., following the above referred cold-work ||||||||
| 71.20 | 20.06 | 8.74 | $10.81 \times 10^5$ | $-2.67 \times 10^{-5}$ | $4.72 \times 10^5$ | $-3.45 \times 10^{-5}$ | 531 |

TABLE 18V
Physical properties of Mn-Ni-Be alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | Be (percent) | | | | | |
| As cold-worked with a working rate of 96%, after annealing of Table 16 ||||||||
| 70.38 | 22.12 | 7.50 | $14.85 \times 10^5$ | $+5.45 \times 10^{-5}$ | $5.98 \times 10^5$ | $+5.11 \times 10^{-5}$ | 299 |
| Tempered by cooling at 100° C./hr. after heating at 200° C. for 1 hr., following the above referred cold-work ||||||||
| 70.38 | 22.12 | 7.50 | $14.83 \times 10^5$ | $+6.28 \times 10^{-5}$ | $5.97 \times 10^5$ | $+6.00 \times 10^{-5}$ | 295 |
| Tempered by cooling at 100° C./hr. after heating at 400° C. for 1 hr., following the above referred cold-work ||||||||
| 70.38 | 22.12 | 7.50 | $14.76 \times 10^5$ | $+4.25 \times 10^{-5}$ | $5.95 \times 10^5$ | $+3.32 \times 10^{-5}$ | 290 |
| Tempered by cooling at 100° C./hr. after heating at 600° C. for 1 hr., following the above referred cold-work ||||||||
| 70.38 | 22.12 | 7.50 | $14.88 \times 10^5$ | $+3.39 \times 10^{-5}$ | $5.98 \times 10^5$ | $+2.18 \times 10^{-5}$ | 375 |
| Tempered by cooling at 100° C./hr. after heating at 800° C. for 1 hr., following the above referred cold-work ||||||||
| 70.38 | 22.12 | 7.50 | $15.03 \times 10^5$ | $+2.41 \times 10^{-5}$ | $6.04 \times 10^5$ | $+2.06 \times 10^{-6}$ | 722 |

TABLE 18W
Physical properties of Mn-NI-B alloys

| Alloy composition | | | Young's modulus (kg./cm.², 20° C.) | Temperature coefficient of Young's modulus $e$ (0 to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|
| Mn (percent) | Ni (percent) | B (percent) | | | | | |
| As cold-worked with a working rate of 96%, after annealing of Table 16 ||||||||
| 70.62 | 29.17 | 0.21 | $14.46 \times 10^5$ | $-3.51 \times 10^{-5}$ | $5.85 \times 10^5$ | $-4.08 \times 10^{-5}$ | 305 |
| Tempered by cooling at 100° C./hr. after heating at 200° C. for 1 hr., following the above referred cold-work ||||||||
| 70.62 | 29.17 | 0.21 | $14.32 \times 10^5$ | $-2.37 \times 10^{-5}$ | $5.81 \times 10^5$ | $-3.63 \times 10^{-5}$ | 344 |
| Tempered by cooling at 100° C./hr. after heating at 400° C. for 1 hr., following the above referred cold-work ||||||||
| 70.62 | 29.17 | 0.21 | $14.21 \times 10^5$ | $-2.16 \times 10^{-5}$ | $5.78 \times 10^5$ | $-3.24 \times 10^{-5}$ | 340 |
| Tempered by cooling at 100° C./hr. after heating at 600° C. for 1 hr., following the above referred cold-work ||||||||
| 70.62 | 29.17 | 0.21 | $14.54 \times 10^5$ | $-3.45 \times 10^{-5}$ | $5.89 \times 10^5$ | $-4.86 \times 10^{-5}$ | 438 |
| Tempered by cooling at 100° C./hr. after heating at 800° C. for 1 hr., following the above referred cold-work ||||||||
| 70.62 | 29.17 | 0.21 | $15.17 \times 10^5$ | $-4.68 \times 10^{-5}$ | $6.08 \times 10^5$ | $-5.00 \times 10^{-5}$ | 746 | the content of manganese to 40 to 95 wt. percent, the content of nickel to less than 40 wt. percent, the concent of chromium as an optional subingredient to 0 to 32 wt. percent, the content of iron, molybdenum, tungsten, indium, and titanium, as optional subingredients to 0 to 30 wt. percent, the content of cobalt, vanadium, gold, silver, tantalum, zirconium, palladium, cadmium, germanium, selenium, bismuth, samarium, niobium, antimony, aluminum, silicon, tin, tellurium, and gadolinium as optional subingredients to 0 to 20 wt. percent, the content of zinc, beryllium, and boron, as optional subingredients to 0 to 10 wt. percent, and the total content of the optional subingredients to 0 to 32 wt. percent are in the fact that the desired small temperature coefficient of Young's modulus as an elastic member cannot be achieved unless the composition of the elastic member is in the aforesaid range, as can be seen from FIGS. 1 to 42E and Tables 1 to 18W.

What is claimed is:

1. Non-magnetic resilient manganese-nickel alloys having a small temperature variation of elasticity, characterized in that, the alloy essentially consists of 40 to 95 wt. percent of manganese, less than 40 wt. percent of nickel, and an effective amount up to 32 wt. percent in total of at least one member selected from the group consisting of 0 to 32 wt. percent of chromium, 0 to 30 wt. percent of iron, molybdenum, tungsten, indium, and titanium, 0 to 20 wt. percent of cobalt, vanadium, gold, silver, tantalum, zirconium, palladium, cadmium, germanium, selenium, bismuth, samarium, niobium, antimony, aluminum, silicon, tin, tellurium, and gadolinium, and 0 to 10 wt. percent of zinc, beryllium, and boron, said amount being effective to ensure that the temperature coefficient of Young's modulus (or modulus of rigidity) of the alloy is in a range of $-20 \times 10^{-5}$ to $+20 \times 10^{-5}$, preferably $-5 \times 10^{-5}$ to $+5 \times 10^{-5}$.

2. Non-magnetic resilient manganese-nickel alloys having a small temperature variation of elasticity as defined in claim 1, wherein the alloy essentially consists of 40 to 91 wt. percent of manganese, less than 40 wt. percent of nickel, and less than 32 wt. percent of chromium.

3. Non-magnetic resilient manganese-nickel alloys having a small temperature variation of elasticity as defined in claim 1, wherein the alloy essentially consists of 60 to 95 wt. percent of manganese, less than 40 wt. percent of nickel, and at least one ingredient selected from the group consisting of less than 30 wt. percent of iron and less than 20 wt. percent of cobalt.

4. Non-magnetic resilient manganese-nickel alloys having a small temperature variation of elasticity as defined in claim 1, wherein the alloy essentially consists of 40 to 95 wt. percent of manganese, 40 to 1 wt. percent of nickel, and at least one ingredient selected from the group consisting of 0 to 30 wt. percent of molybdenum and tungsten.

5. Non-magnetic resilient manganese-nickel alloys having a small temperature variation of elasticity as defined in claim 1, wherein the alloy essentially consists of 40 to 95 wt. percent of manganese, 40 to 1 wt. percent of nickel, 0 to 30 wt. percent of molybdenum, tungsten, and 0 to 30 wt. percent in total of optional subingredient or subingredients selected from the group consisting of 0 to 30 wt. percent of indium and titanium, 0 to 20 wt. percent of vanadium, gold, silver, tantalum, zirconium, palladium, cadmium, germanium, selenium, bismuth, samarium, niobium, antimony, aluminum, silicon, tin, tellurium, and gadolinium, and 0 to 10 wt. percent of beryllium, and boron.

6. Non-magnetic resilient manganese-nickel alloys having a small temperature variation of elasticity as defined in claim 1, wherein the alloy essentially consists of 40 to 91 wt. percent of manganese, less than 40 wt. percent of nickel, and 0 to 32 wt. percent of chromium, 0 to 30 wt. percent of molybdenum, 0 to 32 wt. percent of tungsten, 0 to 30 wt. percent of iron, 0 to 20 wt. percent of cobalt, 0 to 20 wt. percent of silver, tantalum, palladium, and/or germanium.

7. Method of manufacturing non-magnetic resilient manganese-nickel alloys having a small temperature variation of elasticity and essentially consisting of 40 to 95 wt. percent of manganese, less than 40 wt. percent of nickel, and an effective amount of up to 32 wt. percent in total of at least one member selected from the group consisting of 0 to 32 wt. percent of chromium, 0 to 30 wt. percent of iron, molybdenum, tungsten, indium and titanium, 0 to 20 wt. percent of cobalt, vanadium, gold, silver, tantalum, zirconium, palladium, cadmium, germanium, selenium, bismuth, samarium, niobium, antimony, aluminum, silicon, tin, tellurium, and gadolinium, and 0 to 10 wt. percent of beryllium and boron, in the form of a desired shaped article, comprising heating the article at higher than 600° C. but below its melting point for at least one minute to homogenize it, and annealing it by gradually cooling at a speed slower than 1° C./sec., said amount being effective to ensure that the temperature coefficient of Young's modulus (or modulus of rigidity) of the alloy is in a range of $-20 \times 10^{-5}$ to $+20 \times 10^{-5}$, preferably $-5 \times 10^{-5}$ to $+5 \times 10^{-5}$.

8. Method of manufacturing non-magnetic resilient manganese-nickel alloys having a small temperature variation of elasticity as defined in claim 7, wherein the alloy consists essentially of 40 to 91 wt. percent of manganese, 5 to 40 wt. percent of nickel, and an effective amount of less than 10 wt. percent of chromium.

9. Method of manufacturing non-magnetic resilient manganese-nickel alloys having a small temperature variation of elasticity as defined in claim 7, wherein the alloy consists essentially of 60 to 95 wt. percent of manganese, 5 to 40 wt. percent of nickel, 10 to 30 wt. percent of iron and less than 10 wt. percent of cobalt.

10. Method of manufacturing non-magnetic resilient manganese-nickel alloys having a small temperature variation of elasticity as defined in claim 7, wherein the alloy consists essentially of 40 to 95 wt. percent of manganese, 40 to 1 wt. percent of nickel, 2 to 30 wt. percent of molybdenum and 5 to 30 wt. percent of tungsten.

11. Method of manufacturing non-magnetic resilient manganese-nickel alloys having a small temperature variation of elasticity as defined in claim 7, wherein the alloy consists essentially of 40 to 95 wt. percent of manganese, 40 to 1 wt. percent of nickel, 2 to 30 wt. percent of molybdenum, 5 to 30 wt. percent of tungsten, and an effective amount of up to 30 wt. percent in total of optional subingredient or subingredients selected from the group consisting of 0 to 30 wt. percent of indium and titanium, 0 to 20 wt. percent of vanadium, gold, silver, tantalum, zirconium, palladium, cadmium, germanium, selenium, bismuth, samarium, niobium, antimony, aluminum, silicon, tin, tellurium, and gadolinium, and 0 to 10 wt. percent of beryllium and boron.

12. Method of manufacturing non-magnetic resilient manganese-nickel alloys having a small temperature variation of elasticity as defined in claim 7, wherein the alloy consists essentially of 40 to 91 wt. percent of manganese, 5 to 40 wt. percent of nickel, and up to 32 wt. percent of chromium, 2 to 30 wt. percent of molybdenum, 5 to 32 wt. percent of tungsten, up to 30 wt. percent of iron, up to 10 wt. percent of cobalt, and up to 20 wt. percent of silver, tantalum, palladium and/or germanium.

13. Non-magnetic resilient manganese-nickel alloys having a small temperature variation of elasticity as defined in claim 1, in which said nickel is 5 to 40 wt. percent.

14. Method of manufacturing non-magnetic resilient manganese-nickel alloys having a small temperature variation of elasticity as defined in claim 7, in which said nickel is 5 to 40 wt. percent.

15. Method of manufacturing non-magnetic resilient manganese-nickel alloys having a small temperature variation of elasticity as defined in claim 7, in which said group consists of 0 to 10 wt. percent of chromium, 10 to 32 wt. percent of molybdenum, 5 to 30 wt. percent of tungsten, 0 to 32 wt. percent of indium and titanium, As can be seen from FIGS. 31A, 31B, 32A to 32E, and 33A to 33E, manganese-nickel-molybdenum and manganese-nickel-tungsten alloys, consisting of 40 to 95 wt. percent of manganese, 1 to 40 wt. percent nickel, and 0.01 to 30 wt. percent of either molybdenum or tungsten, respectively, have temperature coefficient of Young's modulus $e$ ranging from a comparatively large negative value to a comparatively large positive value, depending on the composition of the alloys, in any of the states as annealed (A), as cold-worked (B) with a working rate of 96% after the annealing, and as tempered (B') after the cold-work. Accordingly, those Mn-Ni-Mo and Mn-Ni-W alloys, whose temperature coefficient of Young's modulus $e$ falls in a range crossing the zero line between a negative value domain and a positive value domain, have the so-called Elinvar characteristics or temperature-independent elasticity.

As can be seen from FIGS. 34A to 34E and FIGS. 35A to 35E, the manganese-nickel-molybdenum and manganese-nickel-tungsten ternary aloys, consisting of 40 to 95 wt. percent of manganese, 1 to 40 wt. percent of nickel, and 0.01 to 30 wt. percent of either molybdenum or tungsten, respectively, have temperature coefficient of Young's modulus $e$, which varies greatly depending on the composition of the alloys in any of the states as water quenched (C) after the annealing, and as thermally stabilized (C') after the water quenching. Accordingly, the manganese-nickel-molybdenum and manganese-nickel-tungsten ternary alloys as water quenched (C) and as tempered (C') can also have the so-called Elinvar characteristics.

In the case of FIGS. 32A and 32B, the working rate for the cold-work process was 96%. FIGS. 36A and 36B illustrate the effects of different working rates, or different degrees of cold-work, on the temperature coefficient of Young's modulus $e$, for six different Mn-Ni-Mo ternary alloys and four different Mn-Ni-W ternary alloys of the invention. As can be seen from the figures, the temperature coefficient $e$ of the alloys of the invention can be improved by cold-work, even by slight cold-work with a working rate as small as 1%.

In the case of the heat treatments of FIGS. 31A, 31B, 34A, and 34B, the annealing is carried out by cooling at a speed of 100° C./hour after heating at 950° C. for 1 hour, while the quenching is effected by water cooling from 950° C. Table 15 and FIGS. 37A and 37B show how the temperature coefficient of Young's modulus $e$ is effected by variation of the cooling speed and the quenching temperature, for six different alloy compositions of the invention. It is apparent from Table 15 and FIGS. 37A and 37B that the temperature coefficient $e$ is greatly affected by the cooling speed and the quenching temperature.

The applicants have confirmed tests that manganese-nickel-molybdenum-tungsten quaternary alloys also have similar magnetic and elastic properties as the aforesaid ternary manganese-nickel-molybdenum and manganese-nickel-tungsten alloys.

Since the physical properties of the alloys of the invention are greatly affected by the working rate of cold-work, the quenching temperature, and the cooling speed, the shape of the curves of FIGS. 32A to 32E, 33A to 33E, 34A to 34E, and 35A to 35E may well be greatly changed if the working rate, quenching temperature, and/or the cooling speed are changed from those on which the curves of the figures are based.

In the last referred example, in addition to the ternary manganese-nickel-molybdenum and manganese-nickel-tungsten alloys prepared by adding either molybdenum or tungsten to the manganese-nickel base composition, the applicants have also tested by typical physical conditions of plural alloys which consists of the manganese-nickel base composition plus less than 30 wt. percent of at least one element selected from the group consisting of 0 to 30 wt. percent of indium, and titanium, 0 to 20 wt. percent of vanadium, gold, silver, tantalum, zirconium, palladium, cadmium, germanium, selenium, bismuth, samarium, niobium, antimony, aluminum, silicon, tin, tellurium, and gadolinium, and 0 to 10 wt. percent of zinc, beryllium, and boron. The results are shown in Tables 16, 17A to 17W, and 18A to 18W. The physical properties of any of the above referred plural alloys proved to be similar to those of the ternary alloy made by adding either molybdenum or tungsten to the manganese-nickel base composition.

As described in the foregoing disclosure, the manganese-nickel alloys according to the present invention, which consists of 40 to 95 wt. percent of manganese, less than 40 wt. percent, preferably 5 to 40 wt. percent of nickel, and 0 to 32 wt. percent in total of optional subingredient or subingredients selected from the group consisting of 0 to 32 wt. percent of chromium, 0 to 30 wt. percent of iron, molybdenum, tungsten, indium, and titanium, 0 to 20 wt. percent of cobalt, vanadium, gold, silver, tantalum, zirconium, palladium, cadmium, germanium, selenium, bismuth, samarium, niobium, antimony, aluminum, silicon, tin, tellurium, and gadolinium, and 0 to 10 wt. percent of zinc, beryllium, and boron, have a Young's modulus E (or modulus of rigidity) and a temperature coefficient of Young's modulus $e$ and a hardness Hv, which all vary greatly depending on the alloy composition and various treatments, such as annealing, quenching, cold-work, reheating after quenching, cold-work, etc.

Above all, the temperature coefficient of Young's modulus $e$, or the similar coefficient of modulus of rigidity, varies between a large negative value to a large positive value. Accordingly, it is possible to achieve alloys having a temperature coefficient of Young's modulus $e$ in a range from $-20\times10^{-5}$ to $+20\times10^{-5}$, preferably $-5\times10^{-5}$ to $+5\times10^{-5}$. In fact, any value of the temperature coefficient $e$ can selectively be achieved, as long as it is in the last mentioned range. Instead of the temperature coefficient of Young's modulus, a similar coefficient of modulus of rigidity can also be selectively controlled. Furthermore, with the alloys of the present invention, different values of Young's modulus (modulus of rigidity) and hardness can also be obtained.

In addition to the above feature of variable physical properties, the alloys of the present invention is also characterized in that the alloys, with any of the above defined compositions, are distinctively nonmagnetic.

Thus, the alloys of the present invention, in the state as annealed, are suitable for articles requiring comparatively small mechanical strength, such as tuning forks. On the other hand, alloys of the present invention, in the state as quenched, cold-worked, or thermally stabilized, are suitable for articles requiring a considerably large mechanical strength, such as coiled springs.

Beside the smallness of the temperature coefficient of Young's modulus $e$ (which generally means the smallness of temperature coefficient of modulus of rigidity), the present invention is featured in that any desired value of the temperature coefficient $e$ in the above range can be achieved by suitable heat treatment and/or cold-work.

As compared with conventional alloys with a temperature-independent elasticity, such as Elinvar and Coelinvar, which are ferromagnetic and contain a large amount of expensive nickel and cobalt, the alloys of the present invention are non-magnetic and contain only small amounts of such expensive nickel and/or cobalt. The non-magnetic properties of the alloys of the invention is particularly important for such application as watch springs, in which the magnetism appreciably affects the accuracy.

Therefore, the present invention provides inexpensive resilient material suitable for those articles and machine lements which allow only a very small deviation of resilient displacement or natural frequency with temperature change while requiring non-magnetic properties.

In the alloys of the invention, the reasons for limiting 0 to 10 wt. percent of cobalt, 0 to 20 wt. percent of vanadium, gold, silver, tantalum, zirconium, palladium, cadmium, germanium, selenium, bismuth, samarium, niobium, antimony, aluminum, silicon, tin, tellurium, and gadolinium, and 0 to 10 wt. percent of beryllium and boron.

16. Method of manufacturing non-magnetic resilient manganese-nickel alloys having a small temperature variation of elasticity as defined in claim 7, and thereafter cold-working the article to change its cross-sectional area by at least 1%.

17. Method of manufacturing non-magnetic resilient manganese-nickel alloys having a small temperature variation of elasticity as defined in claim 7, and thereafter heating the article at a temperature higher than 200° C. but lower than its melting point for at least one minute, and quenching the article at a rate faster than 1° C./sec.

18. Method of manufacturing non-magnetic resilient manganese-nickel alloys having a small temperature variation of elasticity as defined in claim 17, in which the last-mentioned heating is carried out for 10 minutes to 15 hours.

19. Method of manufacturing non-magnetic resilient manganese-nickel alloys having a small temperature variation of elasticity as defined in claim 17, in which said quenching is conducted at a cooling rate of 10° C. to 500° C./sec.

20. Method of manufacturing non-magnetic resilient manganese-nickel alloys having a small temperature variation of elasticity as defined in claim 17, and thereafter cold-working the article to change its cross-sectional area by at least 1%.

21. Method of manufacturing non-magnetic resilient manganese-nickel alloys having a small temperature variation of elasticity as defined in claim 16, and thereafter heating the article at a temperature higher than 100° C. but lower than its melting point for at least one minute, and tempering the article by gradually cooling it at a rate slower than 1° C./sec.

22. Method of manufacturing non-magnetic resilient manganese-nickel alloys having a small temperature variation of elasticity as defined in claim 21, in which the last-mentioned heating is conducted for 5 minutes to 500 hours.

23. Method of manufacturing non-magnetic resilient manganese-nickel alloys having a small temperature variation of elasticity as defined in claim 17, and thereafter heating the article at a temperature higher than 100° C. but lower than its melting point for at least one minute, and tempering the article by gradually cooling it at a rate slower than 1° C./sec.

24. Method of manufacturing non-magnetic resilient manganese-nickel alloys having a small temperature variation of elasticity as defined in claim 23, in which the last-mentioned heating is conducted for 5 minutes to 500 hours.

25. Method of manufacturing non-magnetic resilient manganese-nickel alloys having a small temperature variation of elasticity as defined in claim 20, and thereafter heating the shaped alloy at a temperature higher than 100° C. but lower tahn its melting point.

References Cited
UNITED STATES PATENTS

| | | | |
|---|---|---|---|
| 2,242,970 | 5/1941 | Fetz | 75—134 M |
| 2,310,094 | 2/1943 | Kroll | 75—161 X |
| 2,317,979 | 5/1943 | Dean | 75—134 M |
| 2,339,252 | 1/1944 | Dean | 75—134 M X |
| 943,066 | 12/1909 | Driver | 75—134 M X |
| 2,202,012 | 5/1940 | Long | 75—134 M |
| 2,234,748 | 3/1941 | Dean et al. | 148—11.5 |
| 2,250,470 | 7/1941 | Dean et al. | 75—134 M |
| 2,259,459 | 10/1941 | Dean | 148—11.5 |

CHARLES N. LOVELL, Primary Examiner

J. E. LEGRU, Assistant Examiner

U.S. Cl. X.R.

75—135; 148—11.5